(12) United States Patent  
Hao

(10) Patent No.: US 12,443,765 B2  
(45) Date of Patent: Oct. 14, 2025

(54) UNLOCKING METHOD AND ELECTRONIC DEVICE

(71) Applicant: Huawei Technologies Co., Ltd., Shenzhen (CN)

(72) Inventor: Huaqi Hao, Milan (IT)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 153 days.

(21) Appl. No.: 18/491,093

(22) Filed: Oct. 20, 2023

(65) Prior Publication Data

US 2024/0086580 A1 Mar. 14, 2024

Related U.S. Application Data

(63) Continuation of application No. PCT/CN2022/087901, filed on Apr. 20, 2022.

(30) Foreign Application Priority Data

Apr. 22, 2021 (CN) .......................... 202110438415.7

(51) Int. Cl.  
*G06F 21/84* (2013.01)

(52) U.S. Cl.  
CPC ...... *G06F 21/84* (2013.01); *G06F 2221/2149* (2013.01)

(58) Field of Classification Search  
CPC ....................................................... G06F 21/84  
See application file for complete search history.

(56) References Cited

U.S. PATENT DOCUMENTS

| | | | |
|---|---|---|---|
| 9,770,086 B2* | 9/2017 | Prisco | A45F 3/14 |
| 10,460,092 B2* | 10/2019 | Mao | G06F 3/0488 |
| 10,558,328 B2* | 2/2020 | Huang | G06F 9/451 |
| 11,550,461 B2* | 1/2023 | Zhu | G06F 3/1415 |
| 12,321,425 B2* | 6/2025 | Mao | G06F 21/84 |
| 2017/0153773 A1* | 6/2017 | Huang | G06F 21/32 |
| 2019/0272025 A1* | 9/2019 | Turgeman | G06F 3/04812 |

FOREIGN PATENT DOCUMENTS

| | | |
|---|---|---|
| CN | 110232266 A | 9/2019 |
| CN | 110494818 A | 11/2019 |
| CN | 112115444 A | 12/2020 |
| JP | 2007081876 A | 3/2007 |
| JP | 2015525918 A | 9/2015 |
| KR | 20160117381 A | 10/2016 |

* cited by examiner

Primary Examiner — Viral S Lakhia  
(74) Attorney, Agent, or Firm — Slater Matsil, LLP

(57) ABSTRACT

An unlocking method and an electronic device are provided. The method is applied to the electronic device. The electronic device includes a first screen and a second screen that are formed in a screen-folded state. The first screen is an inner screen, the second screen is an outer screen, the first screen has an associated first collection component, and the second screen has an associated second collection component. The method includes: obtaining an unlocking intention; invoking, in response to the unlocking intention, the second collection component to collect identity information of the user, and identifying the identity of the user based on the identity information collected by the second collection component; and unlocking the first screen if the identity of the user is valid and the electronic device meets a condition for using the first screen.

16 Claims, 57 Drawing Sheets

Unfolded state
(1)

Half-folded state
(2)

Folded state
(1)　　　　　　　　　　(2)

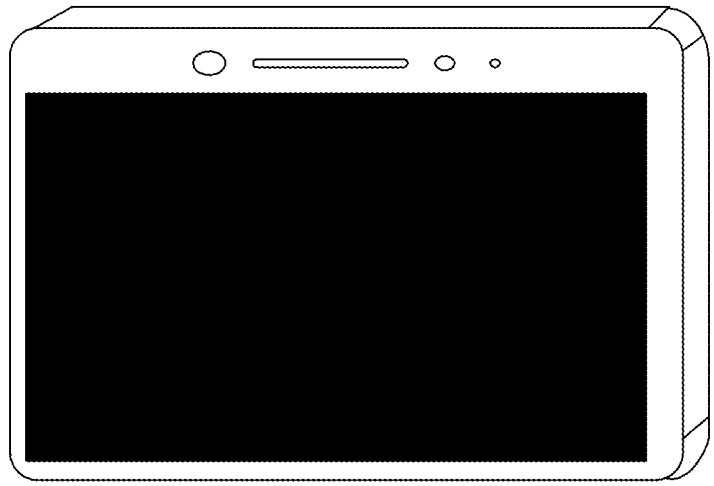
FIG. 6(1) Folded state (locked screen)
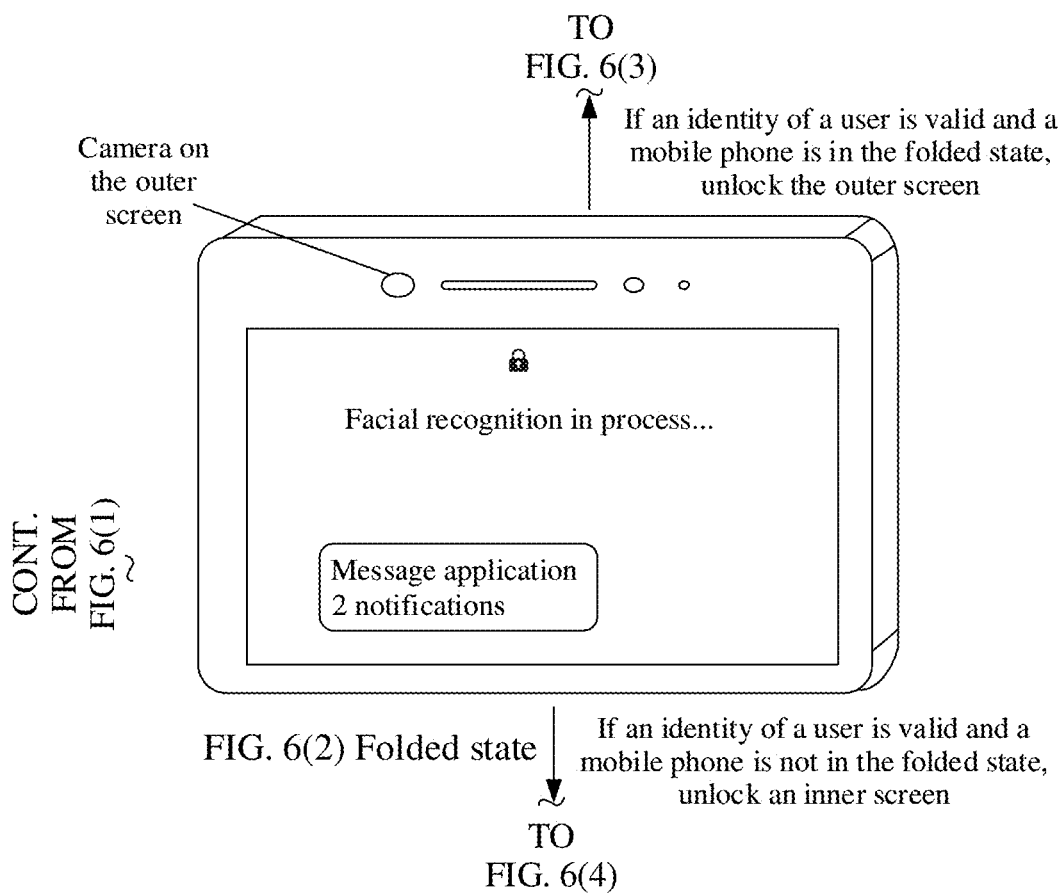
FIG. 6(2) Folded state FIG. 6(3) Folded state
~
CONT.
FROM

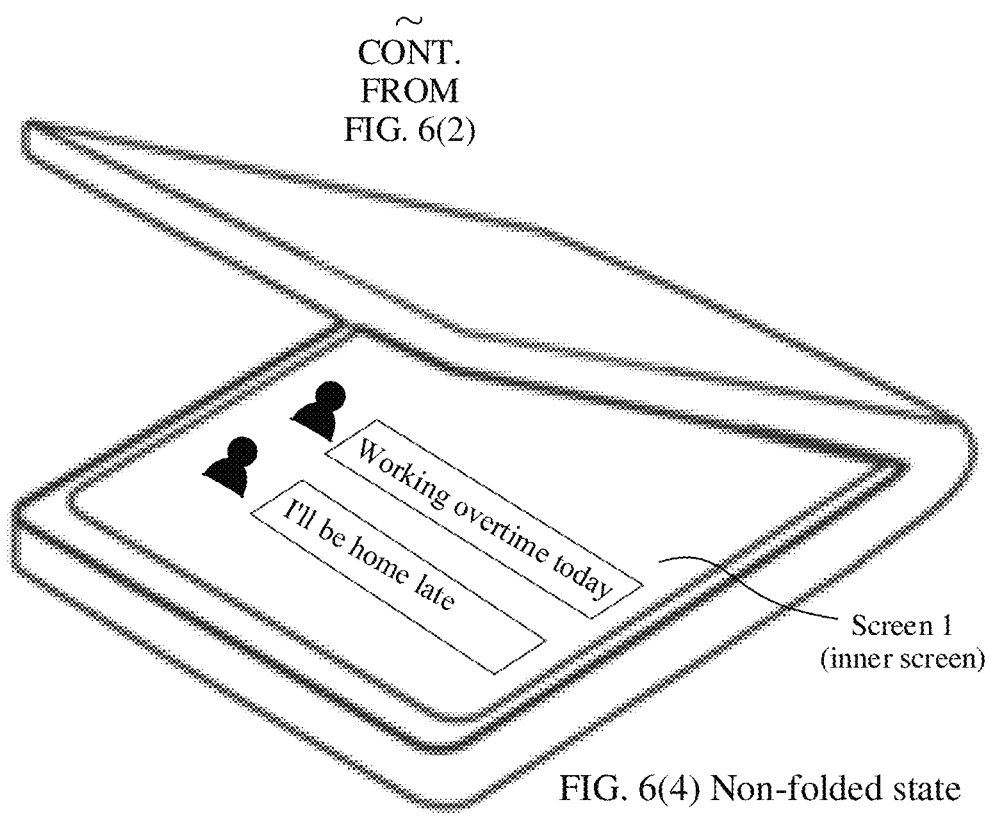

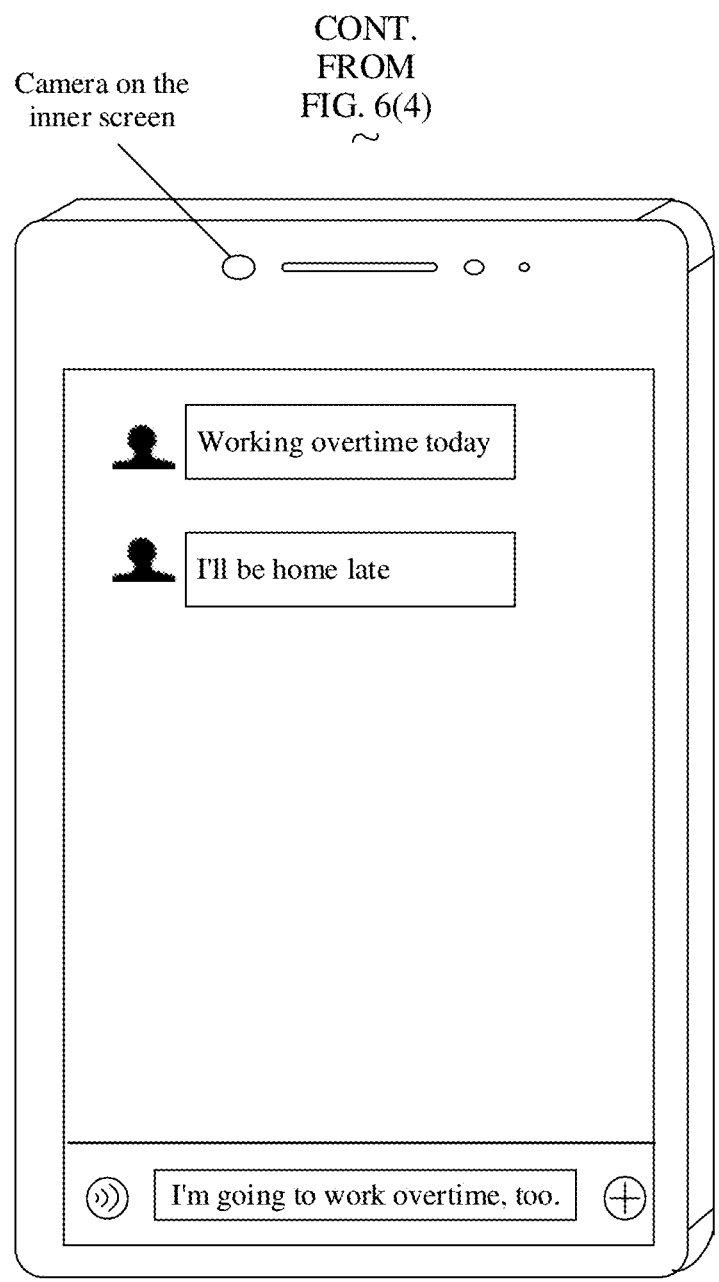
FIG. 6(5) Non-folded state

∼
CONT.
FROM

When new messages are received, perform facial recognition through a camera on an outer screen in response to an unlocking requirement of a user →

Facial recognition in process...

Message application 2 notifications

TO FIG. 8-2(3)

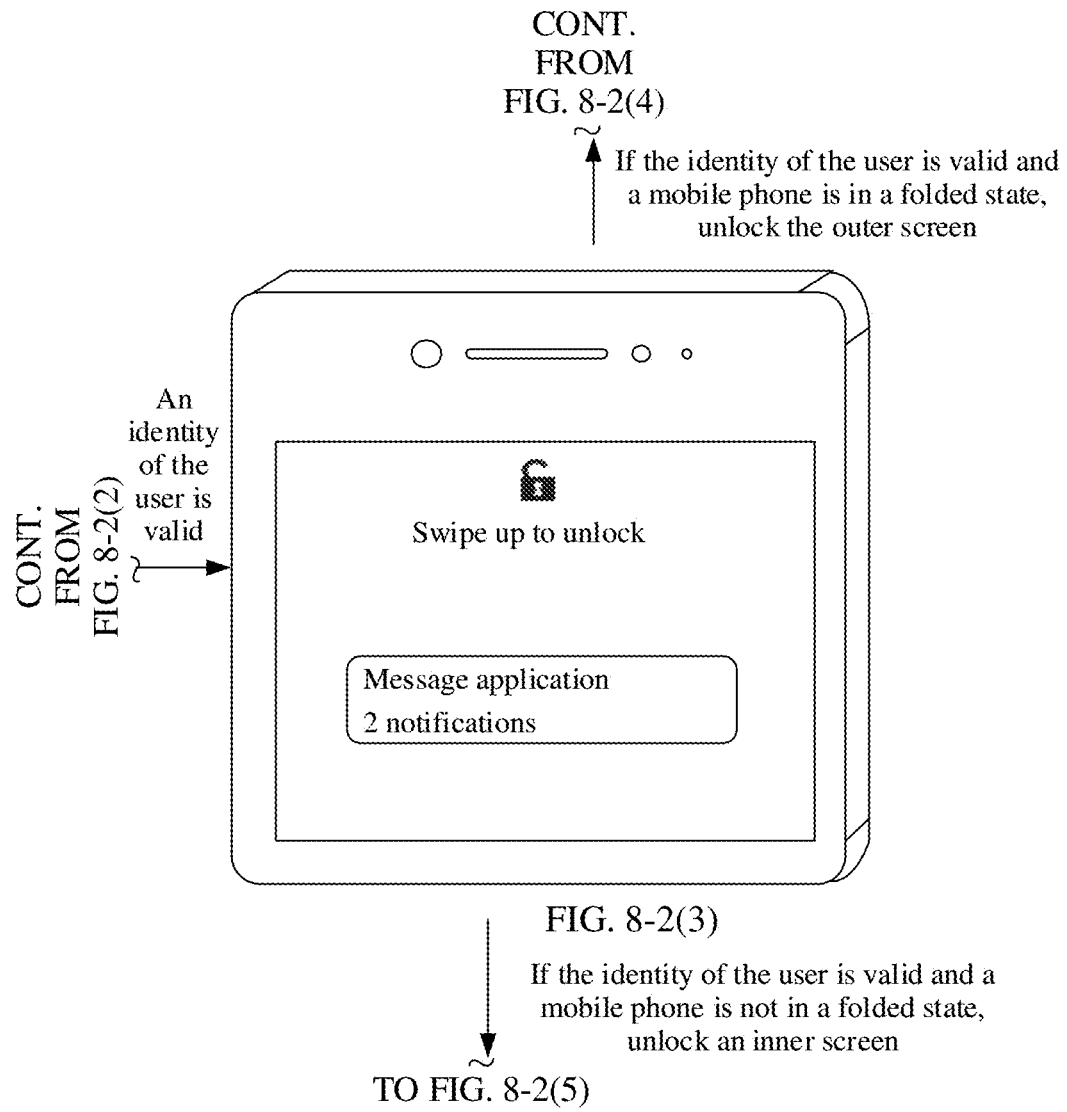

FROM

CONT.
FROM

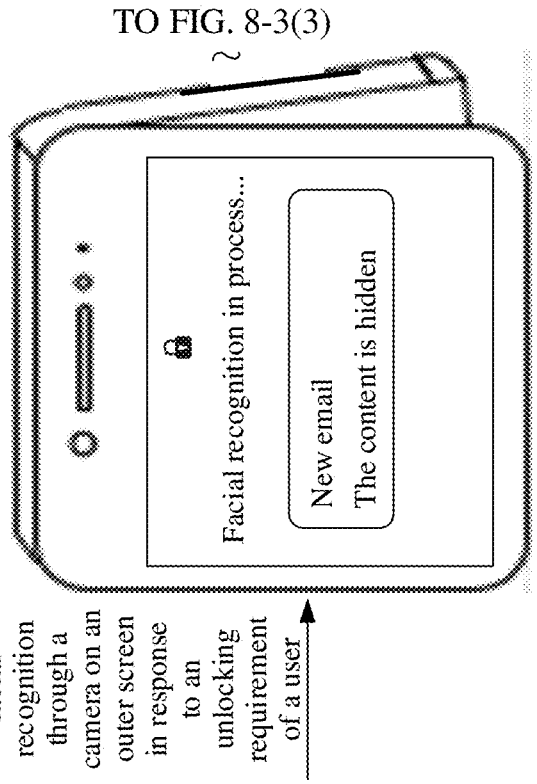
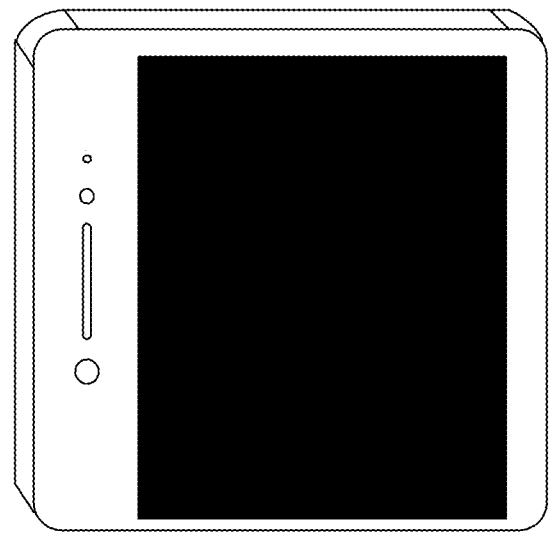
FIG. 8-3(1)
FIG. 8-3(2)
When an enterprise email is received, perform facial recognition through a camera on an outer screen in response to an unlocking requirement of a user
An identity of the user is valid and a mobile phone is in a folded state
TO FIG. 8-3(3)
TO FIG. 8-3(4)

CONT. FROM FIG. 8-3(2)

TO FIG. 8-3(6)

If the mobile phone is in the non-folded state within a period of time, unlock the inner screen When an enterprise email is received, perform facial recognition through a camera on an outer screen in response to an unlocking requirement of a user

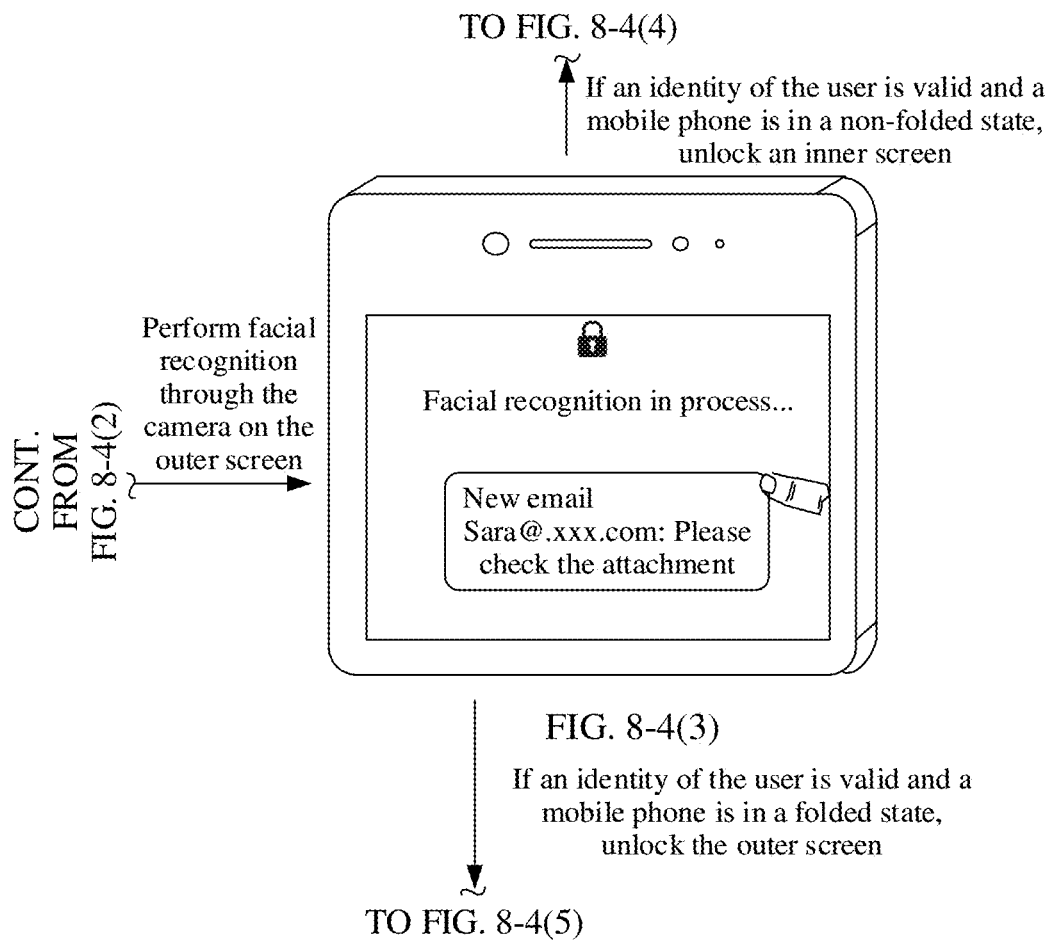

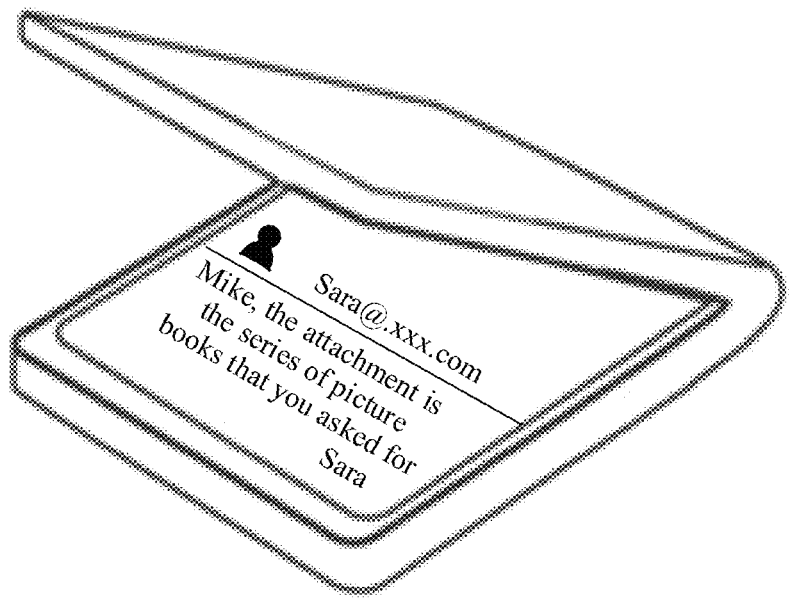
FIG. 8-4(4)
CONT.
FROM
FIG. 8-4(3)
CONT.
FROM
FIG. 8-4(3)
FIG. 8-4(5)

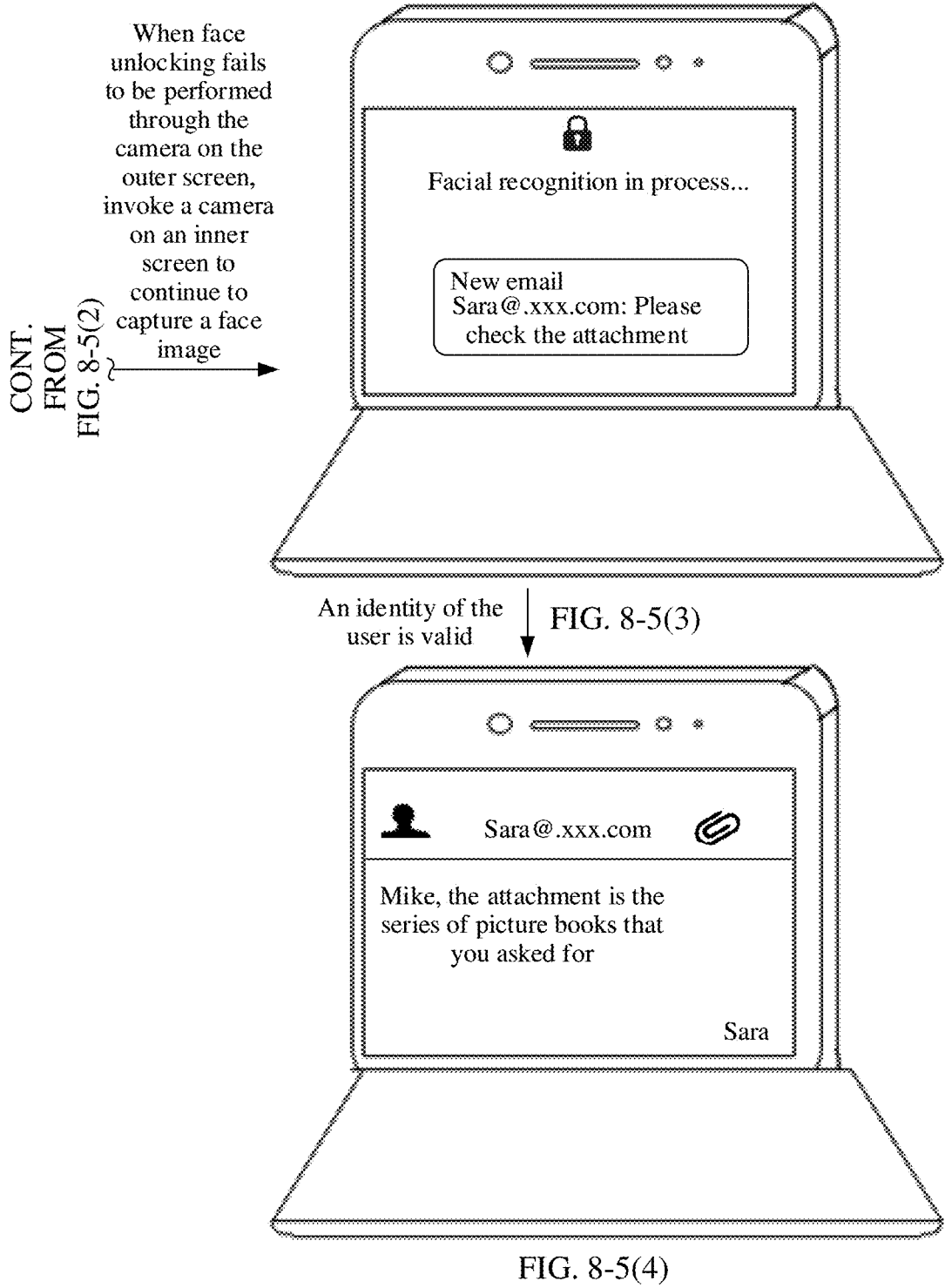

When new messages are received, perform facial recognition through a camera on an outer screen in response to an unlocking operation of a user Facial recognition in process...

New email
Sara@.xxx.com: Please check the attachment

TO FIG. 8-6(3)

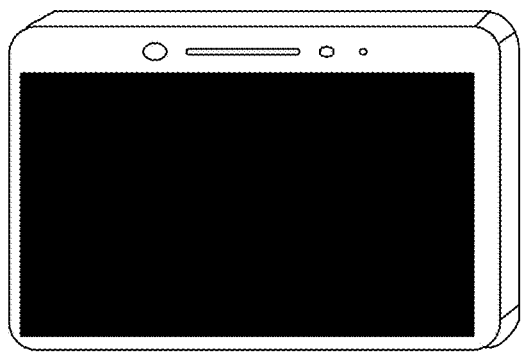
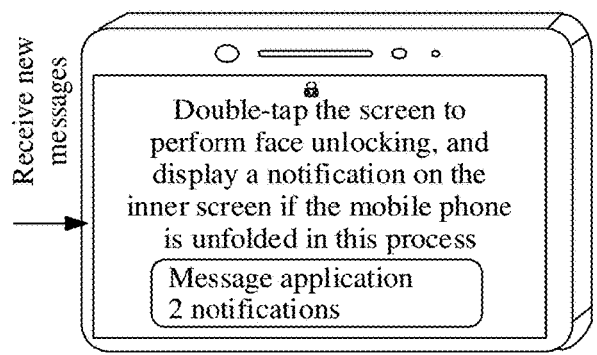
FIG. 8-7(1)                    FIG. 8-7(2)

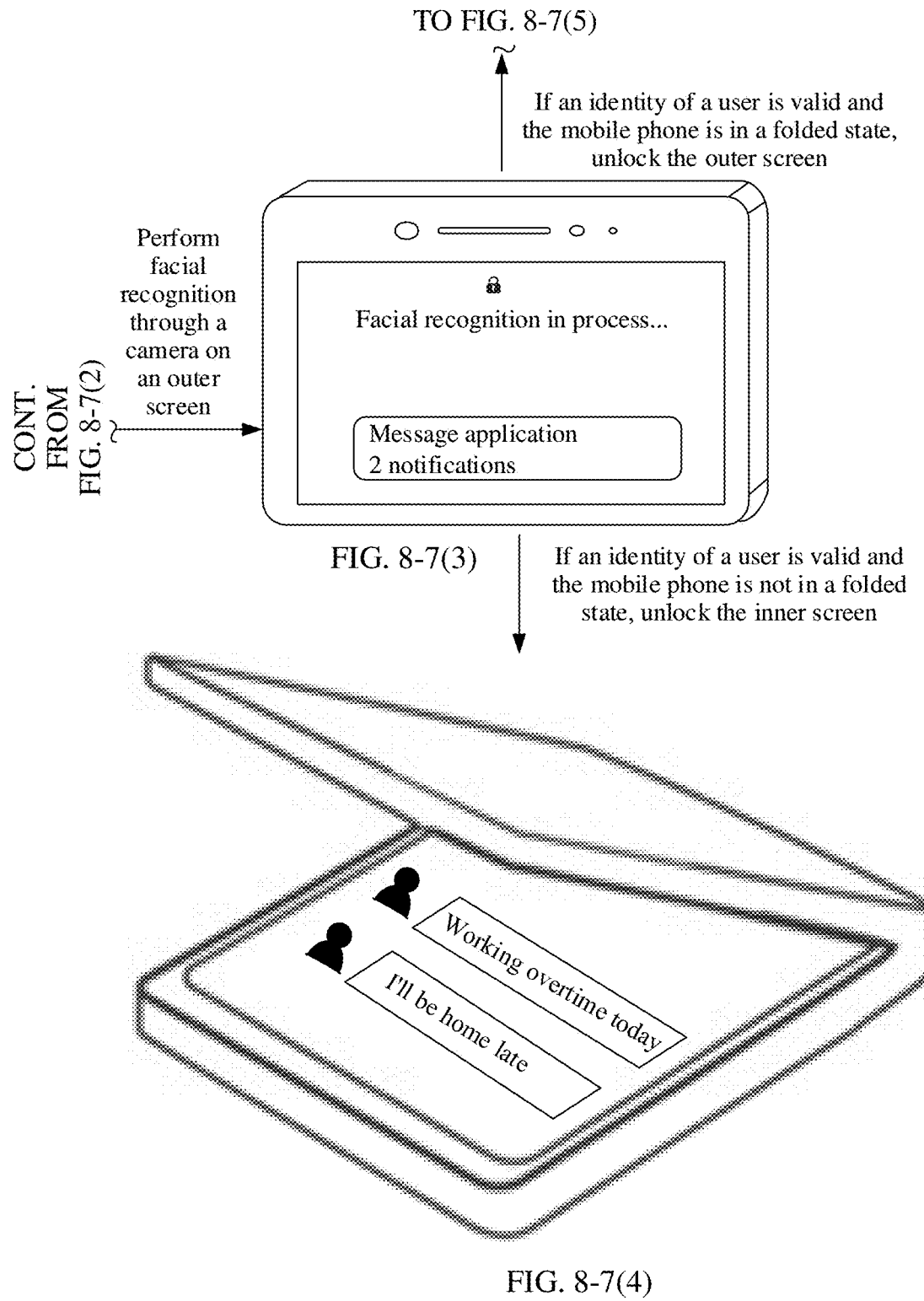

FROM

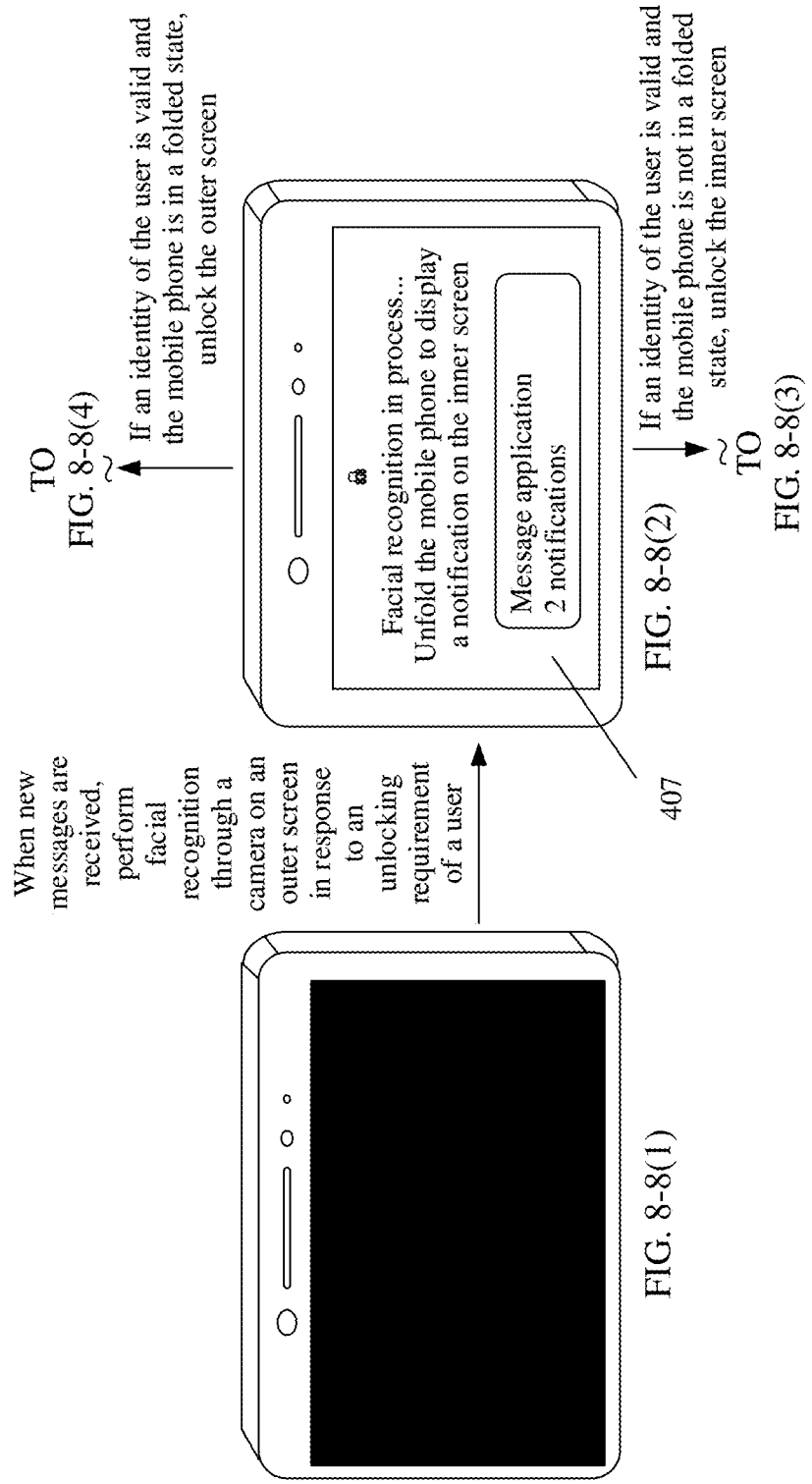

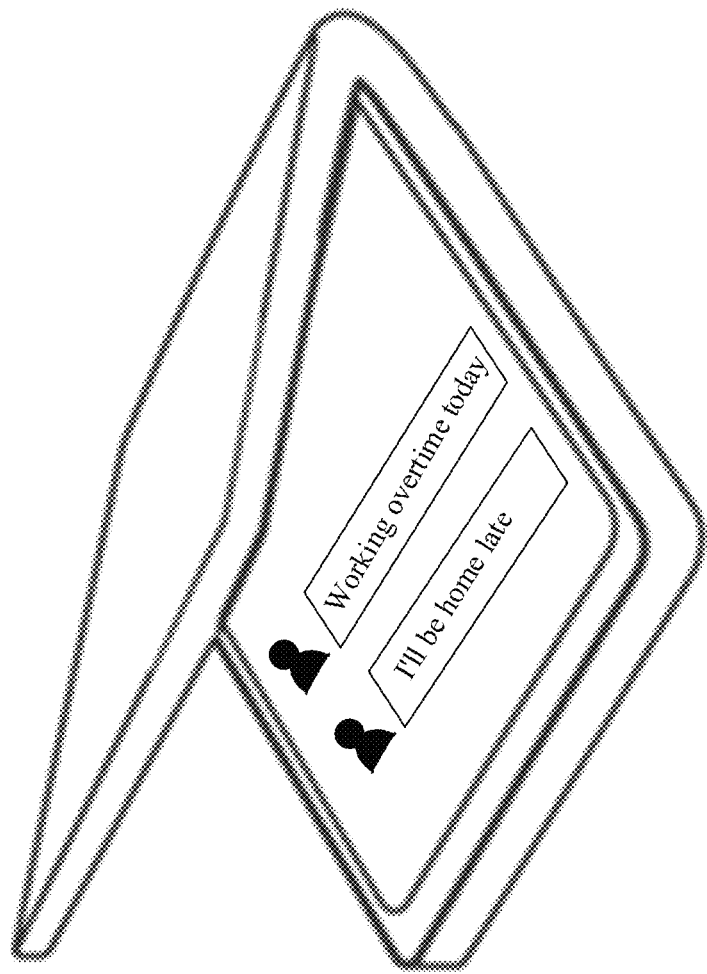

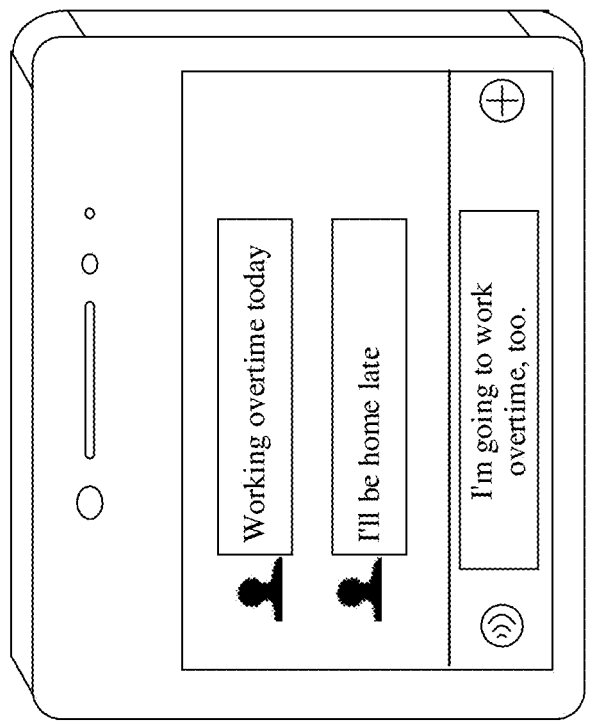
FIG. 8-8(4) CONT. FROM FIG. 8-8(2)

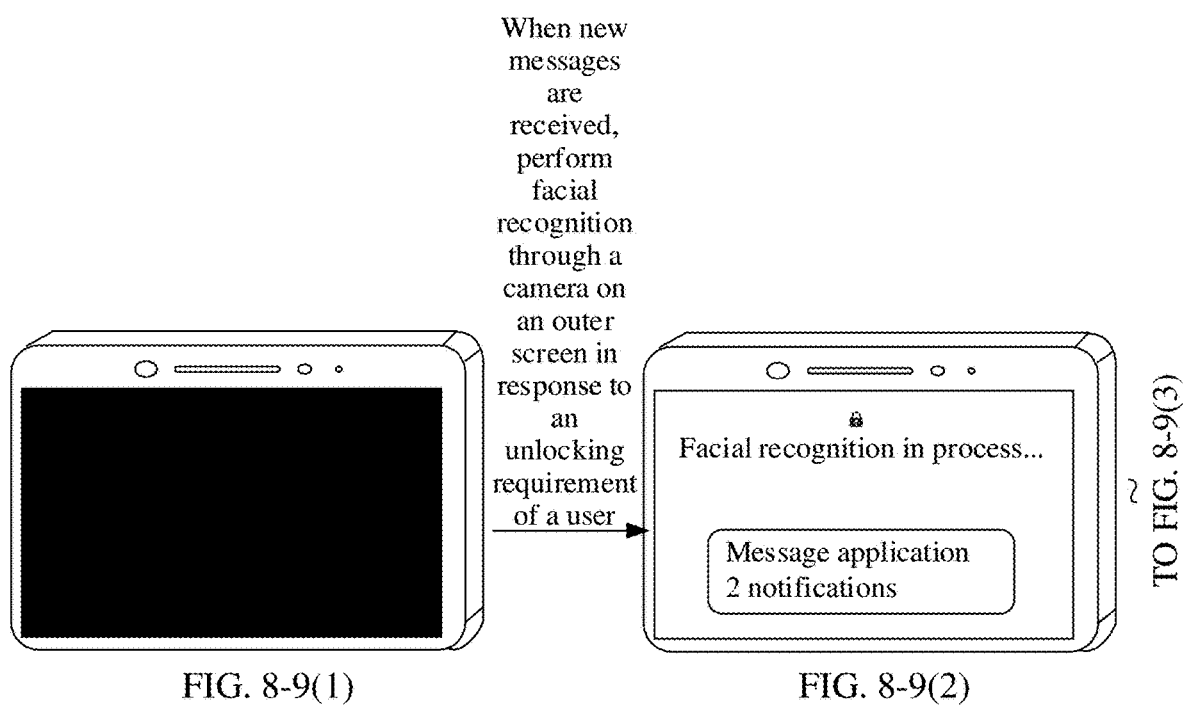

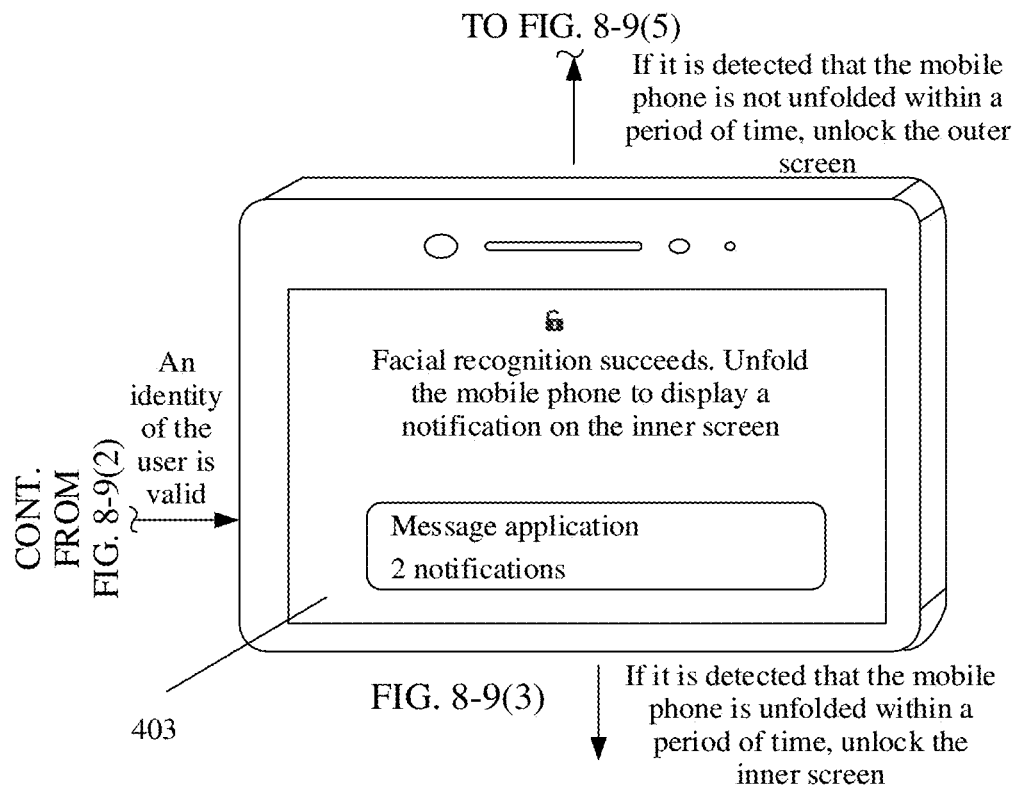

FROM

FIG. 8-10(2) Folded state

TO

FIG. 8-10(1) Folded state (locked screen)

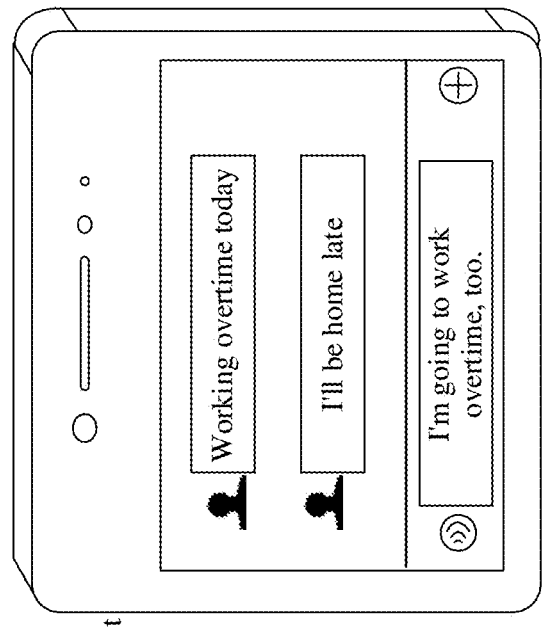
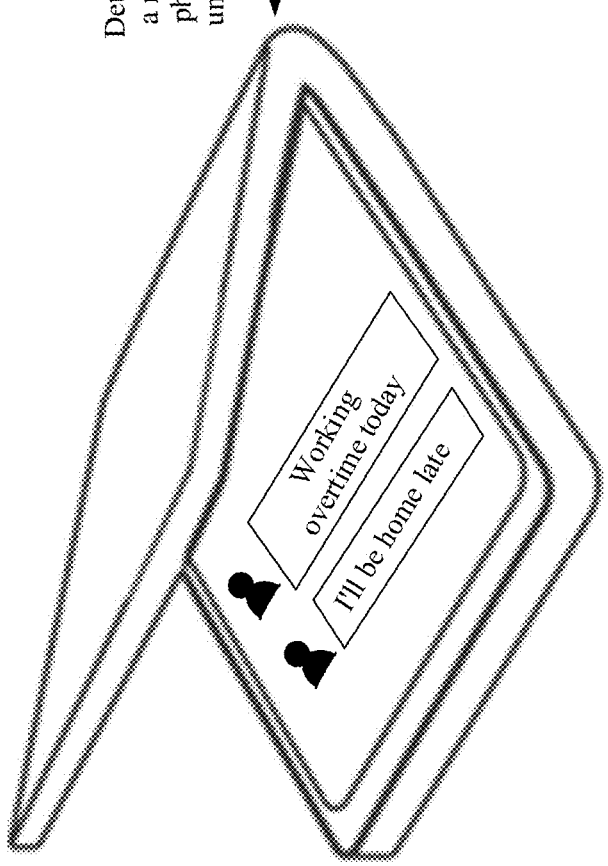
FIG. 8-10(3) Folded state
FIG. 8-10(4) Non-folded state

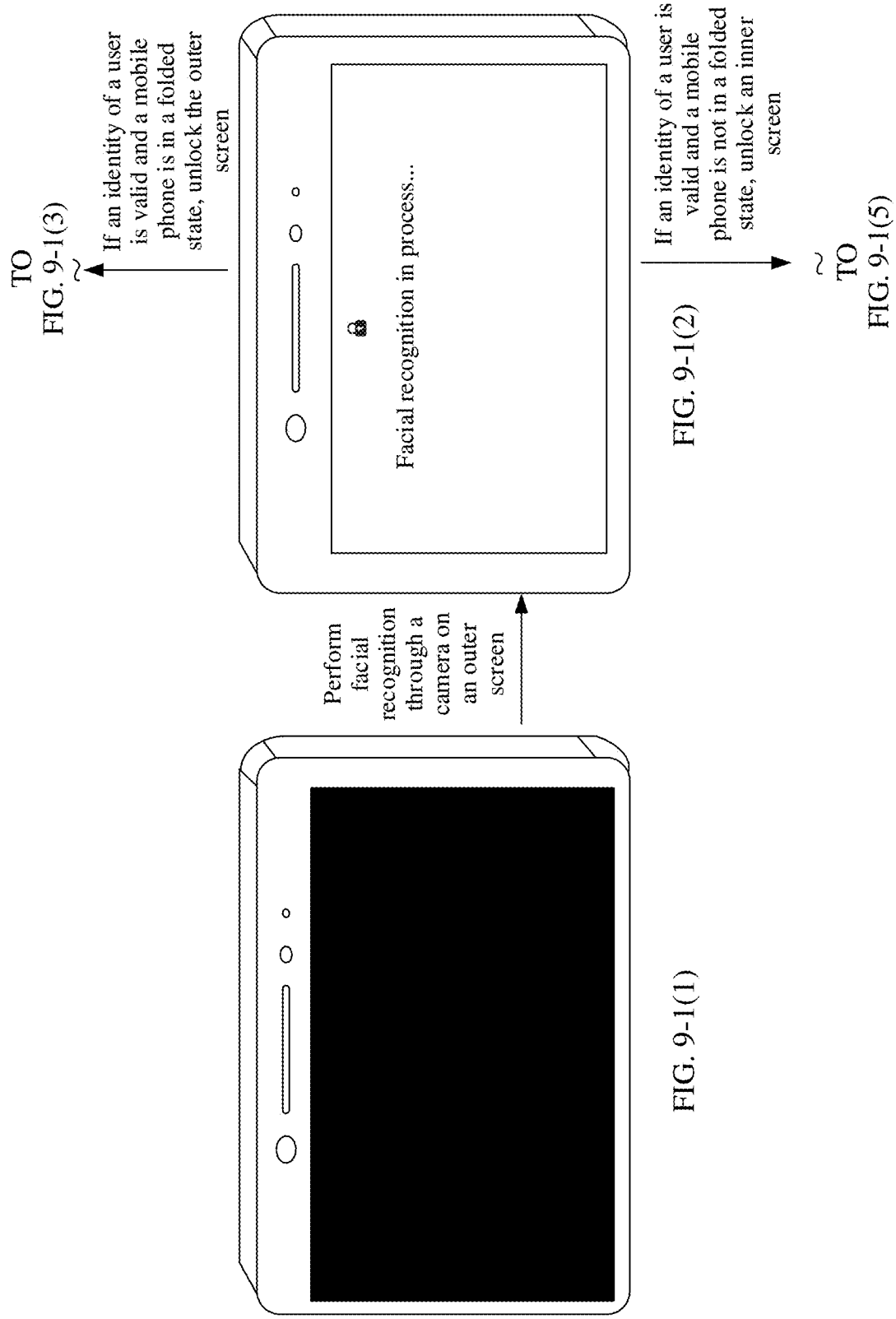

CONT. FROM FIG. 9-1(2)

CONT.
FROM
FIG. 9-1(2)
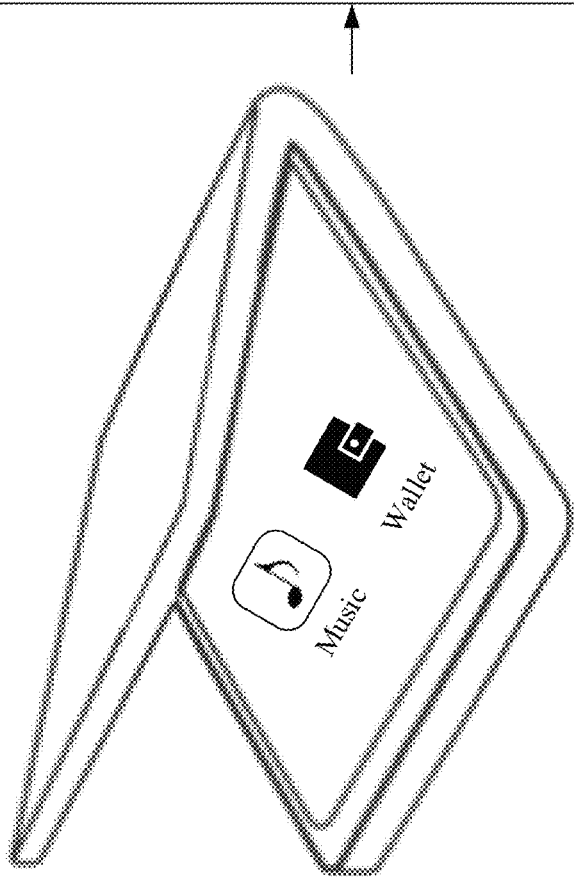
FIG. 9-1(5)
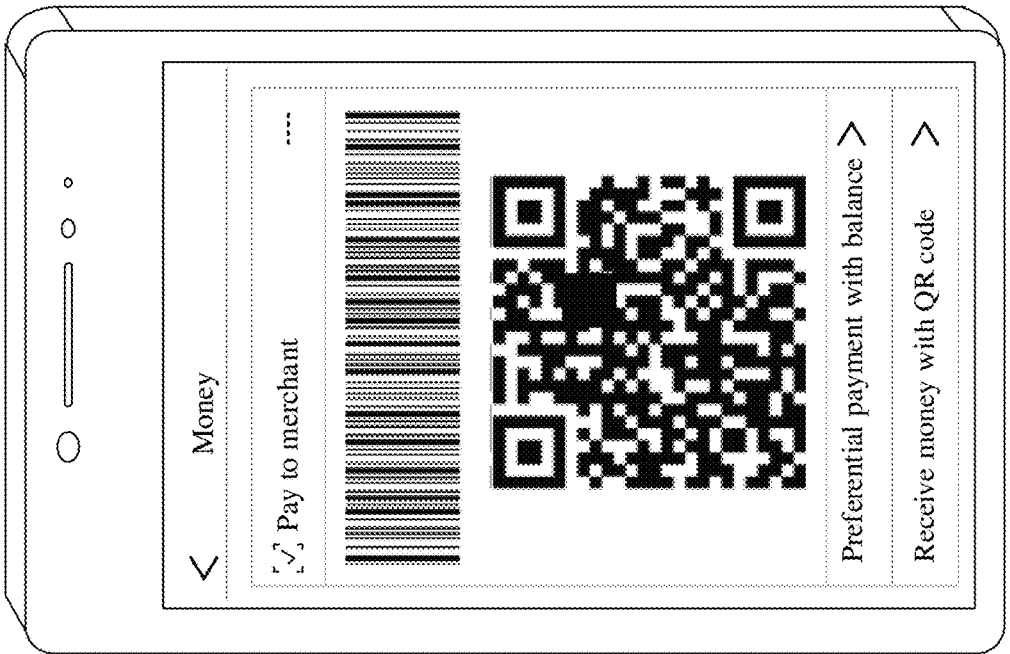
FIG. 9-1(6)

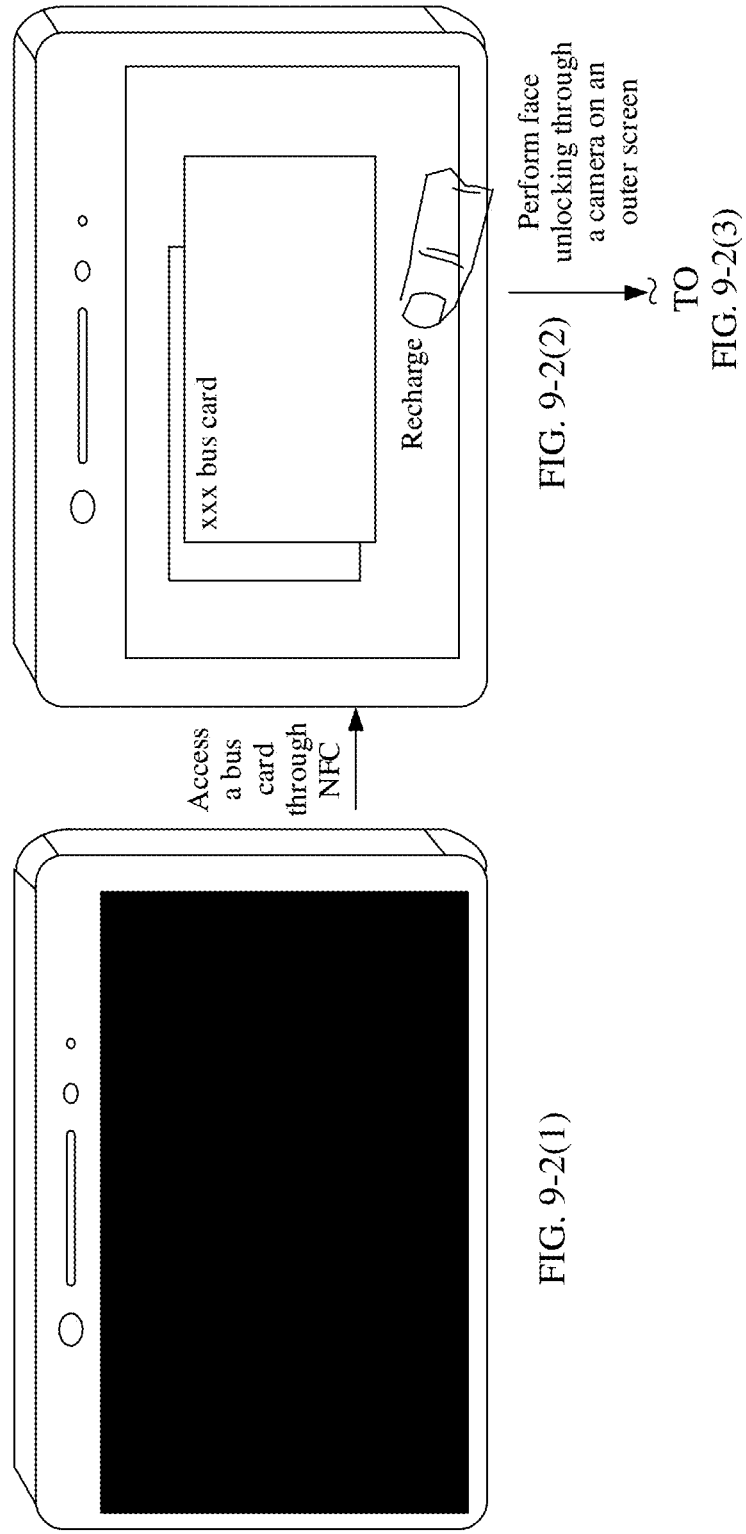

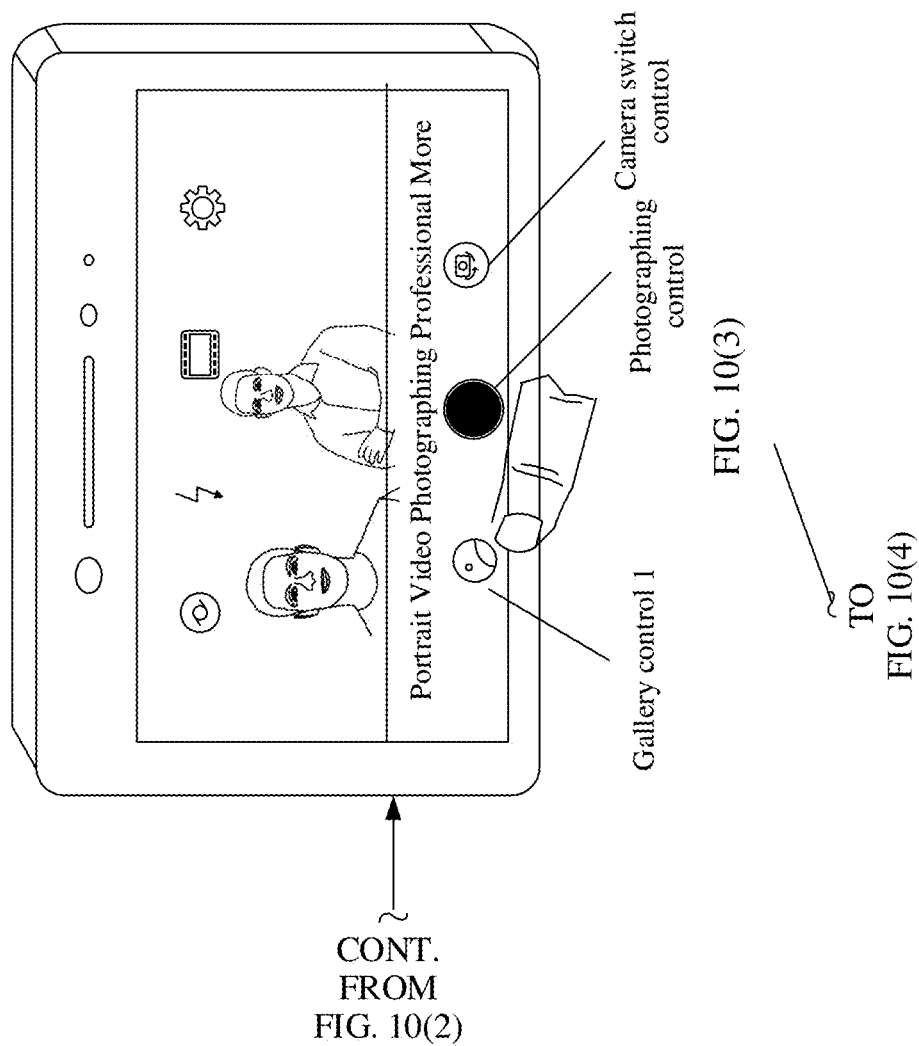

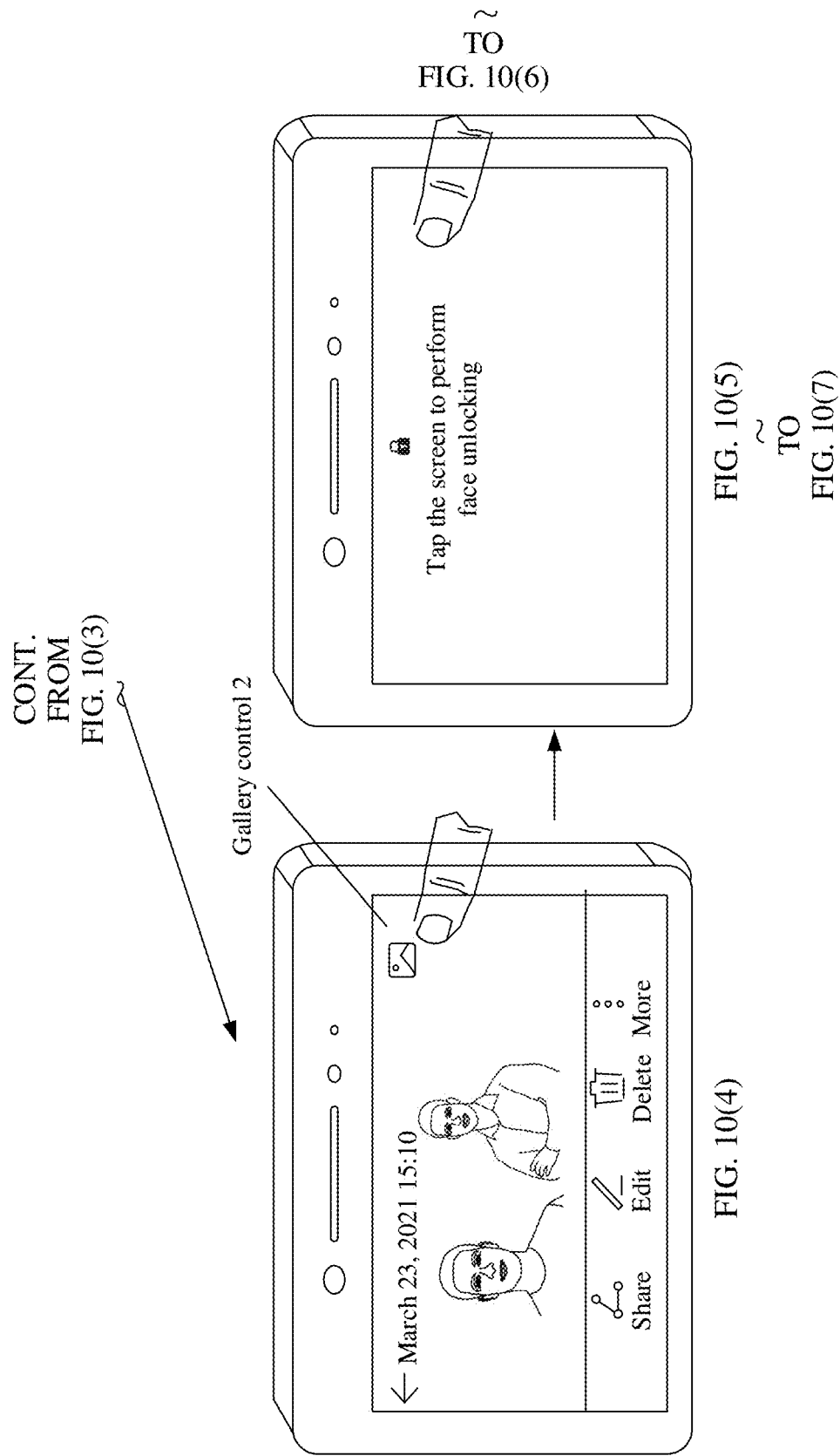

If an identity of a user is valid and a mobile phone is unfolded, unlock an inner screen

CONT. FROM FIG. 10(5)

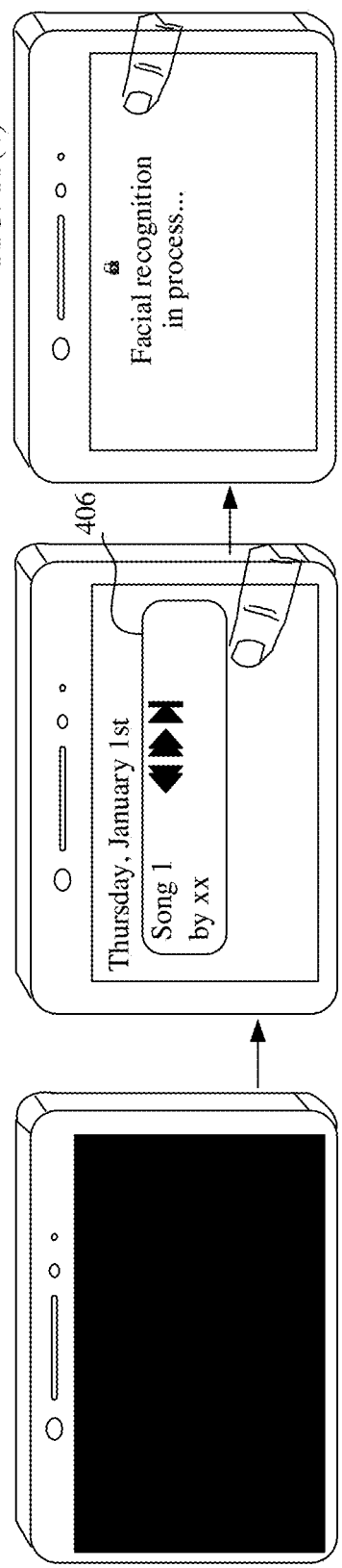

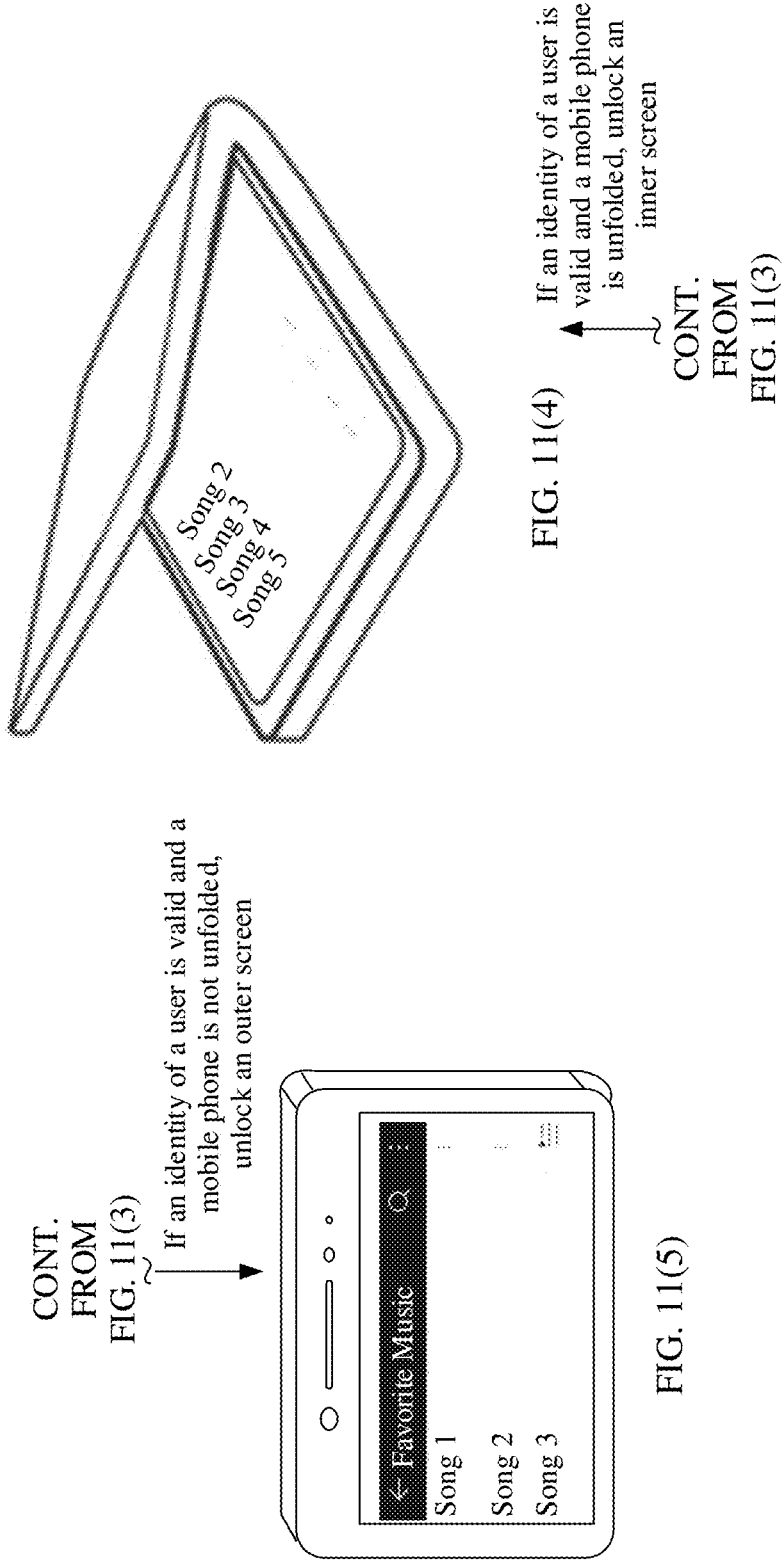

UNLOCKING METHOD AND ELECTRONIC DEVICE

CROSS-REFERENCE TO RELATED APPLICATIONS

This application is a continuation of International Application No. PCT/CN2022/087901, filed on Apr. 20, 2022, which claims priority to Chinese Patent Application No. 202110438415.7, filed on Apr. 22, 2021. The disclosures of the aforementioned applications are hereby incorporated by reference in their entireties.

TECHNICAL FIELD

This application relates to the field of electronic technologies, and in particular, to an unlocking method and an electronic device.

BACKGROUND

A foldable screen device usually has a large screen, and may provide better visual viewing experience for a user. To ensure security of important data such as user privacy, the foldable screen device generally has a lock screen function. After the screen of the foldable screen device is locked, the user needs to input valid identity authentication information (for example, a correct fingerprint, a digital password, or facial data) to the foldable screen device, to unlock the screen and restore interaction between the foldable screen device and the user.

Unlocking a foldable screen mobile phone in a scenario of receiving a new message is used as an example. Currently, as shown in FIG. 1A and FIG. 1B, the foldable screen mobile phone receives new messages (for example, two WeChat notifications) in a screen-locked state. If a user needs to read and reply to the messages on an inner screen of the foldable screen mobile phone, the user needs to first unfold the mobile phone from a folded state to an unfolded state, and input identity authentication information to the mobile phone in the unfolded state (for example, input facial data through a camera on the inner screen). It can be learned that unlocking a mobile phone that does not have a foldable screen usually takes only a short time, but unlocking a foldable screen mobile phone needs to first unfold the mobile phone and then enable identity authentication, causing low unlocking efficiency and low efficiency of interaction between a user and a terminal.

SUMMARY

This application provides an unlocking method and an electronic device, where an identity of a user can be identified without fully unfolding a mobile phone by the user, so that unlocking is quickly completed when the identity of the user is valid. This improves efficiency of interaction between the user and a terminal.

To achieve the foregoing objective, the following technical solutions are used in this application.

According to a first aspect, this application provides an unlocking method. The method is applied to an electronic device or an apparatus (for example, a chip of the electronic device) that can implement a function of the electronic device. For example, the method is applied to the electronic device. The electronic device includes a first screen and a second screen that are formed in a screen-folded state. The first screen is an inner screen, the second screen is an outer screen, the first screen has an associated first collection component, and the second screen has an associated second collection component.

The method includes: The electronic device obtains an unlocking intention; invokes, in response to the unlocking intention, the second collection component to collect identity information of a user, and identifies an identity of the user based on the identity information collected by the second collection component; and unlocks the first screen if the identity of the user is valid and the electronic device meets a condition for using the first screen.

It can be learned that, when the unlocking intention of the user is obtained, the identity information of the user may be collected by using a sensor associated with the outer screen, and the identity of the user is identified based on the identity information. Compared with that identity identification is enabled only after a mobile phone is unfolded, causing low unlocking efficiency in the conventional technology, in the technical solution of this application, the identity of the user can be identified without fully unfolding the mobile phone, so that unlocking is quickly completed when the identity of the user is valid. In this case, efficiency of interaction between the user and a terminal is improved. In addition, when it is detected by the terminal that the terminal meets the condition for using the first screen, it indicates that the user wants to unlock the first screen when unlocking a terminal screen. In this case, after it is determined that the identity of the user is valid, the terminal may intelligently and conveniently unlock the first screen for the user. This further improves efficiency of interaction between the terminal and the user.

In a possible design, the unlocking intention may be an unlocking instruction that is input by the user. For example, the user inputs the unlocking instruction to the electronic device by pressing a power button or double-tapping the screen.

In a possible design, the unlocking intention may further be an unlocking intention sensed and determined by the electronic device. For example, when it is detected that the user lifts the mobile phone, the electronic device may preliminarily determine that the user has the unlocking intention.

In a possible design, after it is determined that the identity of the user is valid and before the unlocking the first screen, the method further includes: unlocking the second screen, and displaying a first interface on the second screen.

In a possible design, after the unlocking the first screen, the method further includes: displaying, on the first screen, a second interface associated with the first interface.

To be specific, when it is determined, based on the identity information collected by the collection component associated with the outer screen, that the identity of the user is valid, the electronic device may first unlock the outer screen, and display the first interface on the outer screen. The first interface displayed on the outer screen may be further connected to the inner screen. The second interface that is connected to the inner screen for display is associated with the first interface.

In some designs, the second interface that is connected to the inner screen for display may be a same interface as the first interface displayed on the outer screen. Herein, that the first interface is the same as the second interface means that included content is the same. Sizes of the first interface and the second interface, layouts of elements in the interfaces, sizes of the elements, and the like may be different.

In some other designs, the second interface that is connected to the inner screen for display is associated with content of the first interface. For example, the second interface is a detailed display interface of the first interface. For another example, if the user does not tap a music control on the outer screen after the outer screen is unlocked, the second interface entered by the inner screen is a home screen after the mobile phone is unfolded. If the user taps the music control on the outer screen after the outer screen is unlocked, the second interface entered by the inner screen is a music interface such as a music playlist interface after the mobile phone is unfolded. Alternatively, content displayed on the first interface and content displayed on the second interface may be the same.

In a possible design, before the unlocking the first screen, the method further includes: invoking the first collection component to collect identity information of the user if the identity of the user cannot be identified based on the identity information collected by the second collection component, and identifying the identity of the user based on the identity information collected by the first collection component. In this way, a probability of successful unlocking can be increased.

In a possible design, the identifying the identity of the user based on the identity information collected by the first collection component includes: identifying the identity of the user based on the identity information collected by the second collection component and the identity information collected by the first collection component. Facial recognition is as an example. Before the electronic device invokes an image sensor of a camera on the inner screen, an image sensor of a camera on the outer screen has collected some face images required for facial recognition. In this case, the image sensor of the camera on the inner screen may capture fewer face images to complete facial recognition. This shortens time from invoking the image sensor of the camera on the inner screen to successful facial recognition and speeds up facial recognition.

In a possible design, the invoking the first collection component to collect identity information of the user if the identity of the user cannot be identified based on the identity information collected by the second collection component includes: invoking the first collection component to collect the identity information of the user if it is detected that an unfolding angle of the electronic device reaches a preset angle and the identity of the user cannot be identified based on the identity information collected by the second collection component.

In a possible design, before the unlocking the first screen, the method further includes: displaying a third interface or playing a voice prompt, where the third interface is used to prompt the user to unfold the electronic device, and the voice prompt is used to prompt the user to unfold the electronic device.

In a possible design, the method further includes: receiving a setting instruction that is input by the user, where the setting instruction is used to set any one or more of a preset application, a preset time period, a preset geographical location range, and a preset unlocking instruction.

In a possible design, the obtaining an unlocking intention includes: receiving an unlocking instruction that is input by the user; and the invoking, in response to the unlocking intention, the second collection component to collect identity information of a user includes: invoking, in response to the unlocking instruction, the second collection component to collect the identity information of the user.

In a possible design, the first collection component and the second collection component are the same or different.

In a possible design, the condition for using the first screen includes one or a combination of a plurality of the following conditions: current time is within the preset time period, a current location is within the preset geographical location range, a new message is received and the new message is a message of the preset application, the electronic device is in a non-folded state, and the unlocking instruction that is input by the user is the preset unlocking instruction.

In a possible design, the preset unlocking instruction includes any one or a combination of a plurality of the following: a gesture, a pattern, a number, a fingerprint, and a voice that are preset for unlocking the first screen.

In a possible design, the first collection component includes any one or more of the following components: a fingerprint collection component, a voiceprint collection component, and an image capture component; and the second collection component includes any one or more of the following components: a fingerprint collection component, a voiceprint collection component, and an image capture component.

According to a second aspect, an electronic device is provided, and the electronic device includes a processor, and a first screen and a second screen that are formed in a screen-folded state, where the first screen is an inner screen, the second screen is an outer screen, the first screen has an associated first collection component, and the second screen has an associated second collection component; and the processor is configured to: obtain an unlocking intention; invoke, in response to the unlocking intention, the second collection component to collect identity information of a user, and identify an identity of the user based on the identity information collected by the second collection component; and unlock the first screen if the identity of the user is valid and the electronic device meets a condition for using the first screen.

In a possible design, the processor is further configured to unlock the second screen; and the second screen is configured to display a first interface.

In a possible design, the first screen is configured to display a second interface associated with the first interface after the first screen is unlocked.

In a possible design, the processor is further configured to: invoke the first collection component to collect identity information of the user if the identity of the user cannot be identified based on the identity information collected by the second collection component, and identify the identity of the user based on the identity information collected by the first collection component.

In a possible design, that the processor is configured to identify the identity of the user based on the identity information collected by the first collection component includes: identifying the identity of the user based on the identity information collected by the second collection component and the identity information collected by the first collection component.

In a possible design, that the processor is configured to invoke the first collection component to collect identity information of the user if the identity of the user cannot be identified based on the identity information collected by the second collection component includes: invoking the first collection component to collect the identity information of the user if it is detected that an unfolding angle of the electronic device reaches a preset angle and the identity of the user cannot be identified based on the identity information collected by the second collection component.

In a possible design, the second screen is further configured to display a third interface or play a voice prompt, where the third interface is used to prompt the user to unfold the electronic device, and the voice prompt is used to prompt the user to unfold the electronic device.

In a possible design, the processor is further configured to receive a setting instruction that is input by the user, where the setting instruction is used to set any one or more of a preset application, a preset time period, a preset geographical location range, and a preset unlocking instruction.

In a possible design, that the processor is configured to obtain an unlocking intention includes: receiving an unlocking instruction that is input by the user; and that the processor is configured to invoke, in response to the unlocking intention, the second collection component to collect identity information of a user includes: invoking, in response to the unlocking instruction, the second collection component to collect the identity information of the user.

In a possible design, the first collection component and the second collection component are the same or different.

In a possible design, the condition for using the first screen includes one or a combination of a plurality of the following conditions: current time is within the preset time period, a current location is within the preset geographical location range, a new message is received and the new message is a message of the preset application, the electronic device is in a non-folded state, and the unlocking instruction that is input by the user is the preset unlocking instruction.

In a possible design, the preset unlocking instruction includes any one or a combination of a plurality of the following: a gesture, a pattern, a number, a fingerprint, and a voice that are preset for unlocking the first screen.

In a possible design, the first collection component includes any one or more of the following components: a fingerprint collection component, a voiceprint collection component, and an image capture component; and the second collection component includes any one or more of the following components: a fingerprint collection component, a voiceprint collection component, and an image capture component.

For technical effect of the electronic device in the second aspect, refer to the technical effect of the unlocking method in the first aspect. Details are not described herein again.

According to a third aspect, this application provides an electronic device. The electronic device has a function of implementing the unlocking method according to any one of the first aspect and the possible implementations of the first aspect. The function may be implemented by hardware, or may be implemented by hardware executing corresponding software. The hardware or the software includes one or more modules corresponding to the foregoing function.

According to a fourth aspect, this application provides a computer-readable storage medium, including computer instructions. When the computer instructions are run on an electronic device, the electronic device is enabled to perform the unlocking method according to any one of the first aspect and the possible implementations of the first aspect.

According to a fifth aspect, this application provides a computer program product. When the computer program product is run on an electronic device, the electronic device is enabled to perform the unlocking method according to any one of the first aspect and the possible implementations of the first aspect.

According to a sixth aspect, a circuit system is provided. The circuit system includes a processing circuit, and the processing circuit is configured to perform the unlocking method according to any one of the first aspect and the possible implementations of the first aspect.

According to a seventh aspect, an embodiment of this application provides a chip system, including at least one processor and at least one interface circuit. The at least one interface circuit is configured to: perform a transceiver function and send instructions to the at least one processor. When the at least one processor executes the instructions, the at least one processor performs the unlocking method according to any one of the first aspect and the possible implementations of the first aspect.

BRIEF DESCRIPTION OF THE DRAWINGS

FIG. 4 is a schematic diagram of an included angle of a foldable screen according to an embodiment of this application;

FIG. 8-1(1) to FIG. 12(4) are schematic diagrams of interfaces according to an embodiment of this application;

DETAILED DESCRIPTION OF ILLUSTRATIVE EMBODIMENTS

The following describes in detail an unlocking method and an electronic device provided in embodiments of this application with reference to the accompanying drawings.

The unlocking method provided in embodiments of this application may be applied to the electronic device. For example, the electronic device may be specifically a mobile phone, a tablet computer, a wearable device, a vehicle-mounted device, an augmented reality (augmented reality, AR)/virtual reality (VR) device, a notebook computer, an ultra-mobile personal computer (UMPC), a netbook, a personal digital assistant (PDA), an artificial intelligence device, a dedicated camera (for example, a single-lens reflex camera or a card camera), or the like. A specific type of the electronic device is not limited in embodiments of this application.

Figure 2:
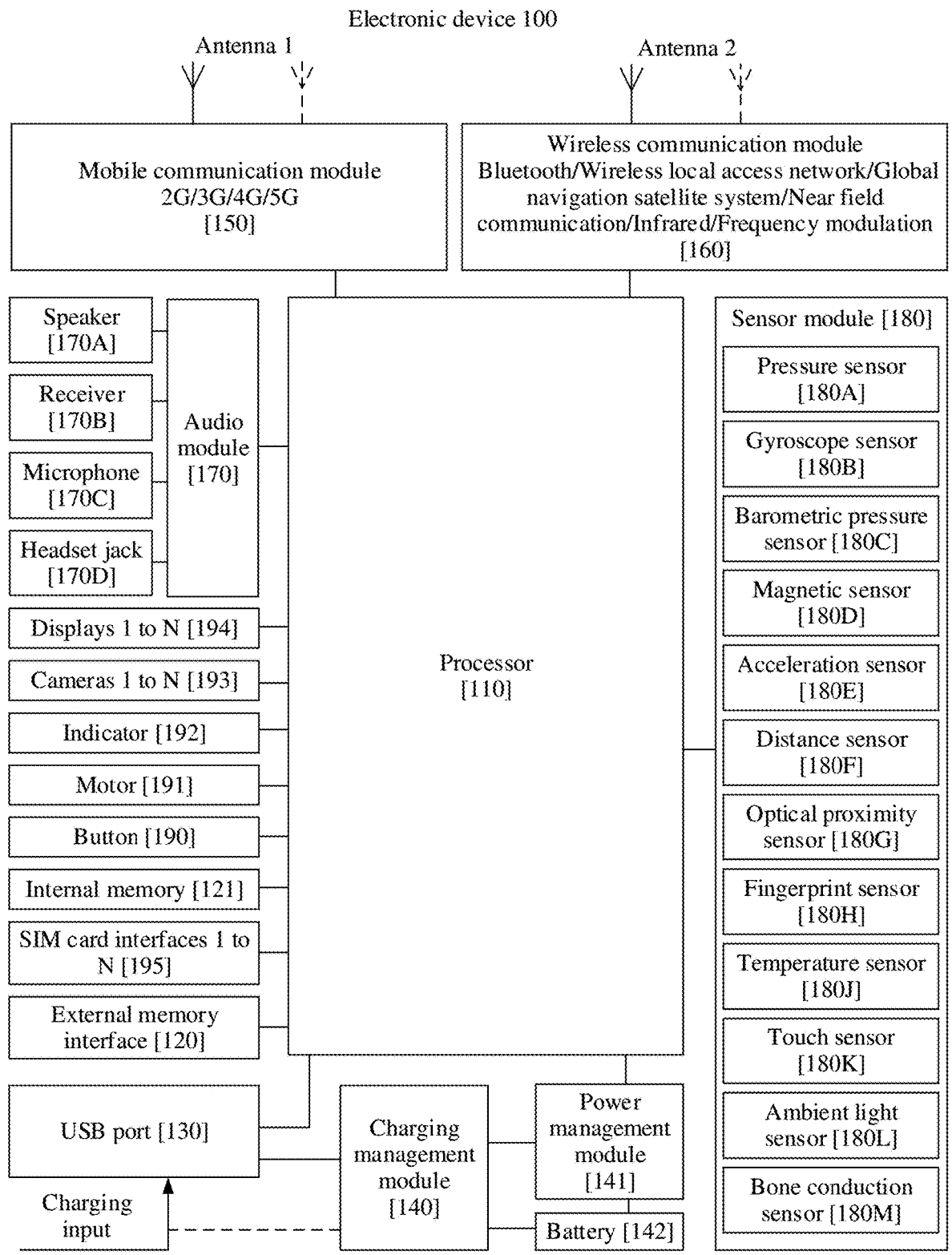
FIG. 2 is a schematic diagram of a structure of an electronic device according to an embodiment of this application.

For example, FIG. 2 is a schematic diagram of a structure of an electronic device mo. The electronic device 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on an instruction operation code and a time sequence signal, to control instruction reading and instruction execution.

A memory may be further disposed in the processor no, and is configured to store instructions and data. In some embodiments, the memory in the processor no is a cache memory. The memory may store an instruction or data that has been used or cyclically used by the processor no. If the processor no needs to use the instruction or the data again, the processor no may directly invoke the instruction or the data from the memory. This avoids repeated access, reduces waiting time of the processor no, and improves system efficiency.

In some embodiments of this application, the processor no is configured to: collect identity information of a user by using a sensor associated with an outer screen, and identify an identity of the user based on the identity information when an unlocking intention of the user is obtained (an unlocking instruction that is input by the user is received). When it is determined that the identity of the user is valid, and it is detected that a terminal meets a condition for using a first screen, it indicates that the user wants to unlock the first screen when unlocking a terminal screen, and the terminal may intelligently and conveniently unlock the first screen for the user. This improves efficiency of interaction between the terminal and the user.

The charging management module 140 is configured to receive charging input from a charger.

The power management module 141 is configured to connect to the battery 142, the charging management module 140, and the processor no. The power management module 141 receives input from the battery 142 and/or the charging management module 140, and supplies power to the processor no, the display 194, the camera 193, and the like.

A wireless communication function of the electronic device 100 may be implemented through the antenna 1, the antenna 2, the mobile communication module 150, the wireless communication module 160, the modem processor, the baseband processor, and the like.

The mobile communication module 150 may provide a wireless communication solution that is applied to the electronic device 100 and that includes 2G, 3G, 4G, 5G, and the like. The wireless communication module 160 may provide a wireless communication solution that is applied to the electronic device 100 and that includes a wireless local area network (WLAN) (for example, a wireless fidelity (Wi-Fi) network), Bluetooth (BT), and the like.

The electronic device 100 implements a display function by using the GPU, the display 194, the application processor, and the like. The GPU is a microprocessor for image processing, and is connected to the display 194 and the application processor. The GPU is configured to perform mathematical and geometric computation, and render an image. The processor no may include one or more GPUs, and the GPUs execute program instructions to generate or change display information.

The display 194 is configured to display an image, a video, and the like. The display 194 includes a display panel. In some embodiments, the electronic device 100 may include one or N displays 194, where N is a positive integer greater than 1.

In some embodiments, the display 194 may display a shooting preview interface, a video recording preview interface, and a shooting interface in a video recording mode, may further display a video play interface during video playback, and the like.

The electronic device 100 may implement a shooting function by using the ISP, the camera 193, the video codec, the GPU, the display 194, the application processor, and the like.

The ISP is configured to process data fed back by the camera 193. For example, during photographing, a shutter is pressed, light is transferred to a camera photosensitive element through a lens, an optical signal is converted into an electrical signal, and the camera photosensitive element transmits the electrical signal to the ISP for processing, to convert the electrical signal into an image visible to a naked eye. The ISP may further perform algorithm optimization on noise, brightness, and complexion of the image. The ISP may further optimize parameters such as exposure and a color temperature of a shooting scenario. In some embodiments, the ISP may be disposed in the camera 193. For example, the ISP may control, based on the photographing parameter, the photosensitive element to perform exposure and photographing.

The camera 193 is configured to capture a static image or a video. An object generates, through a lens, an optical image to be projected to the photosensitive element. The photosensitive element may be a charge coupled device (CCD) or a complementary metal-oxide-semiconductor (CMOS) optoelectronic transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in a format such as RGB or YUV.

In some embodiments, the electronic device 100 may include one or N cameras 193, where N is a positive integer greater than 1. The camera 193 may be located in an edge area of the electronic device, and may be an under-screen camera, or a pop-up camera, or may be a cutout camera. The cameras 193 may include a rear-facing camera, and may further include a front-facing camera. A specific location and form of the camera 193 are not limited in embodiments of this application.

Figures 1, 3:
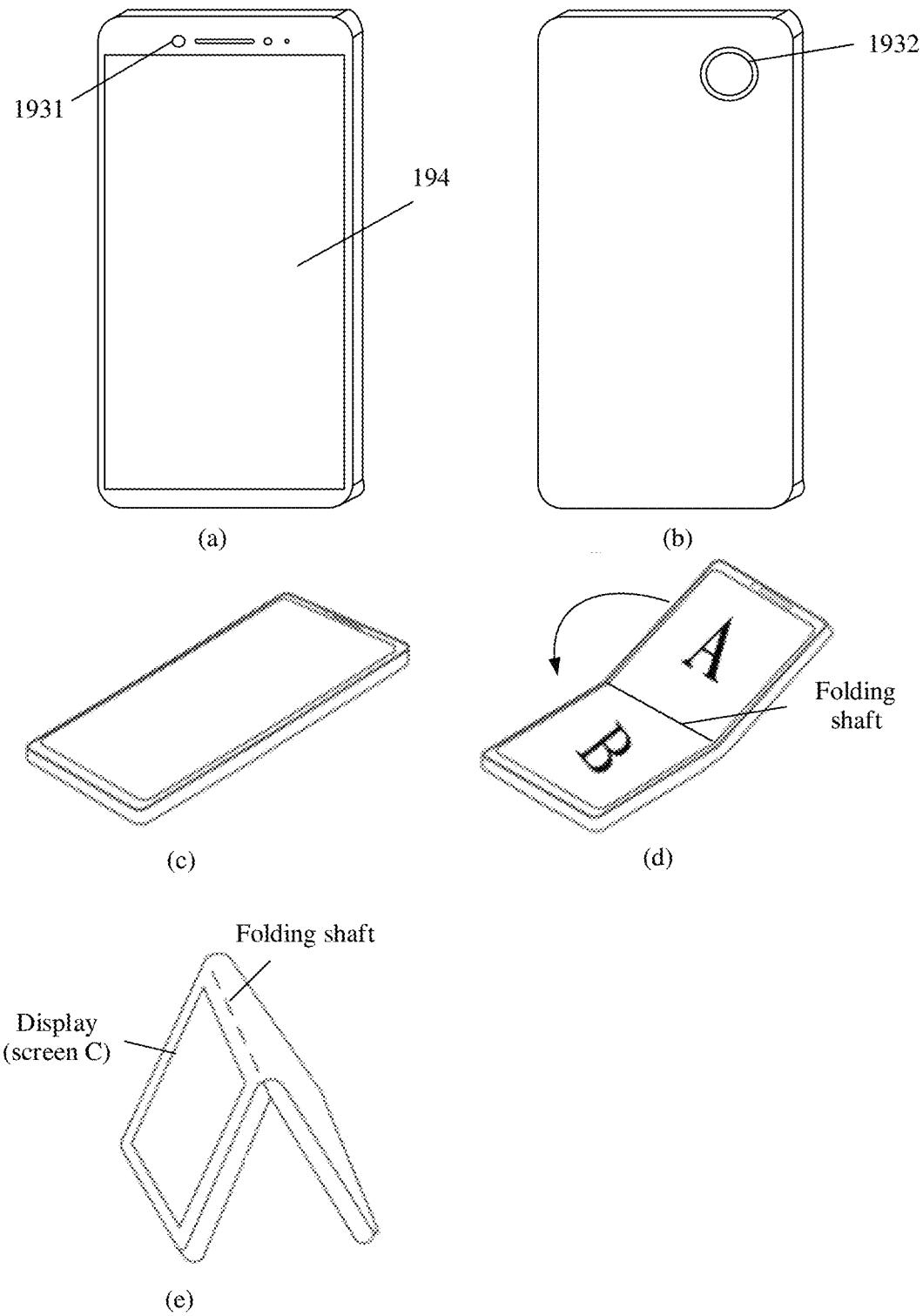
FIG. 3-1 to FIG. 3-4 are schematic diagrams of forms of a foldable screen electronic device according to an embodiment of this application.
Figures 2, 3:
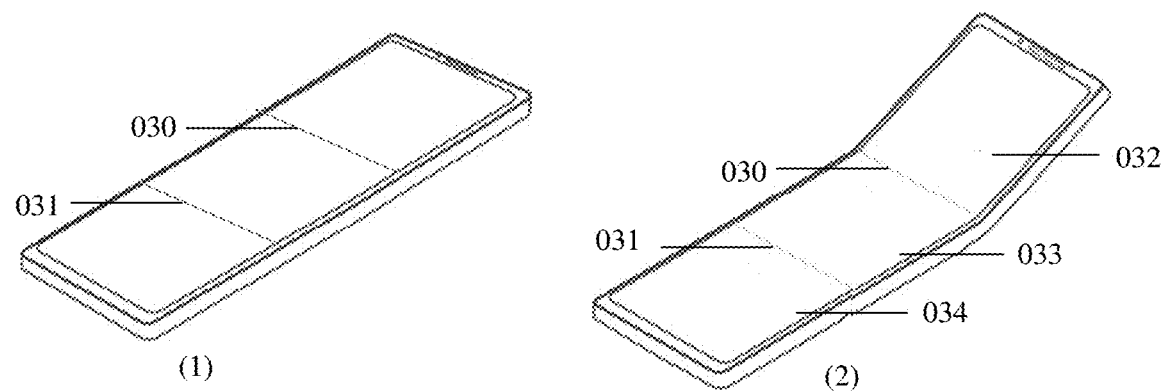
Figure 3:
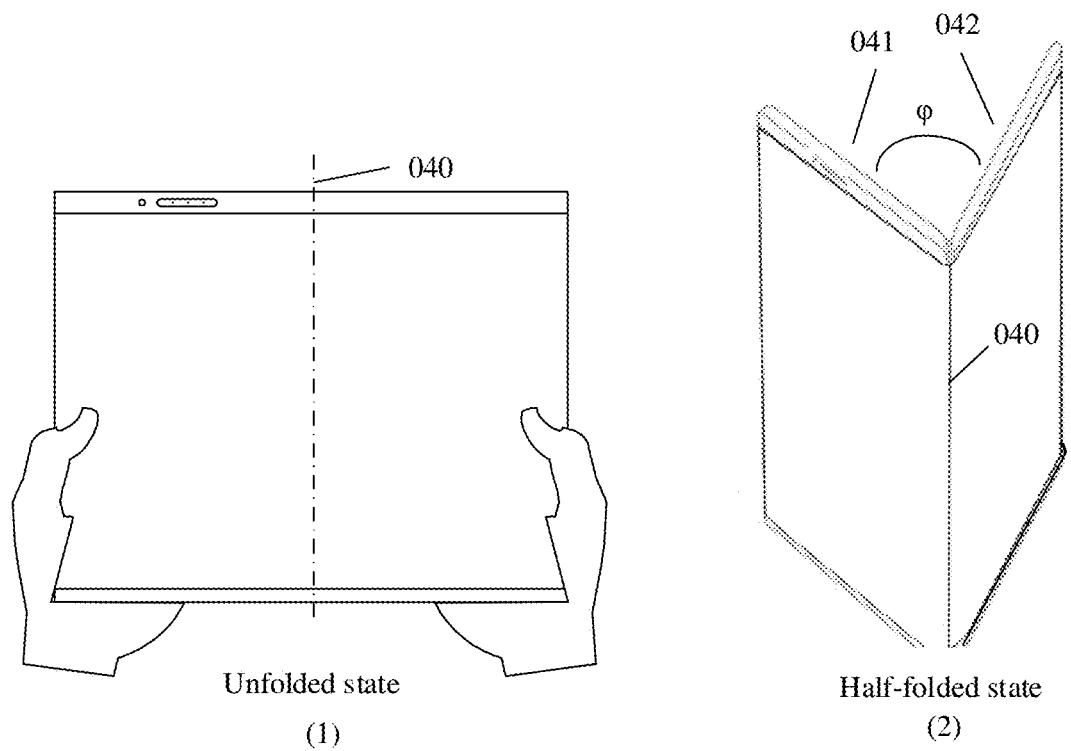

For example, for a layout of cameras on the electronic device 100, refer to FIG. 3-1. A front surface of the electronic device 100 is a plane on which the display 194 is located. As shown in (a) in FIG. 3-1, a camera 1931 is located in the front of the electronic device 100, and therefore the camera is a front-facing camera. As shown in (b) in FIG. 3-1, a camera 1932 is located on the back of the electronic device 100, and therefore the camera is a rear-facing camera.

Optionally, the solution in this embodiment of this application may be applied to an electronic device 100 having a plurality of foldable screens (to be specific, the display is foldable).

In some embodiments, the foldable screen may be a flexible foldable screen. The flexible foldable screen includes a folding shaft made of a flexible material. A part or all of the flexible foldable screen is made of a flexible material. For example, in the flexible foldable screen, only a foldable part (for example, the folding shaft) is made of a flexible material, and the other part is made of a rigid material; or the flexible foldable screen is all made of a flexible material. The foldable screen can be folded along the folding shaft to form at least two sub-screens.

For example, (c) in FIG. 3-1 shows a foldable screen electronic device 100. In response to an operation of a user, as shown in (d) in FIG. 3-1, the foldable screen is folded inward (or folded outward) along a folding shaft, so that the foldable screen forms at least two sub-screens (such as, a sub-screen A and a sub-screen B). Optionally, as shown in (e) in FIG. 3-1, there is a display (for example, a screen C) on a folded outer side. If the electronic device 100 is provided with a camera on a surface on which the screen C is located, in a scenario in which the electronic device 100 is unfolded, as shown in (c) in FIG. 3-1, the camera on the screen C is located on the back of the electronic device boo, and may be considered as a rear-facing camera. In a scenario in which the electronic device 100 is folded, as shown in (e) in FIG. 3-1, the camera on the screen C is located in the front of the electronic device boo, and may be considered as a front-facing camera. In other words, the front-facing camera and the rear-facing camera in this application do not limit properties of the cameras, and are merely a description of a position relationship.

Optionally, the foldable screen of the foldable screen electronic device may form a plurality of (for example, two or three) sub-screens. For example, a flexible foldable screen shown in (1) in FIG. 3-2 may include a fordable line 030 and a fordable line 031. After the flexible foldable screen is longitudinally folded along the fordable line 030, a sub-screen 032, a sub-screen 033, and a sub-screen 034 shown in (2) in FIG. 3-2 may be formed.

Optionally, a screen arrangement manner of the foldable screen electronic device may be, for example, upper-lower screen arrangement shown in (d) in FIG. 3-1, left-right screen arrangement shown in (1) or (2) in FIG. 3-3, or the like. The screen arrangement manner of the foldable screen electronic device is not limited in this embodiment of this application. After a flexible foldable screen shown in (1) in FIG. 3-3 is horizontally folded along a foldable line 040, a sub-screen 041 and a sub-screen 042 shown in (2) in FIG. 3-3 may be formed. For example, the foldable screen device may be a mobile phone in a folded state, and may be a tablet computer in an unfolded state.

An included angle between two adjacent sub-screens in the foldable screen is greater than or equal to 0° and less than or equal to 180°. The included angle between two adjacent sub-screens in the foldable screen may also be referred to as an angle at which the foldable screen device is unfolded, or an unfolded angle of the foldable screen device, or a folded angle of the foldable screen. Based on a range of the included angle between two adjacent sub-screens in the foldable screen, the foldable screen may include a folded state and a non-folded state. The non-folded state includes an unfolded state and a half-folded state.

The unfolded state indicates that the foldable screen is fully unfolded. To be specific, an included angle between two adjacent sub-screens in the foldable screen is 180°, or is close to 180° due to some industrial design factors. For example, (1) in FIG. 3-3 is a schematic diagram of a folded state of a foldable screen.

Figures 3, 4:
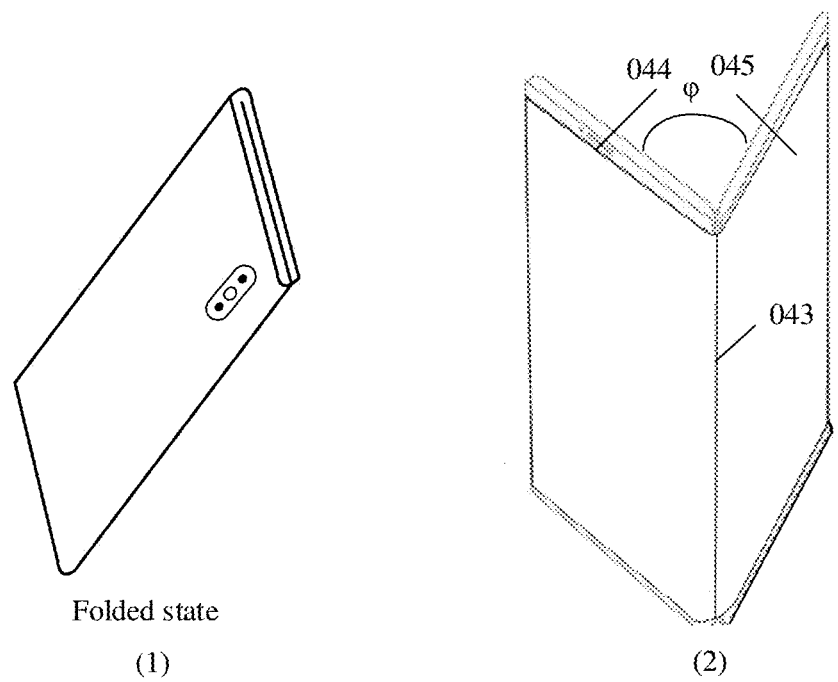
Figure 4:
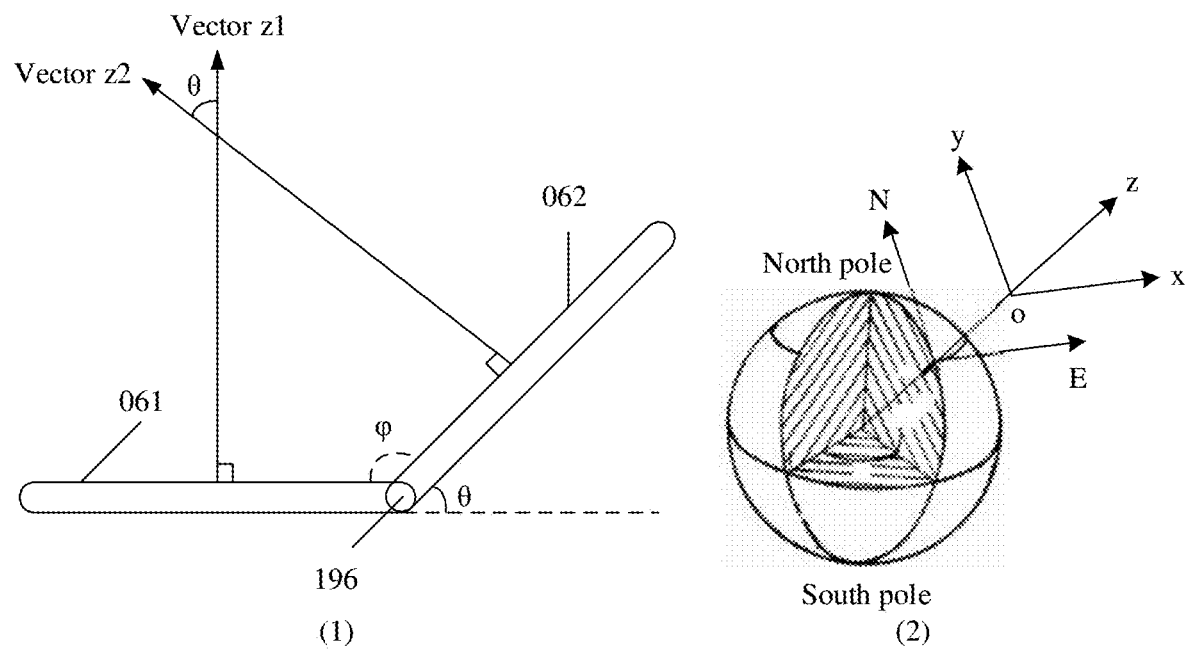

The folded state indicates that the foldable screen is fully folded. To be specific, an included angle between two adjacent sub-screens in the foldable screen is 0° or is close to 0° due to some industrial design factors. For example, (1) in FIG. 3-4 is a schematic diagram of a folded state of a foldable screen, and an included angle between a sub-screen 044 and a sub-screen 045 is 0°.

The half-folded state or the non-folded state may be a state between the unfolded state and the folded state. To be specific, an included angle between two adjacent sub-screens in the foldable screen is between 0° and 180°. For example, (2) in FIGS. 3-3 and (2) in FIG. 3-4 are schematic diagrams of a half-folded state of a foldable screen. For example, as shown in (2) in FIG. 3-3, an included angle φ between a sub-screen 041 and a sub-screen 042 is greater than 0° and less than 180°. The included angle φ may also be referred to as an angle at which the foldable screen device is unfolded, or a folded angle. Optionally, another value range of the included angle φ may be defined to indicate the half-folded state based on an industrial design level, user experience, or the like. For example, the included angle φ is greater than 10° and less than 170°, and accordingly the folded state is defined when the included angle φ is less than or equal to 10°.

In a process of folding or unfolding the foldable screen, an included angle between at least two sub-screens formed by the foldable screen may change. For example, as shown in (2) in FIG. 3-3, in a process of folding the foldable screen, an included angle between a sub-screen 41 and a sub-screen 42 becomes smaller; and in a process of unfolding the foldable screen, an included angle between the sub-screen 41 and the sub-screen 42 becomes larger. It should be understood that the at least two screens formed after the foldable screen is folded may be a plurality of screens that exist independently, or may be a complete screen that is of an integrated structure and is folded into at least two parts.

In some other embodiments, the foldable screen may alternatively be a multi-screen foldable screen. The multi-screen foldable screen may include at least two sub-screens. The at least two sub-screens are independent displays, may be sequentially connected by using a folding shaft, and may separately rotate around the folding shaft, to implement folding of the multi-screen foldable screen. For example, as shown in (2) in FIG. 3-4, a foldable screen device includes a folding shaft 043, a sub-screen 044, and another sub-screen 045 independent of the sub-screen 044. The sub-screen 044 and the sub-screen 045 may rotate around the folding shaft 043. An included angle φ between the sub-screen 044 and the sub-screen 045 may be referred to as an angle at which the foldable screen device is unfolded or a folded angle.

In this embodiment of this application, the foldable screen may be a single-sided screen (that is, only one side may display a user interface), or may be a double-sided screen (that is, both opposite sides may display the user interface).

For the single-sided foldable screen, a case in which the foldable screen is folded towards a side (that is, a front side of the single-sided foldable screen) that can display the user interface may be referred to as forward folding; and a case in which the foldable screen is folded towards an opposite side (that is, a back side of the single-sided foldable screen) that can display the user interface may be referred to as backward folding. For example, (2) in FIG. 3-3 is a schematic diagram of the forward folding, and (2) in FIG. 3-4 is a schematic diagram of the backward folding. Current folding of the foldable screen device may be the forward folding or the backward folding.

Through forward folding or backward folding, the foldable screen may be in a half-folded state. For a half-folded state in a forward folding scenario, an included angle between sides having display functions on two adjacent sub-screens is greater than 0° and less than 180°. For a half-folded state in a backward folding scenario, an included angle between sides having no display function on the two adjacent sub-screens is greater than 0° and less than 180°.

A digital signal processor is configured to process a digital signal, and may process another digital signal other than a digital image signal. For example, when the electronic device 100 selects a frequency, the digital signal processor is configured to perform Fourier transform on frequency energy.

A video codec is configured to: compress or decompress a digital video. The electronic device 100 may support one or more video codecs. Therefore, the electronic device 100 may play or record videos in a plurality of coding formats, for example, moving picture experts group (MPEG)-1, MPEG-2, MPEG-3, and MPEG-4.

An NPU is a neural-network (NN) computing processor, quickly processes input information by drawing on a structure of a biological neural network, for example, by drawing on a transmission mode between human brain neurons, and may further continuously perform self-learning. Applications such as intelligent cognition of the electronic device 100 may be implemented through the NPU, for example, image recognition, facial recognition, voice recognition, and text understanding.

In some embodiments, the NPU identifies whether an image captured by the camera 193 includes a face image by using an image recognition technology. Further, the NPU may further determine whether the identity of the user is valid based on the face image, to determine whether to unlock the screen.

The external memory interface 120 may be configured to connect to an external memory card, for example, a micro SD card, to extend a storage capability of the electronic device 100. The external memory card communicates with the processor no through the external memory interface 120, to implement a data storage function, for example, store files such as music and a video in the external memory card.

The internal memory 121 may be configured to store computer-executable program code. The executable program code includes instructions. The processor no runs instructions stored in the internal memory 121 and/or instructions stored in a memory disposed in the processor, to perform various function applications and data processing of the electronic device mo.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio data into an analog audio electrical signal for output, and is further configured to convert analog audio electrical signal input into digital audio data. The audio module 170 may include an analog-to-digital converter and a digital-to-analog converter. For example, the audio module 170 is configured to convert an analog audio electrical signal output by the microphone 170C into digital audio data. The audio module 170 may be further configured to encode and decode audio data. In some embodiments, the audio module 170 may be disposed in the processor no, or some functional modules in the audio module 170 are disposed in the processor no.

The speaker 170A, also referred to as a "loudspeaker", is configured to convert an analog audio electrical signal into a sound signal. The electronic device 100 may be configured to listen to music or answer a call in a hands-free mode over the speaker 170A.

The receiver 170B, also referred to as an "earpiece", is configured to convert an analog audio electrical signal into a sound signal. When a call is answered or voice information is received through the electronic device 100, the receiver 170B may be put close to a human ear to listen to a voice.

The microphone 170C, also referred to as a "mike" or a "mic", is configured to convert a sound signal into an analog audio electrical signal. When making a call or sending voice information, a user may make a sound near the microphone 170C through the mouth of the user, to input a sound signal to the microphone 170C. The microphone 170C may be a built-in component of the electronic device 100, or may be an external accessory of the electronic device 100.

In some embodiments, the electronic device 100 may include one or more microphones 170C. Each microphone or the plurality of microphones may work together to implement a function of collecting a sound signal in each direction and converting the collected sound signal into an analog audio electrical signal, and may further implement noise reduction, sound source identification, directional recording, or the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The gyroscope sensor 180B may be configured to determine a motion posture of the electronic device 100. In some embodiments, angular velocities of the electronic device 100 around three axes (which are x, y, and z axes) may be determined by using the gyroscope sensor 180B. The gyroscope sensor 180B may be configured to implement image stabilization during shooting. For example, when a shutter is pressed, the gyroscope sensor 180B detects an angle at which the electronic device boo jitters, obtains, through calculation based on the angle, a distance for which a lens module needs to compensate, and allows the lens to cancel the jitter of the electronic device 100 through reverse motion, to implement image stabilization. The gyroscope sensor 180B may be further used in a navigation scenario and a motion-sensing game scenario.

In this embodiment of this application, the gyroscope sensor 180B may be disposed on each sub-screen to measure an orientation (that is, a direction vector of the orientation) of the sub-screen. For example, in the electronic device shown in (2) in FIG. 3-3, both the sub-screen 041 and the sub-screen 042 include the gyroscope sensor 180B, which is respectively configured to measure directions of the sub-screen 041 and the sub-screen 042. The electronic device may determine an included angle between adjacent sub-screens based on an angle change of an orientation of each sub-screen.

For example, the electronic device boo is the foldable screen device shown in FIG. 3-1. A foldable screen of the electronic device boo may be folded to form a sub-screen 061 and a sub-screen 062 shown in (1) in FIG. 4. A gyroscope sensor 1 is disposed on the sub-screen 061, and a gyroscope sensor 2 is disposed on the sub-screen 062.

A coordinate system of the gyroscope sensor may be, for example, but is not limited to a geographical coordinate system. As shown in (2) in FIG. 4, an origin O of a geographic coordinate system is located at a point at which a carrier (namely, a device including a gyroscope sensor, for example, the electronic device 100) is located. Herein, an x axis points at the east (E) along a local latitude line, a y axis points at the north (N) along a local meridian line, and a z axis points upward along a local geographical perpendicular line. The z axis, the x axis, and the y axis form a right-hand rectangular coordinate system. A plane formed by the x axis and the y axis is a local horizontal plane, and a plane formed by the y axis and the z axis is a local meridian plane. Therefore, it may be understood that a coordinate system of the gyroscope sensor is as follows: using the gyroscope sensor as the origin O, using a direction pointing to the east along the local latitude line as the x axis, using a direction pointing to the north along the local meridian line as the y axis, and using a direction pointing upward along the local geographical perpendicular line (that is, in a reverse direction of the geographical perpendicular line) as the z axis.

By using the gyroscope sensor disposed on each sub-screen, the electronic device 100 may obtain, through measurement, a direction vector of an orientation of each sub-screen in a coordinate system of the gyroscope sensor disposed on the sub-screen. For example, as shown in a side view of the electronic device shown in (1) in FIG. 4, a direction vector that is of an orientation of the sub-screen 061 in a coordinate system of the gyroscope sensor 1 and that is obtained by the electronic device through measurement is a vector z1, and a direction vector that is of an orientation of the sub-screen 062 in a coordinate system of the gyroscope sensor 2 and that is obtained by the electronic device through measurement is a vector z2. The electronic device may calculate an included angle θ between the vector z1 and the vector z2 based on the vectors z1 and z2.

It can also be learned from FIG. 4 that, because the vector z1 is perpendicular to the sub-screen 061 and the vector z2 is perpendicular to the sub-screen 062, the included angle between the sub-screen 061 and the sub-screen 062 may be obtained: φ=180°−θ. In other words, the electronic device may determine the included angle φ between the sub-screen 061 and the sub-screen 062 based on the direction vector (namely, the vector z1) that is of the orientation of the sub-screen 061 in the coordinate system of the gyroscope sensor 1 and that is obtained through measurement and the direction vector (namely, the vector z2) that is of the orientation of the sub-screen 062 in the coordinate system of the gyroscope sensor 2 and that is obtained through measurement. When the included angle φ is greater than 0° and less than 180°, the electronic device is currently in a half-folded state corresponding to forward folding. When the included angle φ is greater than 180° and less than 360°, the electronic device is currently in a half-folded state corresponding to backward folding.

It should be noted that locations of the gyroscope sensors disposed on the sub-screen 061 and the sub-screen 062 do not overlap, in other words, origins of the coordinate systems of the gyroscope sensors on the sub-screen 061 and the sub-screen 062 do not overlap. However, axes x, axes y, and axes z in the two coordinate systems are parallel. Therefore, it may be considered that the coordinate systems of the gyroscope sensors disposed on the sub-screen 061 and the sub-screen 062 are parallel. In this way, although the vector z1 and the vector z2 are not in a same coordinate system, the included angle θ between the vector z1 and the vector z2 may be calculated based on Formula (1) because the two coordinate systems have parallel axes.

In some embodiments, the included angle α between the sub-screen 061 and the sub-screen 062 may alternatively be measured through cooperation of one or more other sensors. For example, one acceleration sensor may be disposed on each screen of the foldable screen. The electronic device 100 (for example, the processor no) may measure, by using the acceleration sensor, a motion acceleration generated when each sub-screen is rotated, and then calculate a rotation angle of one screen relative to another screen based on the motion acceleration obtained through measurement, namely, the included angle φ between the sub-screen 061 and the sub-screen 062.

In some other embodiments, the gyroscope sensor may be a virtual gyroscope sensor formed by a plurality of other sensors. The virtual gyroscope sensor may be configured to calculate an included angle between adjacent screens of the foldable screen, namely, the included angle φ between the sub-screen 061 and the sub-screen 062.

In addition, in this embodiment of this application, sensors such as the gyroscope sensor 180B and the acceleration sensor 180E may be further configured to determine statuses of each sub-screen, to determine whether the foldable screen is currently in a forward folding state or a backward folding state.

For example, the gyroscope sensor 180B on the sub-screen may measure an angular velocity of the sub-screen when the sub-screen is folded, and an included angle of the sub-screen relative to a specific coordinate system (for example, a geographic coordinate system) may be obtained by performing integration on the angular velocity, to obtain a posture of the sub-screen. An orientation of the sub-screen may be learned based on the posture of the sub-screen. It may be learned that the foldable screen is currently in the forward folding state or the backward folding state based on the orientation of each sub-screen.

The distance sensor 180F is configured to measure a distance. The electronic device wo may measure a distance in an infrared manner or a laser manner. In some embodiments, in a photographing scenario, the electronic device 100 may measure a distance through the distance sensor 180F to implement quick focusing.

The touch sensor 180K is also referred to as a "touch panel". The touch sensor 180K may be disposed on the display 194, and the touch sensor 180K and the display 194 form a touchscreen, which is also referred to as a "touch control screen". The touch sensor 180K is configured to detect a touch operation performed on or near the touch sensor 180K.

It may be understood that the structure shown in this embodiment of this application does not constitute a specific limitation on the electronic device boo. In some other embodiments of this application, the electronic device 100 may include more or fewer components than those shown in the figure, some components may be combined, or some components may be split, or different component arrangements may be used. The components shown in the figure may be implemented by hardware, software, or a combination of software and hardware.

A software system of the electronic device boo may use a layered architecture, an event-driven architecture, a microkernel architecture, a micro service architecture, or a cloud architecture. In this embodiment, an Android system with a layered architecture is used as an example to illustrate a software structure of the electronic device boo.

Figure 5:
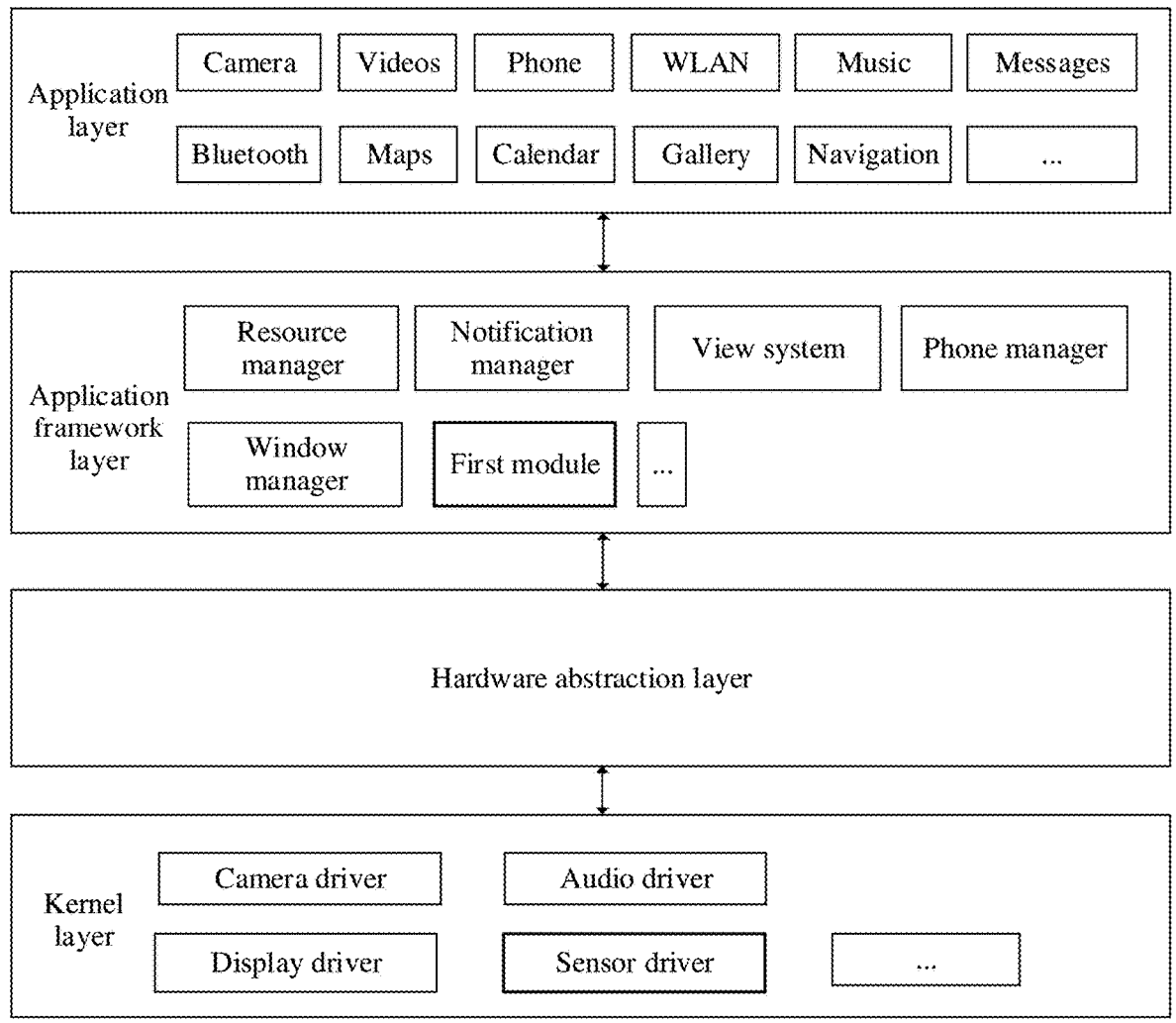
FIG. 5 is a block diagram of a software structure of an electronic device according to an embodiment of this application.

FIG. 5 is a block diagram of a software structure of the electronic device 100 according to an embodiment.

In the layered architecture, software is divided into several layers, and each layer has a clear role and task. The layers communicate with each other through a software interface. In some embodiments, an operating system (for example, an Android system) of an electronic device is divided into four layers: a kernel layer, a hardware abstraction layer (HAL), an application framework layer, and an application layer from bottom to top.

The kernel layer is a layer between hardware and software. The kernel layer includes at least a camera driver, an audio driver, a display driver, and a sensor driver. The sensor driver includes but is not limited to an image sensor driver and an acoustic sensor.

In some embodiments, for example, in a facial recognition scenario, the camera driver at the kernel layer is invoked to turn on a camera. For another example, the image sensor driver invokes an image sensor to complete image capture.

The hardware abstraction layer (HAL) is located between the kernel layer and the application framework layer, and is configured to define an interface for driver application hardware implementation, and convert a value of driver hardware implementation into a software implementation program language. For example, a value of a camera driver is identified, converted into a software program language, and uploaded to the application framework layer, to invoke a corresponding function.

In some embodiments, the HAL may upload a face image captured by the camera 193 to the application framework layer for further processing.

The application framework layer provides an application programming interface (API) and a programming framework for applications at the application layer. The application framework layer obtains an original input event from the kernel layer through the HAL, and identifies a control corresponding to the input event. The application framework layer includes some predefined functions.

As shown in FIG. 5, the application framework layer may include a view system, a phone manager, a resource manager, a notification manager, a window manager, and the like.

In some embodiments, the application framework layer includes a first module. The first module is configured to invoke a corresponding display driver to display a screen based on an unlocking intention of a user. For example, when it is determined that the user wants to unlock an outer screen, the first module invokes a display driver of the outer screen to display an unlocked interface on the outer screen.

Optionally, the first module may be further disposed at another layer, and the first module may be further divided into more submodules. Each submodule is configured to perform a corresponding function.

The view system includes visual controls such as a control for displaying a text and a control for displaying an image. The view system may be configured to construct an application. A display interface may include one or more views. For example, a display interface including a short message notification icon may include a text display view and an image display view.

The phone manager is configured to provide a communication function for the electronic device wo, for example, management of a call status (including answering, declining, or the like).

The resource manager provides, for an application, various resources such as a localized character string, an icon, an image, a layout file, and a video file.

The notification manager enables an application to display notification information in a status bar, and may be configured to convey a notification message. The notification manager may automatically disappear after a short stay without user interaction. For example, the notification manager is configured to notify download completion, provide a message notification, and the like. The notification manager may alternatively be a notification that appears in a top status bar of a system in a form of a graph or a scroll bar text, for example, a notification of an application that is run on the background, or may be a notification that appears on a screen in a form of a dialog window. For example, text information is displayed in the status bar, a prompt sound is issued, an electronic device vibrates, or an indicator light blinks.

The window manager is configured to manage a window program. The window manager may obtain a size of a display, determine whether there is a status bar, perform screen locking, take a screenshot, and the like.

The application layer may include a series of application packages.

As shown in FIG. 5, the application package may include applications such as Camera, Videos, Phone, WLAN, Music, Messages, Bluetooth, Maps, Calendar, Gallery, and Navigation.

The application layer and the application framework layer are run on a virtual machine. The virtual machine executes Java files at the application layer and the application framework layer as binary files. The virtual machine is configured to implement functions such as object life cycle management, stack management, thread management, security and exception management, and garbage collection.

Figure 1A:
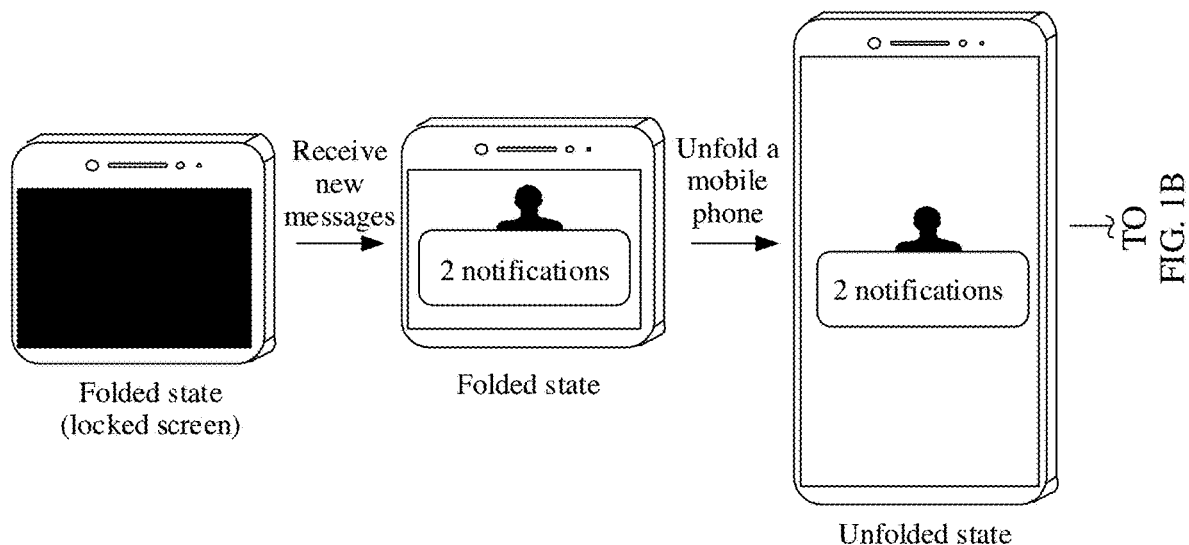
FIG. 1A and FIG. 1B show a process of unlocking a foldable screen mobile phone in the conventional technology.
Figure 1B:
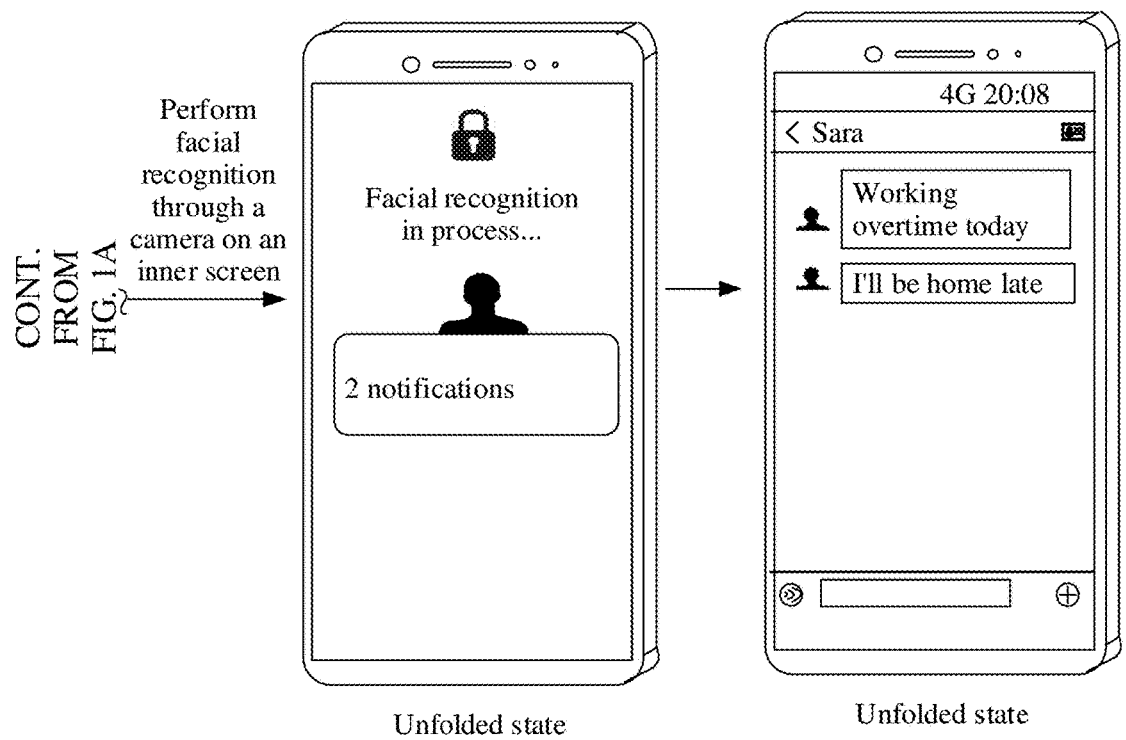

The unlocking method provided in embodiments of this application is applicable to but is not limited to scenarios such as message receiving, music playing, payment, and photographing. The following describes the unlocking method provided in embodiments of this application in different scenarios by using an example in which the electronic device is a mobile phone having the structures shown in FIG. 1A, FIG. 1B, and FIG. 5.

When using a foldable screen device, a user may interact with the mobile phone through an outer screen or an inner screen. Roles of the inner and outer screens may vary in different scenarios. For example, in a forward folding scenario shown in FIG. 3-3, the inner screen may be a sub-screen 041 and a sub-screen 042, and the outer screen may be a screen disposed on the back of a foldable screen. For another example, in a backward folding scenario shown FIG. 3-4, the outer screen may be a sub-screen 044 and a sub-screen 045, and the inner screen may be a screen disposed on the back of the foldable screen. In other words, the scenarios and the like do not constitute a limitation on the inner screen and the outer screen.

In embodiments of this application, when obtaining the unlocking intention of the user, the mobile phone may collect identity information of the user by using a sensor associated with the outer screen, and identify the identity of the user based on the identity information. When it is determined by a terminal that the identity of the user is valid and it is detected that the terminal meets a condition for using a first screen, it indicates that the user wants to unlock the first screen when unlocking a terminal screen. In this case, the terminal may intelligently and conveniently unlock the first screen for the user. It can be learned that, in the technical solution in embodiments of this application, the identity of the user can be identified without fully unfolding the mobile phone by the user, so that unlocking progress can be accelerated, and efficiency of interaction between the terminal and the user can be improved. In addition, when the user wants to unlock the first screen, the first screen can be intelligently unlocked, so that efficiency of interaction between the terminal and the user can be further improved.

Figure 6:
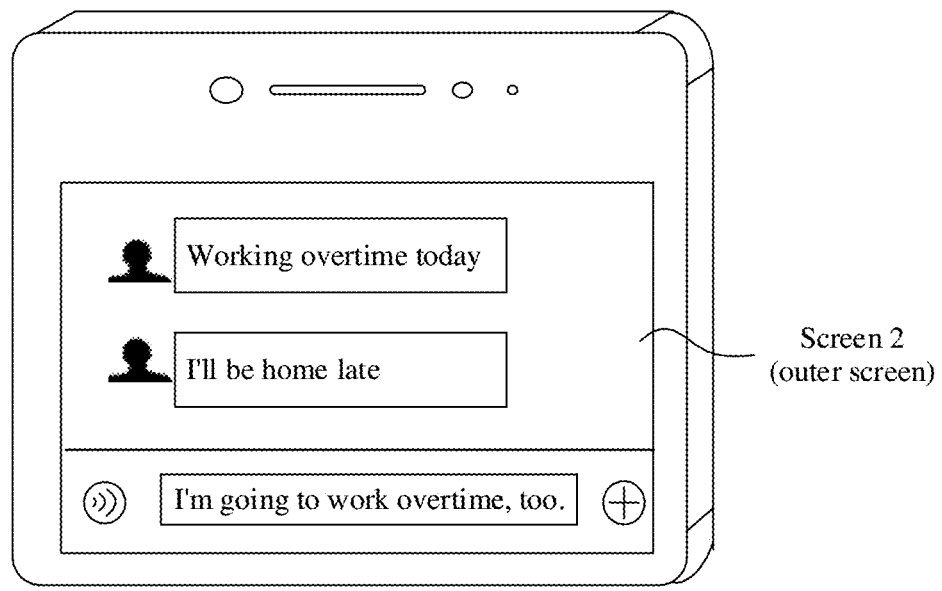
FIG. 6(1) to FIG. 6(5) are a schematic diagram of a group of interfaces according to an embodiment of this application.

For example, the user actively unlocks the mobile phone. For example, the mobile phone is unlocked in a face unlocking manner. As shown in FIG. 6(1), the mobile phone is in a folded state (and a screen is locked). The user may trigger, for example, by double-tapping the screen, the mobile phone to invoke an image sensor in a camera on the outer screen to capture a face image of the user, perform facial recognition on the user based on the face image, to identify the identity of the user, and determine, based on the identity of the user, whether to unlock the screen. Alternatively, when the user has the unlocking intention, the user may not need to double-tap the screen, but may trigger, by performing an operation such as lifting the mobile phone, the mobile phone to invoke the image sensor of the camera on the outer screen to capture the face image of the user. A condition for triggering the mobile phone to invoke the image sensor of the camera on the outer screen to capture the user face image is not limited in this embodiment of this application.

Optionally, in a facial recognition process, the mobile phone may display a text such as "Facial recognition in process . . . " shown in FIG. 6(2), to prompt the user that facial recognition is being performed.

In some cases, when it is determined that the face image captured by the camera on the outer screen is a correct face image, and the mobile phone is in the folded state, it indicates that the user probably wants to unlock the outer screen, and the mobile phone unlocks the outer screen. In this way, the user may interact with the mobile phone through the outer screen. Optionally, after unlocking the outer screen, the mobile phone displays an interface shown in FIG. 6(3). The interface may be an interface displayed by the mobile phone before the screen is locked, or may be a home (home) screen or another interface. An interface presented after the screen is unlocked is not limited in this embodiment of this application. It can be learned that, according to the unlocking method in embodiments of this application, the mobile phone can be unlocked without being unfolded. Then, the user may unfold the mobile phone for use, or use the mobile phone in the folded state based on a requirement.

In some other cases, when it is determined by the mobile phone that the face image captured by the camera on the outer screen is the correct face image, and the mobile phone is not in the folded state, it indicates that the user probably wants to unlock the inner screen this time. In this case, the mobile phone unlocks the inner screen. In this way, the user may interact with the mobile phone through the inner screen. Optionally, after unlocking the inner screen, the mobile phone displays an interface shown in FIG. 6(4) (for example, an interface displayed before the screen is locked). It can be learned that, in the conventional technology, the mobile phone needs to be unfolded to a large angle before starting to invoke a camera on an inner screen to perform facial recognition, and face unlocking takes a long time and unlocking efficiency is low. In the unlocking manner provided in embodiments of this application, when the mobile phone is unfolded to a small angle, the inner screen can be unlocked, so that the user can use the inner screen quickly.

In addition, in a scenario in which the user needs to perform an operation that requires high security, for example, viewing a confidential document, because the mobile phone can be unlocked to view the document by only unfolding the mobile phone to a small angle, a problem of low security caused by unlocking to view the document by unfolding the mobile phone to a large angle can be avoided.

Optionally subsequently, the user may further fully unfold the mobile phone, and use the mobile phone in an unfolded state shown in FIG. 6(5).

Optionally, the mobile phone may enable a multi-task processing function. After the multi-task processing function is enabled, the user may simultaneously enable a plurality of applications on an interface, or display different interfaces of a same application. The user may switch between the plurality of applications or between different functions.

For example, as shown in FIG. 6(5), in addition to displaying a WeChat message from Sara, the inner screen of the mobile phone may further display information such as a contact list, so that the user can view a contact and a new message on a same screen.

Figures 1, 8:
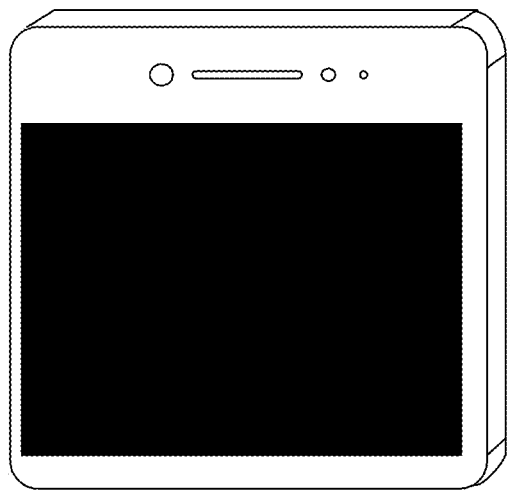
Figures 1, 8:
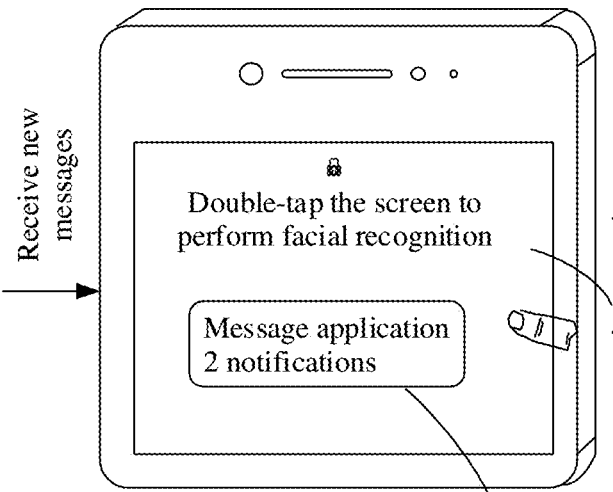
Figures 1, 8:
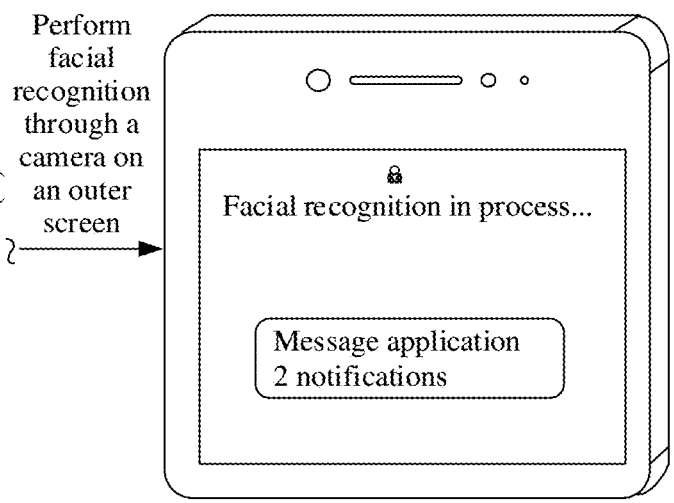
Figures 1, 8:
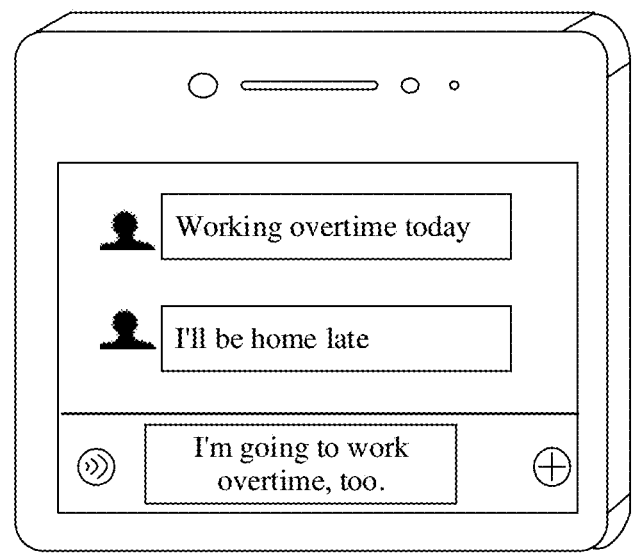
Figures 1, 8:
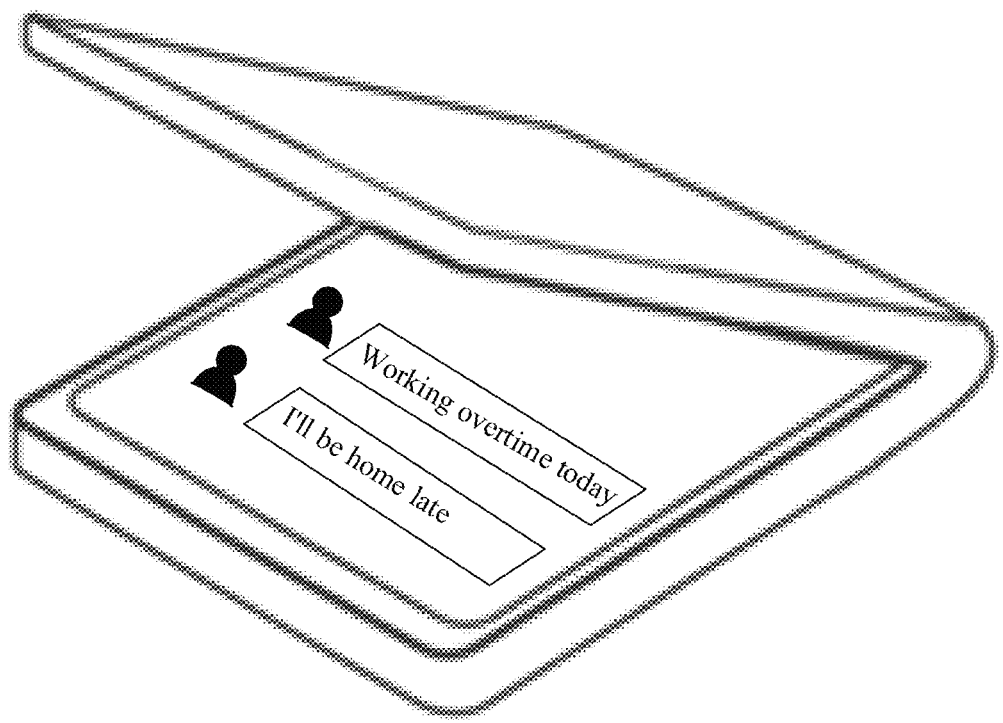
Figure 8:
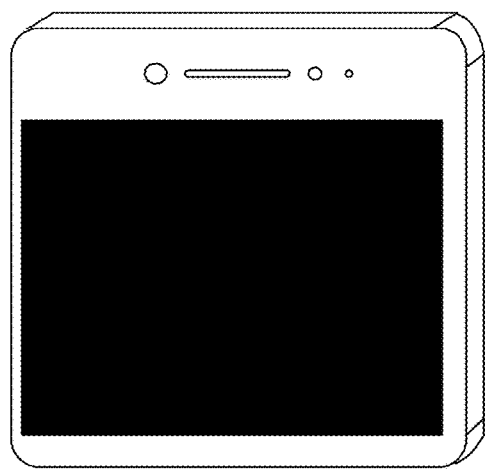
Figure 2:
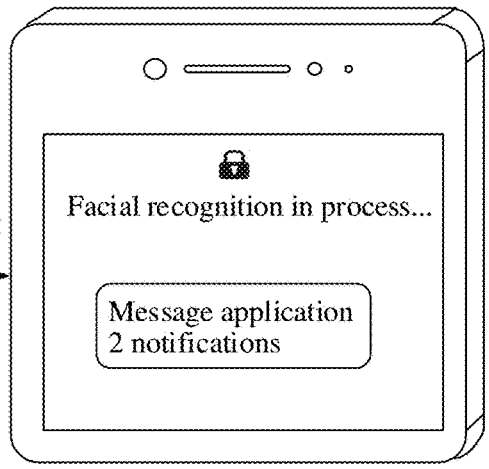
Figures 2, 8:
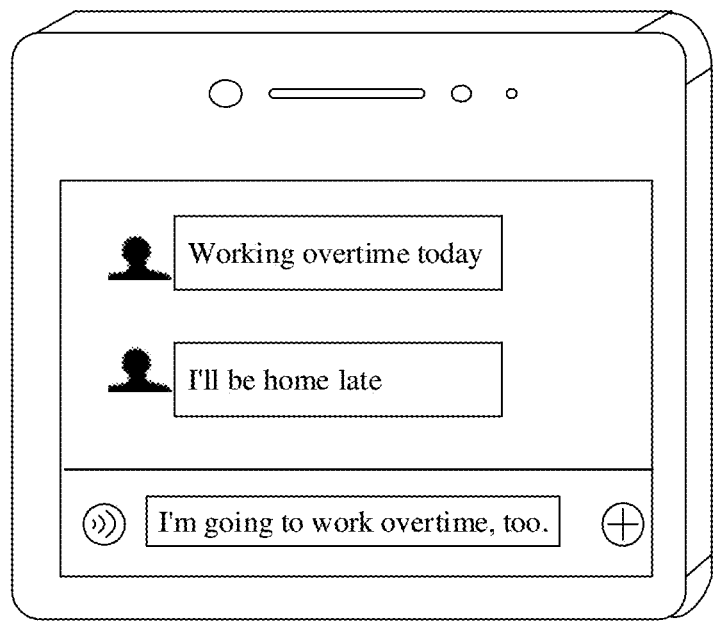
Figures 2, 8:
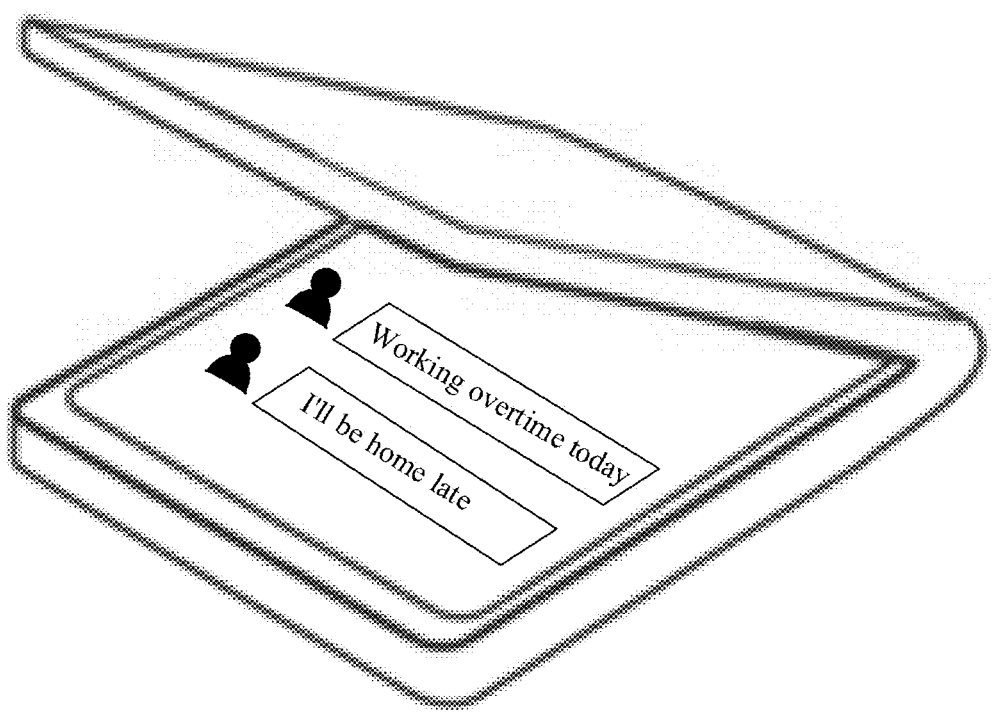
Figures 3, 8:
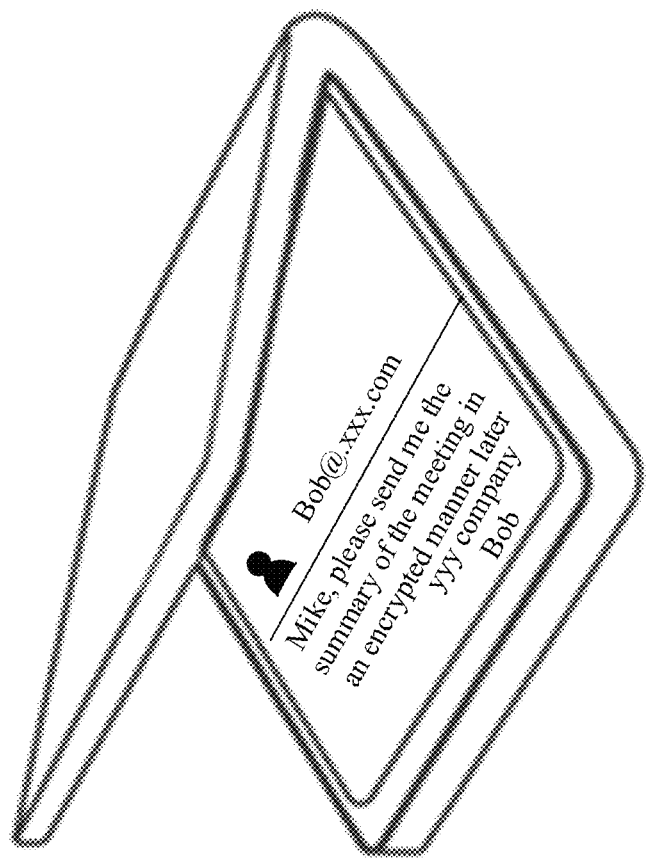
Figures 3, 8:
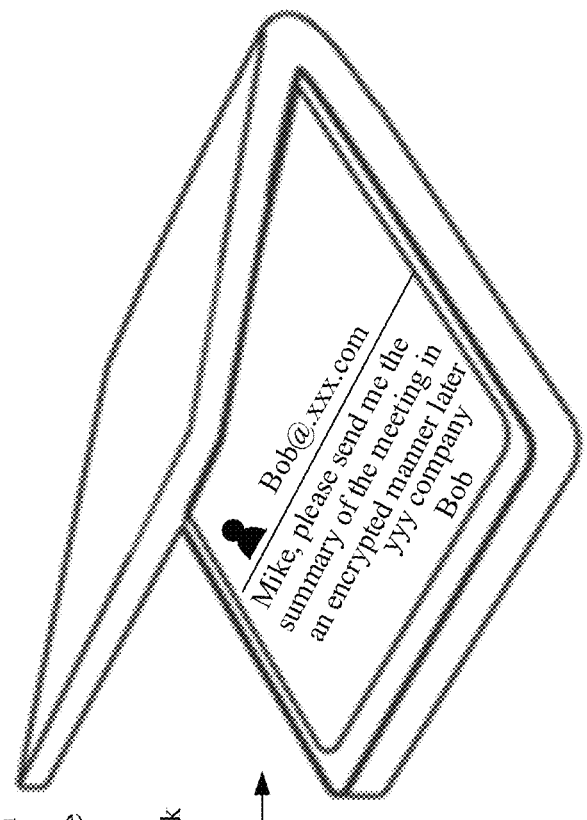
Figures 3, 8:
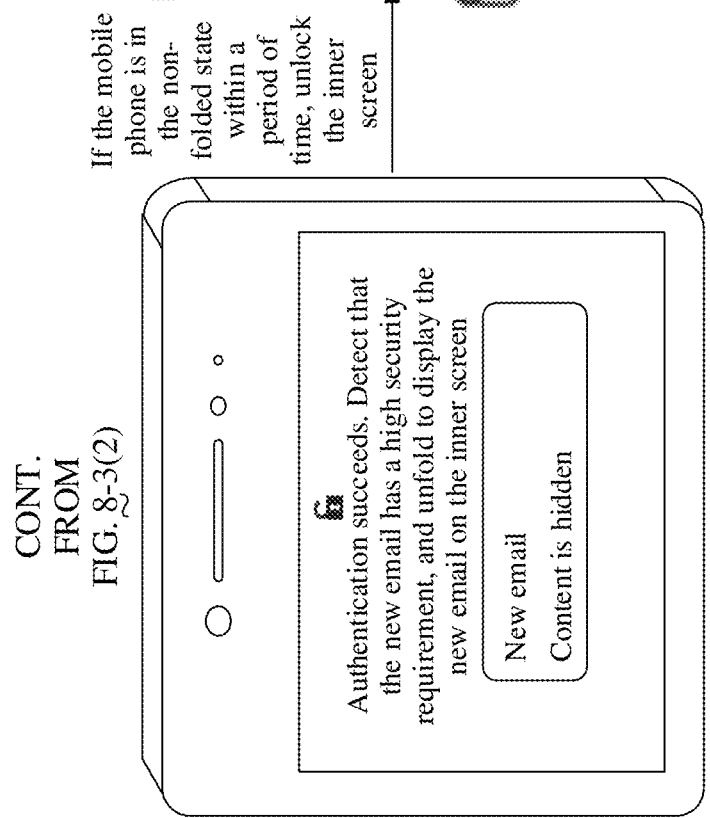
Figures 3, 8:
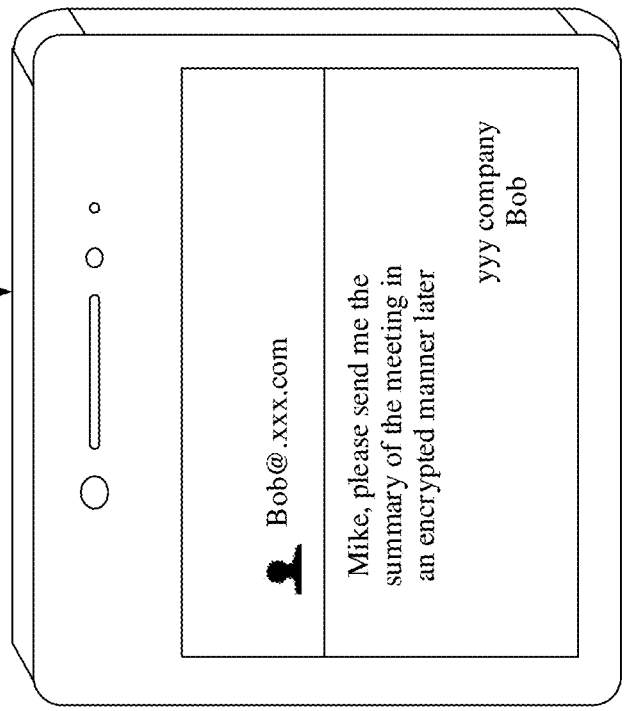
Figures 4, 8:
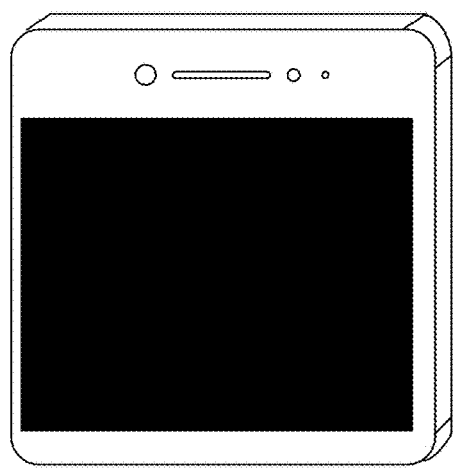
Figures 4, 8:
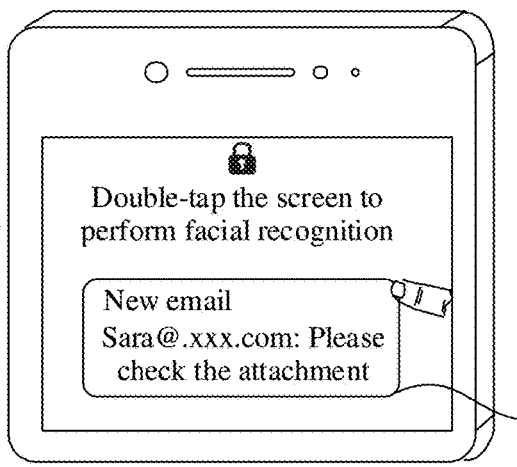
Figures 5, 8:
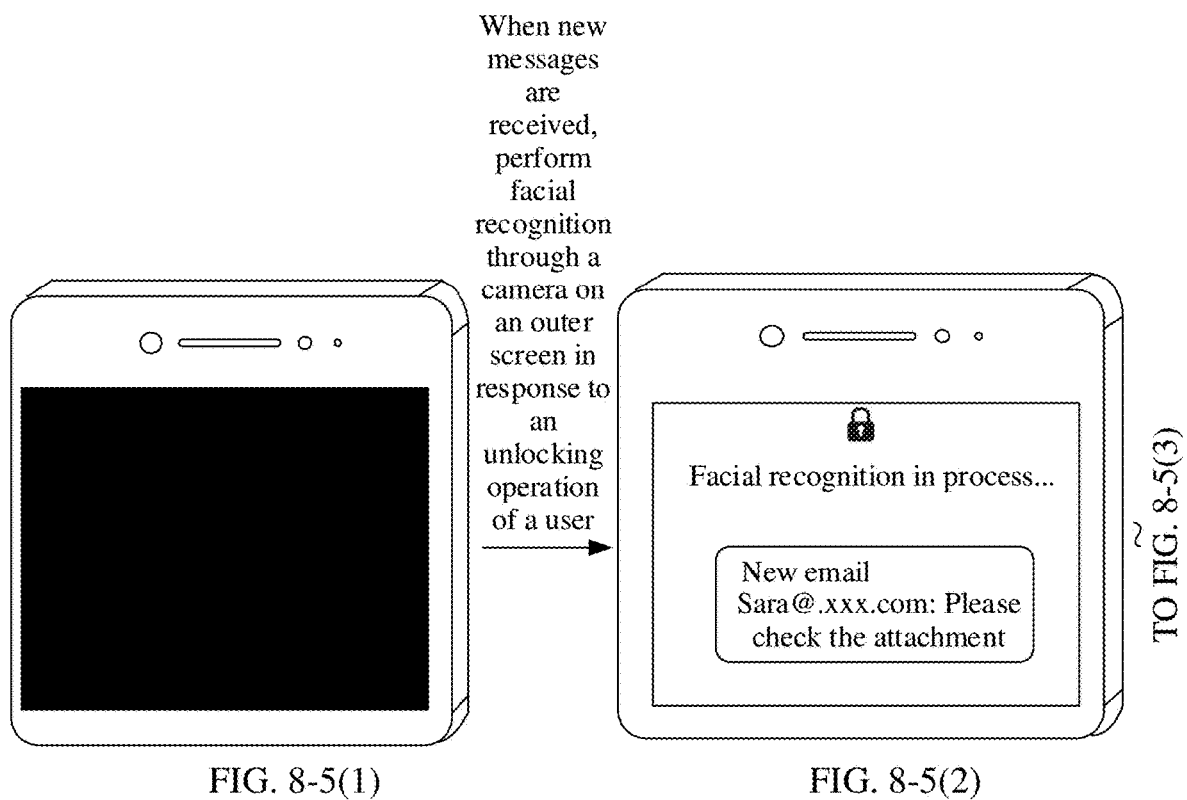
Figures 6, 8:
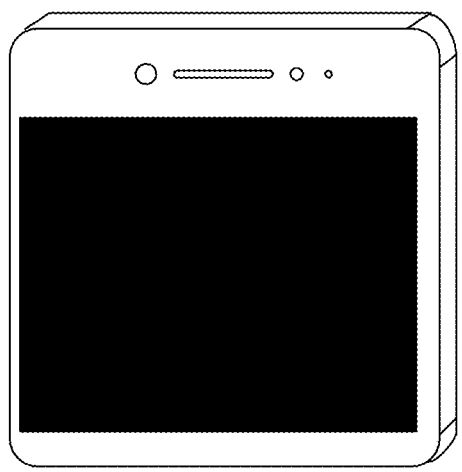
Figures 6, 8:
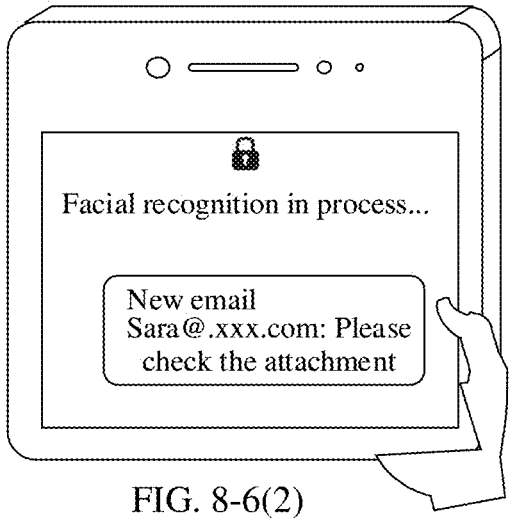
Figures 6, 8:
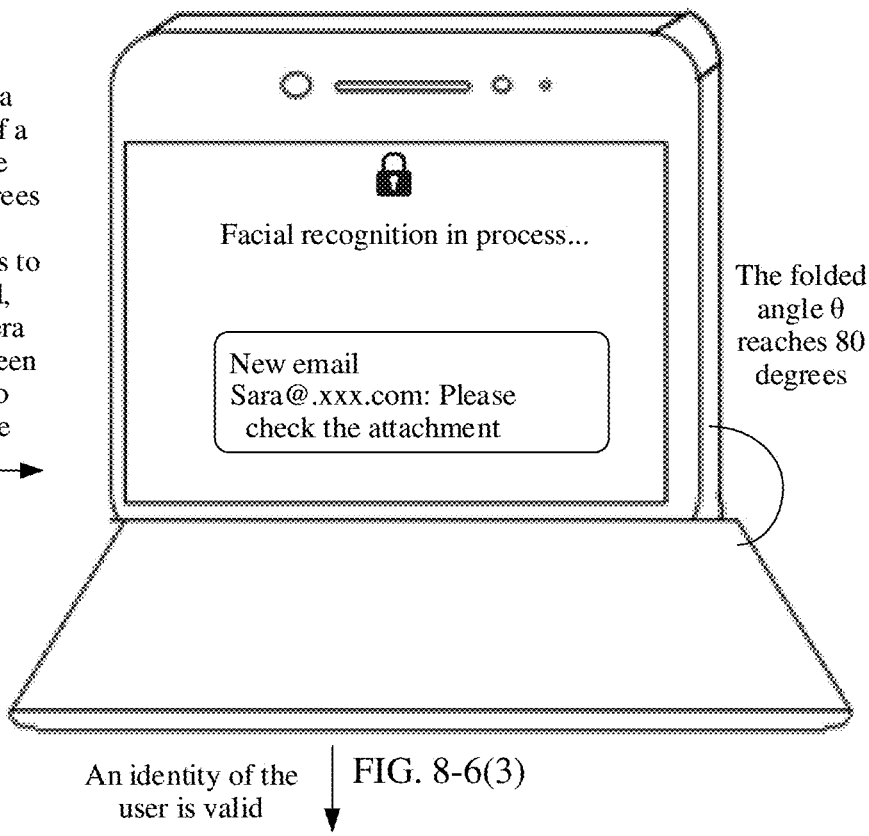
Figures 6, 8:
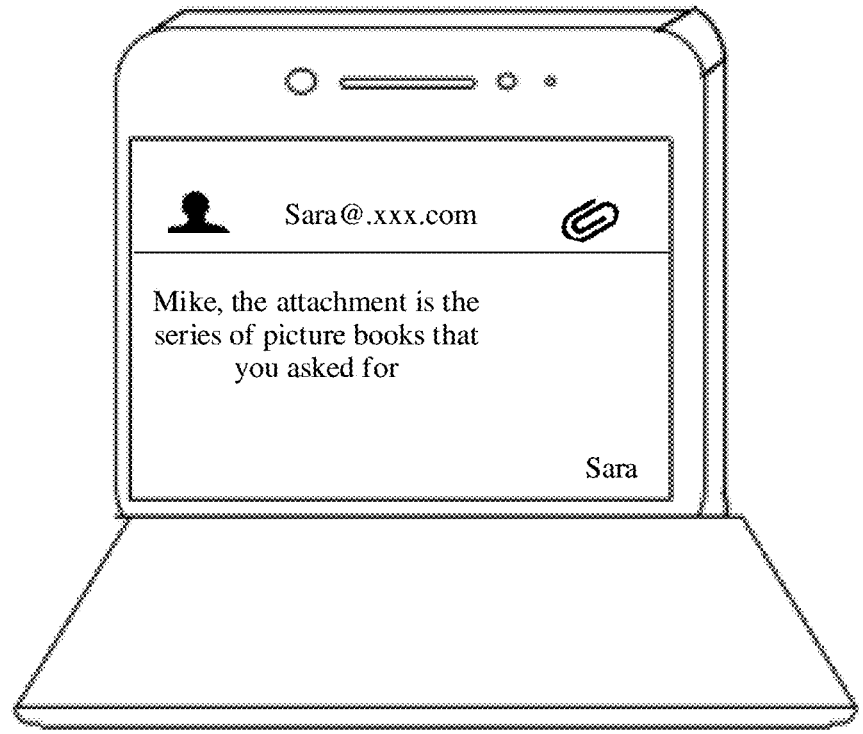
Figures 7, 8:
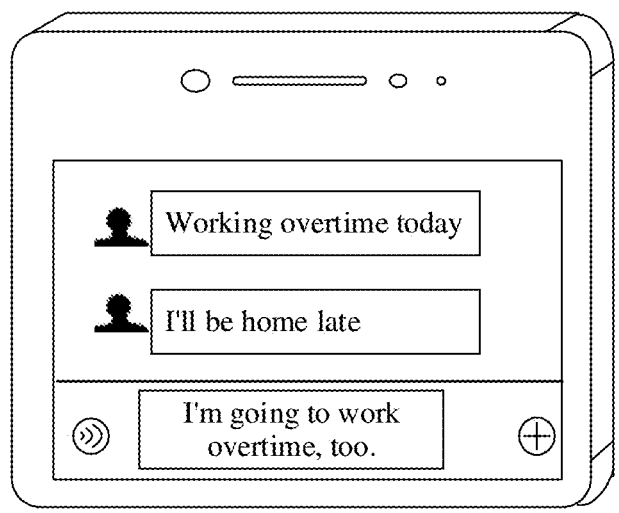

For another example, an interface shown in FIG. 8-3(3) is used as an example. In addition to details of an email, the interface may further display an email list within a period of time in a split-screen manner, so that the user can browse overviews of different emails.

Optionally, split-screen situations of different applications or application combinations may be different. A specific split-screen situation may be set by a system or the user.

It should be noted that, in FIG. 6(1) to FIG. 6(5), the unlocking method in this embodiment of this application is described by using an example in which the mobile phone is unfolded by the user after FIG. 6(2). An occasion at which the mobile phone is unfolded by the user may alternatively be another occasion. For example, the mobile phone is unfolded by the user between occasions shown in FIG. 6(1) and FIG. 6(2).

Figure 7:
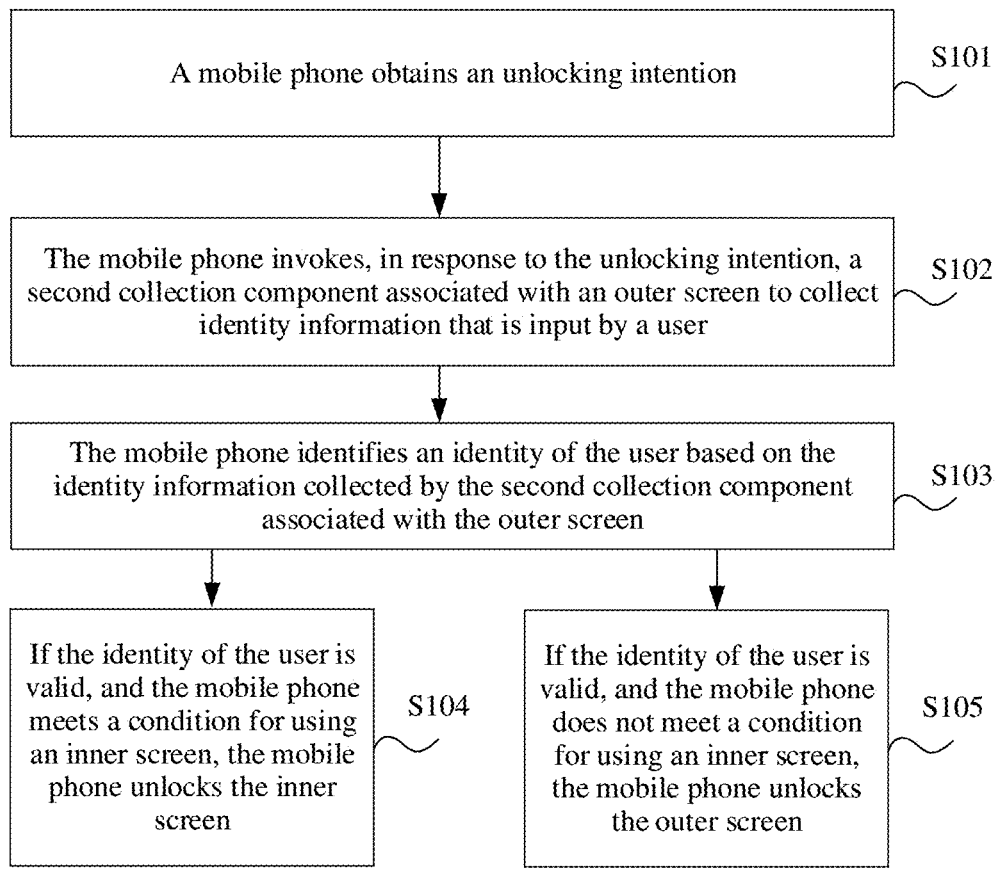
FIG. 7 is a schematic flowchart of an unlocking method according to an embodiment of this application.

In some embodiments, an operation (used for triggering a mobile phone to perform face unlocking or the like) of double-tapping a screen, lifting the mobile phone, or performing voice "unlocking" by a user is referred to as an unlocking operation, and an instruction that is input by the user to the mobile phone by using the unlocking operation is referred to as an unlocking instruction. FIG. 7 is a flowchart of an unlocking method according to an embodiment of this application when an unlocking instruction that is input by a user is detected. The method is applied to an electronic device. The electronic device includes a screen 1 and a screen 2 that are formed in a screen-folded state. For example, the screen 1 (for example, the screen 1 shown in FIG. 6(4)) is an inner screen, and the screen 2 (for example, the screen 2 shown in FIG. 6(3)) is an outer screen. As shown in FIG. 7, the method includes the following steps.

S101: The mobile phone obtains an unlocking intention.

The unlocking intention may be an unlocking instruction that is input by the user. The user inputs the unlocking instruction to the mobile phone by performing an unlocking operation, to indicate that the user has an intention of unlocking a mobile phone screen. For example, the user may input the unlocking instruction by double-tapping a screen interface shown in FIG. 6(2). For another example, the user may input the unlocking instruction in a manner such as a voice.

Alternatively, the unlocking intention may be an unlocking intention sensed and determined by the mobile phone. For example, when the user lifts the mobile phone, the mobile phone may preliminarily determine that the user has the unlocking intention.

A specific type and an implementation of the unlocking instruction are not limited in this embodiment of this application.

S102: The mobile phone invokes, in response to the unlocking intention, a second collection component associated with the outer screen to collect identity information that is input by the user.

Optionally, the mobile phone may be unlocked in one or more unlocking manners in response to the unlocking intention of the user. The unlocking manner includes but is not limited to one or more of the following: face unlocking, fingerprint unlocking, pattern unlocking, password unlocking, and voiceprint unlocking. The face unlocking manner includes but is not limited to three-primary-color (red, green, blue, RGB) face unlocking, infrared face unlocking, and 3D structured light face unlocking. Correspondingly, each unlocking manner may correspond to one or more collection components that may be configured to collect user identity information.

Optionally, a collection component for unlocking may include the collection component configured to collect the user identity information. The user identity information represents an identity of the user. When the user identity information is correct, the mobile phone unlocks the screen. The identity information includes but is not limited to a face image, fingerprint information, voiceprint information, input pattern information, and input password information of the user.

For example, when the unlocking manner is the face unlocking, the collection component for unlocking may be an image capture component, for example, a camera. The image capture component includes but is not limited to an image sensor. The image sensor may be, for example, but is not limited to a complementary metal-oxide-semiconductor (CMOS) sensor.

When the unlocking manner is the fingerprint unlocking, the collection component for unlocking may be a fingerprint collection component, including, for example, a fingerprint sensor configured to collect fingerprint information. The fingerprint sensor may use any type of sensing technology, including but not limited to an optical sensing technology, a capacitive sensing technology, a piezoelectric sensing technology, and an ultrasonic wave sensing technology.

When the unlocking manner is the voiceprint unlocking, the collection component for unlocking may be a voiceprint collection component, for example, an acoustic sensor.

Optionally, the collection component for unlocking may alternatively be a touch panel or the like.

In this embodiment of this application, when the unlock instruction of the user is detected, the mobile phone invokes the second collection component (for example, the image sensor) associated with the outer screen to collect identity information that is input by the user or information used for identity authentication. The second collection component associated with the outer screen may be, but is not limited to an image sensor associated with the outer screen, a fingerprint sensor associated with the outer screen, or the like.

For example, when a set unlocking manner is the face unlocking, the mobile phone invokes a camera associated with the outer screen to capture a face image of the user.

It should be noted that this embodiment of this application is mainly described by using an example in which the face image is captured by using the camera associated with the outer screen, to identify the identity of the user. However, a user identity authentication method in this embodiment of this application is not limited thereto, and is uniformly described herein.

S103: The mobile phone identifies the identity of the user based on the identity information collected by the second collection component associated with the outer screen.

For example, the second collection component that is associated with the outer screen of the mobile phone and that is configured to collect identity information is the image sensor. In a possible implementation, the image sensor of the outer screen transmits a captured face image to a mobile phone processor, and the mobile phone compares the face image with a pre-stored target face image, to identify whether the identity of the user is valid.

S104: If the identity of the user is valid, and the electronic device meets a condition for using the inner screen, the mobile phone unlocks the inner screen.

The condition for using the first screen includes one or a combination of a plurality of the following conditions: current time is within the preset time period, a current location is within the preset geographical location range, a new message is received and the new message is a message of the preset application, the electronic device is in a non-folded state, and the unlocking instruction is a preset unlocking instruction. The preset unlocking instruction includes any one or a combination of a plurality of the following: a gesture, a pattern, a number, a fingerprint, and a voice that are preset for unlocking the first screen.

For example, the condition for using the first screen is that the electronic device is in the non-folded state. The mobile phone may detect whether a foldable screen is in the folded state.

In a possible implementation, the mobile phone detects, by detecting an included angle between a first sub-screen and a second sub-screen of the foldable screen, whether the mobile phone is in the folded state. For example, the mobile phone detects an included angle between a sub-screen A and a sub-screen B shown in (d) in FIG. 3-1, and determines, based on the included angle, whether the mobile phone is in the folded state.

Optionally, a gyroscope is disposed on both the first sub-screen and the second sub-screen, and is configured to measure an orientation (a direction vector) of the sub-screen on which the gyroscope is disposed. The mobile phone determines the included angle between the first sub-screen and the second sub-screen based on a measurement result of the gyroscope.

Optionally, the mobile phone may periodically detect the folded state of the mobile phone, or may trigger, based on an event, to detect whether the mobile phone is in the folded state. For example, when the unlocking instruction that is input by the user is detected, the mobile phone is triggered to detect whether the foldable screen is in the folded state. A trigger condition for triggering detection of whether the foldable screen is in the folded state is not limited in this embodiment of this application.

The mobile phone may determine, based on whether the foldable screen is in the folded state, whether the user wants to unlock the inner screen or the outer screen. Optionally, when the mobile phone is changed from the folded state to the non-folded state, the mobile phone performs step S104 to unlock the inner screen; or when the mobile phone is in the folded state, the mobile phone performs step S105 to unlock the outer screen.

It may be understood that, when it is detected by the mobile phone that the mobile phone is changed from the folded state to the non-folded state, it indicates that the user probably wants to unfold the mobile phone and interact with the mobile phone through the inner screen. In this case, the mobile phone unlocks the inner screen to meet a use requirement of the user. Optionally, a degree to which the foldable screen is unfolded in the non-folded state to identify and determine that a current intention of the user is unlocking the inner screen may be set based on an actual requirement.

S105: If the identity of the user is valid, and the electronic device does not meet the condition for using the inner screen, the mobile phone unlocks the outer screen.

For example, as shown in FIG. 6(3), when it is determined that the identity of the user is valid and the electronic device is in the folded state, it indicates that the user wants to unlock the outer screen, and the mobile phone unlocks the outer screen.

The following describes the unlocking method provided in this embodiment of this application with reference to a specific scenario.

1. Scenario of Receiving a New Message

As shown in FIG. 8-1(1), after the mobile phone is in a folded state and a screen-locked state, the mobile phone receives two notification messages of WeChat.

Optionally, before unlocking, detailed content of the message is not displayed (for example, partial information of the message is displayed, for example, a quantity of messages is displayed), and the detailed content of the message is displayed after the unlocking.

In some embodiments, when the mobile phone receives a new message in the screen-locked state, the mobile phone may be triggered to display a message reminder interface 401 shown in FIG. 8-1(2), to prompt the user that the new message is received.

Optionally, the message reminder interface 401 may not display information such as message content or a sender, and display only information that does not involve privacy data, such as an application to which the received new message belongs and a quantity of new messages, to reduce a probability of user privacy leakage.

Alternatively optionally, the message reminder interface 401 may display the sender, and does not display information such as specific content of the message, so that the user chooses, when knowing the sender, whether to unlock the mobile phone to view the message. In addition, because the specific content of the message is not displayed, the probability of privacy leakage can be reduced as much as possible.

Alternatively optionally, the message reminder interface 401 may display most information of the message, including but not limited to the message content, the sender, and the like. Optionally, the application to which the received message belongs is a preset type of application. The preset type of application includes, for example, but is not limited to an application having a low security requirement. The application having a low security requirement may be, for example, an application that does not involve user privacy information, or an application that involves few user privacy information. The application having a low security requirement may be a default application having a low security requirement in the system (for example, an application that does not read information such as a phone number or a location of the user), or an application set by the user.

Optionally, message reminder interfaces of different applications may include different information. In a possible implementation, for messages of some private application, the mobile phone erases private information from the messages when prompting the user that the new messages are received. For messages of non-private applications, the mobile phone may display most information corresponding to the messages when prompting the user that the new messages are received. For example, for a phone application, incoming call information of a part of contacts may be set to be invisible. In this way, when the part of contacts make incoming calls or calls are made to the part of contacts, a part of information about the part of contacts is not displayed on a call screen or the like, including but not limited to one or more of the following information: phone numbers of the contacts and names of the contacts. In addition, a part of information of the part of contacts may not be displayed in a call record, including but not limited to one or more of the following information: the phone numbers of the contacts, call duration, locations to which the phone numbers of the contacts belong, status of incoming or outgoing calls, and call dates. Alternatively, the call records of the part of contacts are hidden.

Specific display content of the message reminder interface 401 is not limited in this embodiment of this application.

In a scenario in which the mobile phone receives the new message, if the user has the unlocking intention, the user turns on the screen, for example, by double-tapping the screen and triggers the mobile phone to invoke the camera on the outer screen to capture the face image of the user, to perform facial recognition on the user, to identify the identity of the user, and determine, based on the identity of the user, whether to unlock the screen. Alternatively, when the user has the unlocking intention, the user may not need to double-tap the screen, but may trigger, by performing an operation such as lifting the mobile phone, the mobile phone to turn on the screen and invoke the camera on the outer screen to capture the face image of the user. In this embodiment of this application, a condition for triggering the mobile phone to invoke the camera on the outer screen to capture the face image of the user is not limited.

In some other embodiments, when the mobile phone receives the new message in the screen-locked state, the mobile phone is not triggered to display the message reminder interface 401 shown in FIG. 8-1(2), but the user is reminded, in another manner (for example, a non-interface manner), that the new message is received. For example, a mobile phone indicator blinks, or the mobile phone vibrates or rings. In this case, the screen of the mobile phone may still be in a black screen state. When the user has the unlocking intention, the user may trigger the mobile phone to turn on the screen by performing an operation such as pressing a power button, lifting the mobile phone, or double-tapping the screen, and invoke the camera on the outer screen to capture the face image of the user, to perform identity authentication on the user. Optionally, in an identity authentication process, the mobile phone may display an interface shown in FIG. 8-1(3), to prompt the user that the mobile phone is performing identity authentication.

In some other embodiments, the mobile phone may prompt the user that the new message is received in a plurality of manner. For example, the indicator blinks and the mobile phone vibrates and displays the message reminder interface shown in FIG. 8-1(2). A manner in which the mobile phone prompts the new message is not limited in this embodiment of this application.

When it is determined that the face image captured by the camera on the outer screen is a correct face image, and the mobile phone is in the folded state, it indicates that the user probably wants to unlock the outer screen, and the mobile phone unlocks the outer screen. In this way, the user may interact with the mobile phone through the outer screen. For example, the user reads a received WeChat notification and replies a WeChat message through the outer screen. Optionally, after unlocking the outer screen, the mobile phone displays a related interface of a new message shown in FIG. 8-1(4), where the interface includes message details.

When it is determined by the mobile phone that the face image captured by the camera on the outer screen is the correct face image, and the mobile phone is not in the folded state, it indicates that the user probably wants to unlock the inner screen this time. In this case, the mobile phone unlocks the inner screen. In this way, the user may interact with the mobile phone through the inner screen, for example, reading specific WeChat notification content and replying to the WeChat message through the inner screen.

In some cases, if the user performs an operation such as tapping a control 402 on the interface shown in FIG. 8-1(2), after unlocking the inner screen, the mobile phone may display a related interface of the new message shown in FIG. 8-1(5). If the user does not tap the control 402, after unlocking the inner screen, the mobile phone may enter a desktop or an application interface that is previously exited, or display another interface.

In some other cases, that the user may be inconvenient to input a related operation instruction of the new message is considered. The mobile phone may determine, based on an unlocking requirement and an unlocking occasion (for example, after receiving the new message) of the user, that the unlocking intention of the user is to view the new message, and display a related interface of the new message after the screen is unlocked.

In this embodiment of this application, the related interface of the new message may be an interface including message details. The message details include but are not limited to one or more of the following: message content, a sender, a sender avatar, and sending time.

In some embodiments, the mobile phone displays the related interface of the new message after unlocking the screen in response to an operation instruction (for example, but not limited to an operation of tapping the new message) of the user for the new message. An interface display manner may be applied to one or more of the inner screen or the outer screen. If the user does not perform the operation on the new message, the desktop or the previous application interface may be displayed.

For example, as shown in FIG. 8-1(2), when the user wants to view two WeChat message notifications, the user may tap the control 402, to trigger the mobile phone to display, after unlocking the screen, the WeChat message interface shown in FIG. 8-1(4).

In some other embodiments, the user may be inconvenient to input the related operation instruction of the new message. For example, the user does not tap the control 402 shown in FIG. 8-1(2). In this case, that the new message is prompted to the user in time or another factor is considered, even if the mobile phone does not detect the operation instruction of the user for the new message, the mobile phone may display the related interface of the new message after unlocking the screen. The interface display method may be applied to one or more of the inner screen or the outer screen.

For example, still refer to FIG. 8-1(1) and FIG. 8-1(2). The mobile phone receives the new message in the screen-locked state, and optionally displays the message reminder interface 401. If the user wants to view the two WeChat notifications, the user may lift the mobile phone (the user does not tap the control 402). The mobile phone identifies the operation of lifting the mobile phone by the user, and determines that the user currently wants to unlock the mobile phone. In addition, because the user unlocks the mobile phone after the mobile phone receives the WeChat notification message, the mobile phone determines that a use intention of the user is to view the WeChat notification message. Therefore, in a process of lifting the mobile phone, the mobile phone invokes the camera on the outer screen to complete facial recognition, unlocks the screen based on a facial recognition result, and displays the WeChat message interface shown in FIG. 8-1(4).

It can be learned that, in some scenarios in which the user is inconvenient to perform the operation on the new message, the mobile phone may determine, based on the unlocking requirement and the unlocking occasion (for example, after receiving the new message) of the user, that the unlocking intention of the user is to view the new message, and display the related interface of the new message after the screen is unlocked. In this way, interaction experience between the user and the mobile phone can be improved.

2. Payment Scenario

Figures 8, 9:
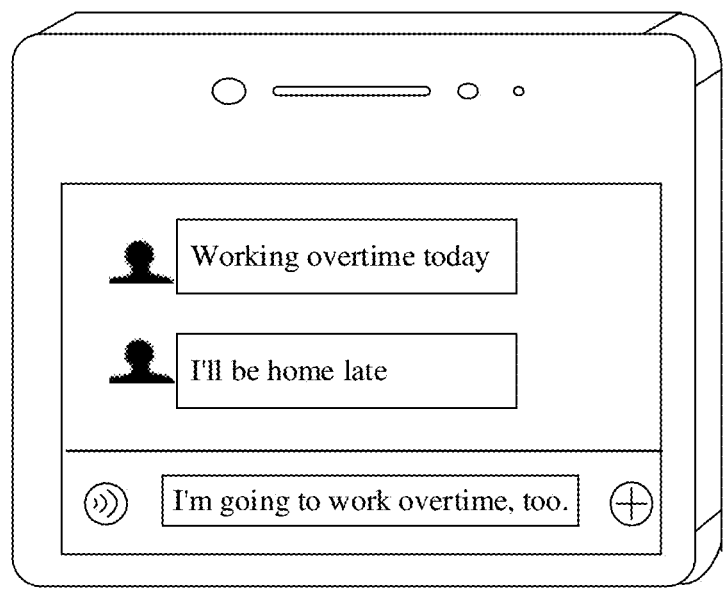

In some scenarios, as shown in FIG. 9-1(1), the mobile phone is in the screen-locked state, and the user needs to complete identity authentication to perform payment. As shown in FIG. 9-1(2), the mobile phone determines whether the identity of the user is valid through the face image captured by the camera on the outer screen. If it is determined that the identity of the user is valid, and the user does not unfold the mobile phone, the mobile phone determines that an unlocking purpose of the user is unlocking the outer screen, and the mobile phone unlocks the outer screen, and may display an interface shown in FIG. 9-1(3).

In some embodiments, for ease of use by the user, the mobile phone may display one or more functions of an application on the desktop in a form of, for example, shortcut icons of the functions. Subsequently, the user may quickly use the corresponding functions by operating the shortcut icons of the functions.

For example, as shown in FIG. 9-1(3), after unlocking the outer screen, the mobile phone displays a shortcut icon of a payment collection function of a wallet application. The user may trigger, by operating the shortcut icon (for example, tapping the shortcut icon), the mobile phone to display a payment QR code shown in FIG. 9-1(4). Then, the user may use the payment QR code for payment.

In some other scenarios, the user may choose to complete a payment operation through the inner screen of the mobile phone. As shown in FIG. 9-1(1) and FIG. 9-1(2), the user unlocks the mobile phone in the facial recognition manner. When it is determined by the mobile phone that the identity of the user is valid, and the mobile phone is not in the folded state, it indicates that the user wants to unlock the inner screen, and the mobile phone unlocks the inner screen, and may display an interface shown in FIG. 9-1(5). The interface includes an icon of the wallet application (or includes an icon of a payment function). Subsequently, the user may use one or more functions (for example, a collection and payment function) of the wallet application by performing an operation such as tapping the icon of the wallet. Optionally, the user may further choose to unfold the mobile phone to another angle, for example, fully unfold the mobile phone for use. For example, the mobile phone enters an interface of the wallet application in response to tapping, by the user, the icon of the wallet application shown in FIG. 9-1(5). The mobile phone may display a payment and collection function interface shown in FIG. 9-1(6) in response to an operation of selecting, by the user, the payment and collection function on the wallet application interface.

Optionally, in the payment scenario in this embodiment of this application, a payment manner includes but is not limited to QR code payment, near field communication (near field communication, NFC) payment, and barcode payment.

The NFC payment is used as an example. As shown in FIG. 9-2(1), the mobile phone touches an NFC bus card in the folded state (and in the screen-locked state), and displays an interface shown in FIG. 9-2(2). The user may trigger the mobile phone to verify the identity of the user by performing an operation such as clicking a "recharge" option. Optionally, the mobile phone invokes the camera on the outer screen to perform facial recognition, and may display an interface shown in FIG. 9-2(3). When it is determined by the mobile phone that the identity of the user is valid and the mobile phone is in the folded state, it indicates that the user wants to unlock the outer screen. In this case, the mobile phone unlocks the outer screen, and may display an interface shown in FIG. 9-2(4). The user may select a corresponding recharge amount through the interface to recharge.

3. Photographing Scenario

Figures 8, 9, 10:
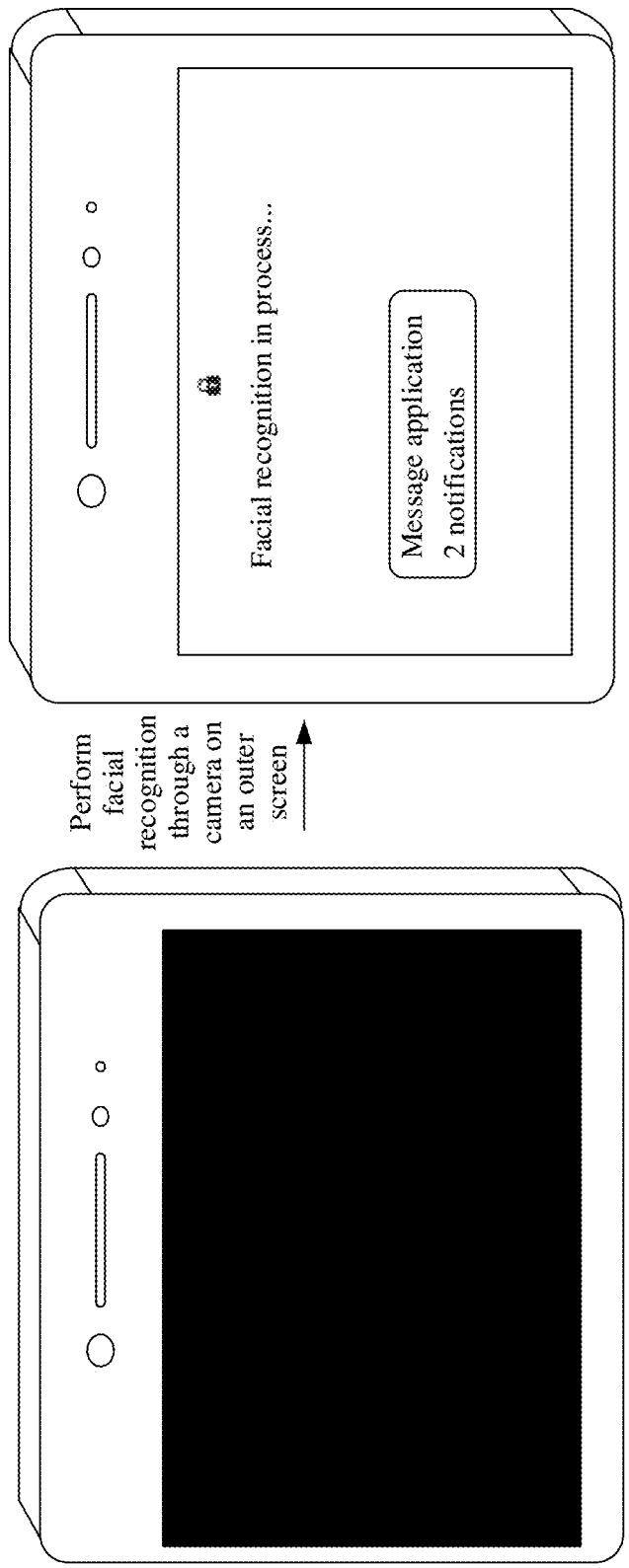
Figures 1, 9:
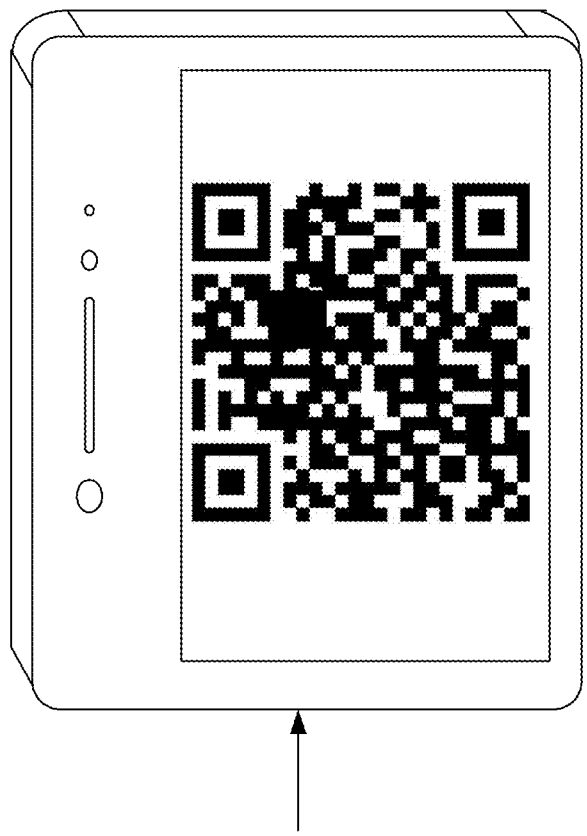
Figures 1, 9:
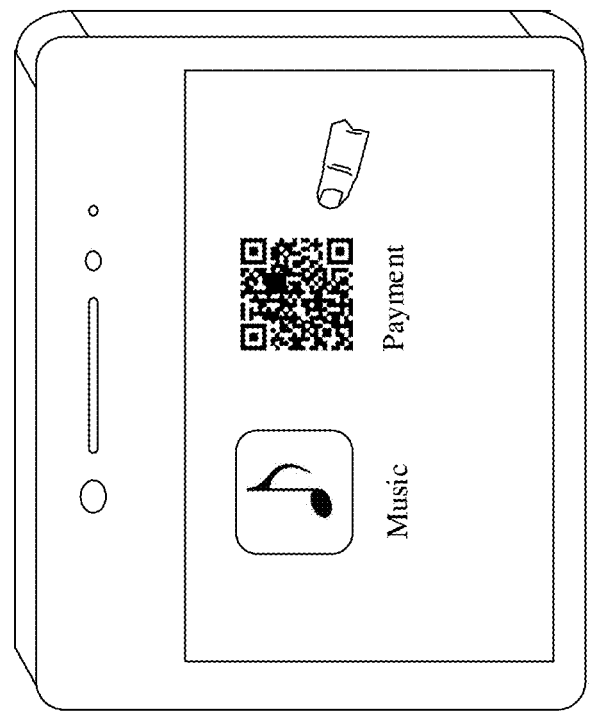
Figures 2, 9:
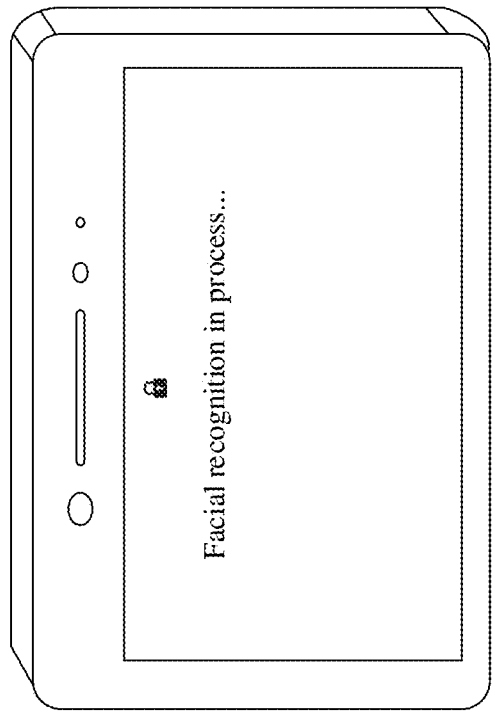
Figures 2, 9:
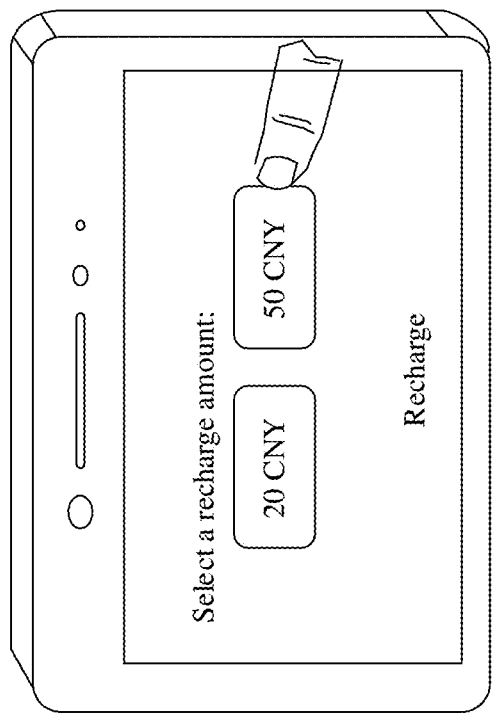
Figure 10:
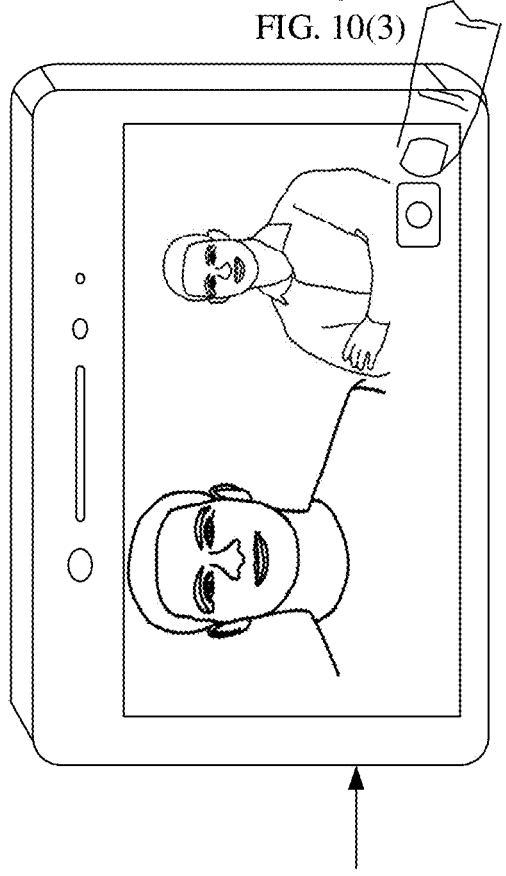
Figure 10:
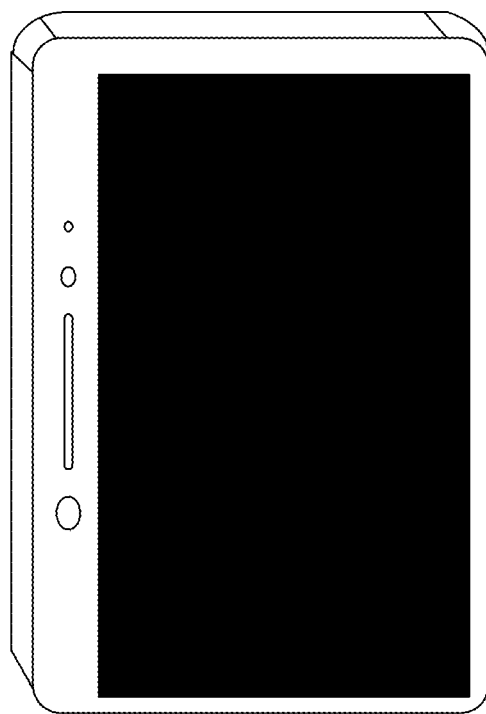
Figure 10:
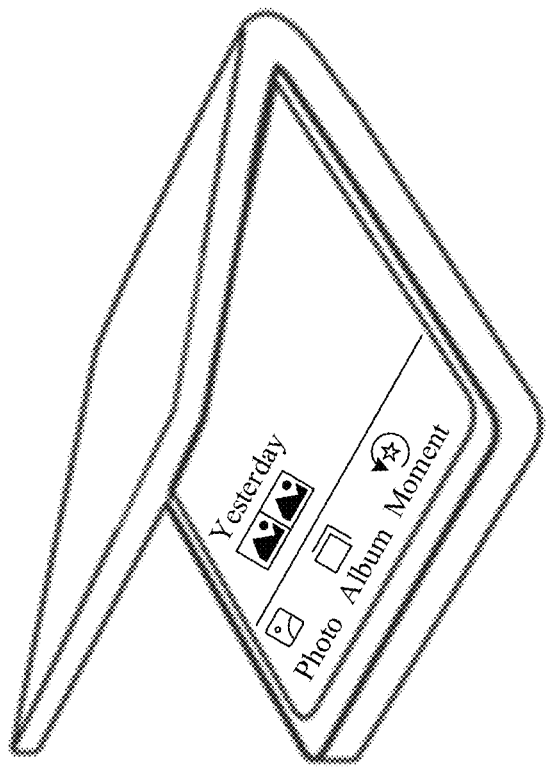
Figure 10:
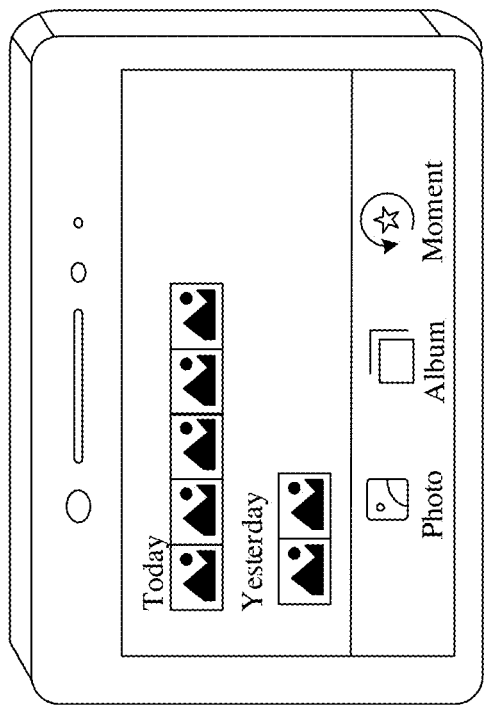

As shown in FIG. 10(1), the mobile phone is in the folded state (a screen-locked state). The user may perform some operations on the mobile phone to trigger the mobile phone to enable a camera application. For example, the user presses the power button to turn on the outer screen, and triggers the mobile phone to display, through the outer screen, a camera application icon shown in FIG. 10(2). The user may trigger, by using an operation such as tapping the camera application icon, the mobile phone to enable the camera application. As shown in FIG. 10(3), the mobile phone enables the camera application, and enters an interface of the camera application. The interface may include a gallery control, a photographing control, and a camera switching control.

It should be noted that, when the outer screen is not unlocked, it may be set that some functions of the camera application are available and some functions are unavailable.

For example, the user may trigger, by tapping the photographing control, the mobile phone to photograph. In other words, when the outer screen is not unlocked, the photographing function of the camera application is available.

For another example, the user may switch between a front-facing camera and a rear-facing camera by tapping, for example, the camera switching control. In other words, when the outer screen is not unlocked, the camera switching function of the camera application is available.

Optionally, the user may attempt to enter the gallery by using an operation, for example, tapping. In this scenario, optionally, to avoiding disclosing some private images in the gallery of the mobile phone, the mobile phone may display, to the user by using the gallery, only an image generated through photographing this time. In this case, the user may view, by using the gallery, only the image that is photographed by the user by operating the photographing control after the camera application is enabled this time. In other words, when the outer screen is not unlocked, only a permission to browse an image photographed when the outer screen is not unlocked is available.

Optionally, when the outer screen is not unlocked, after the camera application is disabled or the screen is locked, the image stored in the gallery is deleted.

The foregoing example is still used. After the mobile phone displays the interface shown in FIG. 10(3), the user may trigger, by performing an operation such as tapping the gallery control, the mobile phone to display an image in the gallery shown in FIG. 10(4). Optionally, the interface shown in FIG. 10(4) may include a gallery control. To improve security of a private image in the gallery of the mobile phone, when detecting an operation of the user, for example, tapping the gallery control 2, the mobile phone may prompt the user to unlock the screen. For example, the mobile phone may display a prompt interface shown in FIG. 10(5). When the unlocking operation of the user is detected by the mobile phone, for example, when it is detected that the user taps the screen, the mobile phone invokes the camera on the outer screen to capture the face image of the user, to identify the identity of the user. If it is detected that the identity of the user is valid, and the mobile phone is in the non-folded state, the mobile phone unlocks the inner screen, and may display a gallery interface shown in FIG. 10(6) for the user to browse and view. The gallery interface may include one or more images in the mobile phone. On the contrary, if it is detected that the identity of the user is valid and the mobile phone is in the folded state, the mobile phone unlocks the outer screen, and may display a gallery interface shown in FIG. 10(7).

It should be noted that an unlocking procedure shown in FIG. 10(1) to FIG. 10(7) is merely an example. There may be another implementation of a condition for triggering enabling of the camera, an actual response that is of the mobile phone and that is triggered by the user operating the gallery control, and the like. This is not limited in this embodiment of this application. For example, when an operation, such as touching a gallery control 1, of the user is detected, and an image is photographed after the camera application is enabled this time, the mobile phone displays the image photographed by the user this time. In addition, in response to an operation, such as a left-right sliding operation, of the user, the mobile phone may display, through switching, a plurality of images that are photographed this time. When it is detected that the user touches the gallery control 1, and no image is photographed after the camera application is enabled this time, the mobile phone prompts the user to unlock the screen, to view the gallery of the mobile phone.

4. Music Playback Scenario

As shown in FIG. 11(1), the mobile phone is in the folded state, and plays music in the background. The user may turn on the outer screen in a manner such as tapping the screen or pressing the power button. Optionally, when the music is played in the background and the screen is not unlocked, the mobile phone may display an interface shown in FIG. 11(2) after turning on the screen. Optionally, the interface may include a control 406.

Optionally, when the screen is not unlocked, the user cannot perform a music-related operation on the outer screen interface, for example, cannot switch a song, and cannot control pause or playback of the song.

Alternatively optionally, when the screen is not unlocked, the mobile phone may execute some functions of a music application to reduce unlocking frequency of the user. For example, the user may switch, pause, or play the song by using the control 406. Optionally, the mobile phone does not support some other functions. For example, the user cannot implement a function such as music collection by using the control 406.

In response to the unlocking operation input by the user, for example, double-tapping the screen, the mobile phone invokes the camera on the outer screen to capture the face image, and then performs facial recognition based on the captured face image, to determine whether the identity of the user is valid. Optionally, in a facial recognition process, the mobile phone may display an interface shown in FIG. 11(3).

When it is determined that the identity of the user is valid and the mobile phone is in the non-folded state, the mobile phone unlocks the inner screen. Optionally, if the user performs the operation on the control 406 (for example, taps the control 406) through the interface shown in FIG. 11(2), after the inner screen is unlocked, the mobile phone displays an interface of a music application shown in FIG. 11(4). If the user does not perform the operation on the control 406, after the mobile phone unlocks the inner screen, the inner screen may enter the desktop or an application interface last displayed.

On the contrary, when it is determined that the identity of the user is valid and the mobile phone is in the folded state, the mobile phone unlocks the outer screen. Optionally, after unlocking the outer screen, the mobile phone displays an interface of the music application shown in FIG. 11(5).

FIG. 11(1) to FIG. 11(5) mainly show an example in which the user double-taps the music control 406 to trigger face unlocking, and the mobile phone displays a related interface of the music application after the unlocking. In some other embodiments, the user may alternatively not perform the operation on the music control 406, but trigger the mobile phone to perform face unlocking in another manner, for example, by sliding the interface shown in FIG. 11(2) by using a finger. In this case, after the mobile phone is unlocked, the mobile phone may enter a home screen or an interface last displayed by the mobile phone.

In some embodiments, the mobile phone may be directly unlocked after facial recognition succeeds. Receiving the new message is used as an example. For example, still refer to FIG. 8-1(3) and FIG. 8-1(4). After facial recognition succeeds, if it is determined that the mobile phone is in the folded state, the outer screen is directly unlocked.

In some other embodiments, the mobile phone may alternatively be unlocked based on the unlocking operation (for example, the screen sliding operation) input by the user after facial recognition succeeds. Receiving the new message is still used as the example. For example, refer to FIG. 8-2(1) and FIG. 8-2(2). The mobile phone performs facial recognition in response to the unlocking requirement of the user. After facial recognition succeeds, the mobile phone may display the interface shown in FIG. 8-2(3). When a swipe-up operation input by the user is detected, and it is detected that the mobile phone is in the folded state, the mobile phone unlocks the outer screen, and may display the unlocking interface shown in FIG. 8-2(4). When the swipe-up operation input by the user is detected, and it is detected that the mobile phone is in the non-folded state, the mobile phone unlocks the inner screen, and may display the unlocking interface shown in FIG. 8-2(5).

The foregoing embodiment is mainly described by using the example in which whether the user wants to unlock the outer screen or the inner screen is determined by determining whether the mobile phone is in the folded state. In some other embodiments, the mobile phone not only determines whether the mobile phone is in the folded state, but also may determine a specific unfolding angle of the mobile phone. When it is determined that the unfolding angle of the mobile phone is within a preset range, the mobile phone unlocks the inner screen. The preset range may be separately set based on an actual application. This is not limited in this embodiment of this application.

In some other embodiments, in addition to determining the folded state of the mobile phone, another determining condition may be further set, so that the mobile phone more accurately determines whether the user wants to unlock the inner screen or the outer screen. Optionally, the another determining condition includes but is not limited to one or more of the following conditions: current time is within the preset time period, a current location is within the preset geographical location range, the new message is a message of the preset application, and a preset unlocking operation is detected.

The preset application includes but is not limited to an office application. For example, the working application may be, for example, a mailbox (an enterprise mailbox, a private mailbox, or the like), or an instant messaging application (for example, WeChat of an enterprise edition or WeChat of a personal edition).

The preset unlocking operation may be an operation used to unlock the inner screen, such as a preset unlocking gesture or an unlocking pattern. The preset unlocking operation may be set by the system or the user.

Optionally, when it is detected that one or more of the foregoing conditions are met, the mobile phone may unlock the inner screen.

For example, the mobile phone may obtain a user profile, or collect behavior data that is used to reflect a user behavior feature, to determine whether the user wants to unlock the outer screen or the inner screen when unlocking the screen at different time, in different places, or in different scenarios. In this way, when the user unlocks the terminal screen at corresponding time, in a corresponding place, or in a corresponding scenario, the terminal may implement efficient interaction between the user and the terminal based on determining whether the user currently wants to unlock the inner screen or the outer screen.

The user profile usually includes one or more tags of the user (for example, gender, a habit of staying up late, or a reading preference), the user profile may reflect an information overview of the user, and the terminal may predict a current possible behavior or hobby of the user based on the user profile.

For example, the user profile of the user indicates that the user is a person having an entertainment habit before bed (for example, playing a game before bed), and sleep time of the user is 23:00 to 7:30. In this case, the terminal may determine, based on the user profile, an unlocking purpose of unlocking the terminal by the user between 22:00 and 23:00 (before bed) as unlocking the inner screen and running a game application B. Therefore, if it is detected, between 22:00 and 23:00, that the user inputs correct identity authentication information (for example, correct face information) into the terminal, the terminal unlocks the inner screen, and may automatically run the game application B.

For example, the user profile of the user indicates that the user usually uses the inner screen when using the mobile phone at home, and the user usually uses the outer screen in a public place such as a subway. In this case, the terminal may determine, based on the user profile authorized by the user, the unlocking purpose of unlocking the mobile phone by the user at home as unlocking the inner screen. Therefore, if it is detected that the user is at home, and the user inputs the correct identity authentication information into the terminal, the terminal unlocks the inner screen. If it is detected that the user is in the public place such as the subway, and the user inputs the correct identity authentication information into the terminal, the terminal unlocks the outer screen.

In this embodiment of this application, different unlocking instructions may be set for the outer screen and the inner screen. The preset unlocking instruction is the unlocking instruction used to unlock the inner screen, and the preset unlocking instruction includes any one or a combination of a plurality of the following: the gesture, the pattern, the number, and the fingerprint that are preset.

For example, drawing an unlocking pattern "M" is set as a preset unlocking instruction for unlocking the inner screen, and drawing an unlocking pattern "N" is set as an unlocking instruction used by the user to unlock the outer screen. In this case, when the unlocking instruction of drawing the unlocking pattern M by the user on the outer screen is detected, and the mobile phone is currently in the non-folded state, the mobile phone determines that the unlocking purpose of the user is unlocking the inner screen, and the mobile phone unlocks the inner screen based on the unlocking purpose of the user.

For another example, generally, an enterprise email may involve a business secret, and therefore, a security requirement is high. Considering this characteristic of the enterprise email, if the mobile phone receives the enterprise email in the screen-locked state, the mobile phone may unlock the inner screen in response to the unlocking instruction (for example, a face image input by using the camera on the outer screen) input by the user, to reduce a probability of business secret leakage in a process of viewing and replying to the enterprise email. For example, as shown in FIG. 8-3(1), the mobile phone receives the enterprise email in the screen-locked state. In this case, the mobile phone performs identity authentication on the user by using the camera on the outer screen in response to the unlocking operation of the user, for example, lifting the mobile phone. If it is determined that the identity of the user is valid, and the mobile phone is in a half-folded state shown in FIG. 8-3(2), the mobile phone may unlock the inner screen. Optionally, after unlocking the inner screen, the mobile phone displays an interface shown in FIG. 8-3(3). The interface includes content of the email.

For another example, in some scenarios, if the user does not actively unfold the mobile phone, the mobile phone may prompt the user to unfold the mobile phone to process the enterprise email with the high security requirement. As shown in FIG. 8-3(4), after it is determined that the identity of the user is valid, the mobile phone may display an interface 404 (an example of a third interface), to prompt the user to unfold the mobile phone for use.

Optionally, if it is detected, within a period of time after the interface 404 is displayed, that the mobile phone is in the non-folded state, it indicates that the unlocking purpose of the user is indeed unlocking the inner screen, and the mobile phone unlocks the inner screen. Optionally, after unlocking the inner screen, the mobile phone displays an interface shown in FIG. 8-3(5). For example, the interface includes email details. For another example, the interface includes the email details and an email list in a split-screen manner.

Alternatively optionally, if it is detected, within a period of time, that the mobile phone is still in the folded state, it indicates that the unlocking purpose of the user is probably only unlocking the outer screen. In this case, the mobile phone only unlocks the outer screen. Optionally, after unlocking the outer screen, the mobile phone displays an interface shown in FIG. 8-3(6).

In other words, when the mobile phone receives a message (for example, the enterprise email) of an application that has the high security requirement, the mobile phone processes the message through the inner screen as much as possible. Specifically, when it is determined that the identity of the user is valid, the mobile phone preferentially unlocks the inner screen if it is determined that the mobile phone is in the non-folded state. Alternatively, when it is determined that the identity of the user is valid, the user may be prompted that the mobile phone may be unfolded for use if it is determined that the mobile phone is still in the folded state. In this way, a probability that the user uses the inner screen to process a message (for example, the enterprise email) can be increased.

In some other embodiments, to further increase the probability that the user uses the inner screen to process, for example, the enterprise email, the mobile phone may further prompt, through a plurality of interfaces, the user to unfold the mobile phone for use. For example, the interface shown in FIG. 8-3(2) or FIG. 8-3(4) prompts the user to unfold the mobile phone for use. A specific occasion and manner of prompting are not limited in this embodiment of this application.

The foregoing describes the unlocking method provided in this embodiment of this application by using an example in which the new message is the enterprise email with the high security requirement. In some other embodiments, the new message may alternatively be a message of a non-preset application or a non-preset function, or a message that is not received in the preset time period, or a message that is not received in the preset geographical location range. For example, the new message may be a message having a low security requirement. For such a message, the user may choose, based on a use habit of the user, whether to interact with the mobile phone through the inner screen.

For example, the new message is a new email having the low security requirement. For example, as shown in FIG. 8-4(1) and FIG. 8-4(2), the mobile phone receives the new email in the screen-locked state and displays an interface 405. The interface may include basic information of the new email. Then, the mobile phone invokes the camera on the outer screen to capture the face image to perform facial recognition in response to the unlocking instruction that is input by the user, for example, the operation of double-tapping the screen by the user. Optionally, in the facial recognition process, the mobile phone may display an interface shown in FIG. 8-4(3).

In some cases, if it is determined by the mobile phone, based on a facial recognition result, that the identity of the user is valid and the mobile phone is in the non-folded state, the mobile phone determines that the unlocking purpose of the user is unlocking the inner screen, and the mobile phone unlocks the inner screen. Optionally, after unlocking the inner screen, the mobile phone displays an interface shown in FIGS. 8-4(4).

In some other cases, if it is determined by the mobile phone, based on the facial recognition result, that the identity of the user is valid and the mobile phone is still in the folded state, the mobile phone unlocks the outer screen. Optionally, after unlocking the outer screen, the mobile phone displays an interface shown in FIGS. 8-4(5).

It can be learned from the foregoing embodiment that, in some scenarios in which the inner screen is not required (for example, for some messages that do not involve security leakage risks), the mobile phone unlocks the outer screen without user intervention (for example, the user does not unfold the mobile phone). In other words, the mobile phone interacts with the user through the outer screen as much as possible. In some scenarios in which the inner screen is required, the mobile phone unlocks the inner screen and interacts with the user through the inner screen as much as possible.

In some other embodiments, the mobile phone may further prompt the user to unfold the mobile phone for use. For example, prompt information is displayed on the interface shown in FIG. 8-4(2) or FIG. 8-4(3). Alternatively, after it is identified that the identity of the user is valid, the prompt information is displayed before the screen is unlocked. A manner in which the mobile phone prompts the user to unfold the mobile phone is not limited to an interface manner, and may also be, for example, a voice (an example of a voice prompt) prompt manner. A specific prompt occasion and prompt manner are not limited in this embodiment of this application.

In some other embodiments, the mobile phone may alternatively determine, based on another condition, whether to interact with the user through the inner screen. For example, some other detection is performed on the mail message, to determine whether to recommend to the user to unlock the inner screen to process the mail message.

For example, the mobile phone detects whether a newly received email carries an attachment. If the email carries the attachment, the mobile phone unlocks the inner screen when it is detected that the user has the unlocking requirement and actively unfolds the mobile phone. Alternatively, the mobile phone recommends the user to unfold the mobile phone for use. The prompt manner is not limited to the interface manner, the voice manner, or the like.

For another example, the mobile phone detects whether the newly received email carries an attachment whose size exceeds a threshold. If the email carries a large attachment (for example, an attachment whose size is greater than 10 M), the mobile phone unlocks the inner screen when it is detected that the user has the unlocking requirement and actively unfolds the mobile phone. Alternatively, the mobile phone recommends the user to unfold the mobile phone for use.

The threshold may be flexibly set based on a scenario. This is not limited in this embodiment of this application.

For another example, the mobile phone detects whether the newly received email carries an attachment of a preset type. If the email carries the attachment of the preset type, the mobile phone unlocks the inner screen when it is detected that the user has the unlocking requirement and actively unfolds the mobile phone. Alternatively, the mobile phone recommends the user to unfold the mobile phone for use.

Optionally, the attachment of the preset type may be an attachment that is suitable for viewing through the inner screen (for example, a large screen). Optionally, the attachment of the preset type may be an attachment with high privacy, for example, may be an encrypted attachment.

For example, the preset type may be, for example, but is not limited to an image, a video, a Word document, or the encrypted attachment. The image type includes but is not limited to any one or more of the following types: jpg, png, tif, and gif.

In some other embodiments, the terminal may further determine the unlocking purpose of the user with reference to detecting the foregoing conditions. For example, the terminal detects whether current time is within the preset time period and whether the electronic device is in the folded state. In a possible design, in some cases, if it is detected by the terminal, within the preset time period, that the user inputs the correct identity authentication information and the terminal is in the non-folded state, it indicates that the user prepares to unfold the terminal for use, and the terminal may directly unlock the inner screen. In some other cases, if it is detected by the terminal, within the preset time period, that the user inputs the correct identity authentication information and the terminal is in the folded state, it may be that the user does not unfold the terminal in time. In this case, the terminal may display the prompt information, for example, the terminal displays "Facial recognition succeeds. Unfold the terminal to unlock the inner screen.", to prompt the user to unfold the terminal. Within a period of time after the terminal displays the prompt information, the terminal may unlock the inner screen if it is detected that the terminal is unfolded. Within the period of time after the terminal displays the prompt information, the terminal may unlock the outer screen if it is detected that the terminal is not unfolded.

In another possible design, if it is detected by the terminal, within the preset time period, that the user inputs the correct identity authentication information, the terminal may first unlock the outer screen, display a first interface on the outer screen, unlock the inner screen when it is detected that the user unfolds the mobile phone, and display a second interface associated with the first interface on the inner screen. In this way, the interface of the outer screen may be associated with and connected to the inner screen.

In some other embodiments, the user needs to interact with the mobile phone through the inner screen, and due to some factors, the mobile phone cannot successfully perform facial recognition through the camera on the outer screen. For example, a process in which the user unfolds the mobile phone is fast, a quantity of face images captured by the camera on the outer screen is small, or an angle of the face images captured by the camera on the outer screen is biased, and the mobile phone cannot identify the identity of the user based on the captured images.

In some cases, as shown in FIG. 8-5(1) and FIG. 8-5(2), when face unlocking fails to be performed by using the camera on the outer screen, the mobile phone may invoke the camera on the inner screen to continue to capture the face image (an example of user identity information) of the user, and identify the identity of the user based on the face image captured by the camera on the inner screen. Optionally, the mobile phone displays, through the inner screen, an interface shown in FIG. 8-5(3), to prompt the user that facial recognition is being performed. When it is determined, based on the facial recognition result, that the identity of the user is valid, the mobile phone may unlock the inner screen. Optionally, after unlocking the inner screen, the mobile phone displays an interface shown in FIGS. 8-5(4) on the inner screen.

In some other cases, when face unlocking fails to be performed by using an image sensor of the outer screen, the mobile phone may invoke an image sensor of the inner screen (an example of a first collection component) to continue to capture the face image. In addition, considering that the camera on the outer screen may have captured some face images, the mobile phone may identify the identity of the user by using the face images captured by the camera on the outer screen and the face images captured by the camera on the inner screen. In this way, before the mobile phone invokes the camera on the inner screen, the camera on the outer screen has captured some face images required for facial recognition. Therefore, the camera on the outer screen may collect fewer face images to complete facial recognition. This shortens time from invoking the camera on the inner screen to successful facial recognition, and speeds up facial recognition.

Optionally, in this embodiment of this application, the mobile phone may determine, based on a location relationship between the user and the mobile phone, an occasion for invoking the camera on the inner screen. For example, when it is determined that a user face is out of a field of view (FOV) range of the camera on the outer screen, and duration reaches preset duration, it indicates that the camera on the outer screen cannot capture the face image at a high probability. In this case, if the mobile phone is in the non-folded state, the mobile phone invokes the camera on the inner screen to continue to capture the face image, to increase a success rate of facial recognition.

Optionally, when it is determined, by the mobile phone, that the user face is out of the field of view (FOV) range of the camera on the outer screen, and the duration reaches the preset duration, the mobile phone controls the outer screen to turn off, to reduce power consumption.

Optionally, the mobile phone may further determine the occasion for invoking the camera on the inner screen in response to the instruction that is input by the user. For example, if it is detected that the user performs the operation such as pressing the power button, the mobile phone invokes the camera on the inner screen.

Optionally, the mobile phone may further determine, based on an angle at which the foldable screen is unfolded or based on a folded angle of the mobile phone, the occasion for invoking the camera on the inner screen. Specifically, when the folded angle of the mobile phone is within a preset angle range, the camera on the inner screen is invoked to capture the face image. The preset angle range may be determined based on a field of view range of the camera on the inner screen. When the folded angle of the mobile phone is within the preset angle range, the camera on the inner screen may usually capture the face image. When the camera on the inner screen is a wide-angle or ultra-wide-angle camera, a field of view range of the camera on the inner screen is large, and a corresponding preset angle range is also large. When the camera on the inner screen is narrow, the corresponding preset angle range is small. The preset angle range is not limited in this embodiment of this application. It can be learned that in this embodiment, the camera on the inner screen is invoked to start working only when the user face is within the field of view range of the camera on the inner screen. This reduces power consumption caused by invoking the camera on the inner screen in advance, and reduces, as much as possible, a probability of a slow facial recognition speed caused by delayed invoking of the camera on the inner screen.

Optionally, the camera on the inner screen used for facial recognition may be a camera with a large field of view range. This increases a probability that the user face is within the field of view range of the camera on the inner screen and helps the camera on the inner screen capture the face image. This improves the success rate of facial recognition.

For example, the preset angle range is 80° to 145°. Refer to FIG. 8-6(1). The mobile phone receives the new email in the screen-locked state, and the user picks up the mobile phone and attempts to unlock the mobile phone for use. In response to the unlock operation of the user, the mobile phone invokes the camera on the outer screen to capture the face image, to perform facial recognition.

Optionally, in the facial recognition process, the mobile phone may display an interface shown in FIG. 8-6(2). Then, the user gradually unfolds the mobile phone. If it is detected by the mobile phone that the mobile phone is unfolded to an angle of 80° and still fails to be unlocked, the mobile phone invokes the camera on the inner screen to continue to capture the face image. Optionally, the mobile phone may identify the identity of the user based on the face image captured by the camera on the inner screen. Alternatively, to further improve the facial recognition speed, the mobile phone may perform facial recognition based on the face image captured by the camera on the outer screen and the face image captured by camera on the inner screen.

Optionally, in the facial recognition process, the mobile phone may display an interface shown in FIG. 8-6(3). When it is determined that the identity of the user is valid, the mobile phone unlocks the inner screen, and may display an interface shown in FIG. 8-6(4).

In some other embodiments, the mobile phone may determine, based on the angle at which the mobile phone is unfolded and the location relationship between the user and the mobile phone, the occasion for invoking the camera on the inner screen, to invoke the camera on the inner screen at a more accurate occasion. For example, when it is detected that the folded angle of the mobile phone reaches 80°, the user face is close to the mobile phone, and the identity of the user fails to be identified currently, the mobile phone invokes the camera on the inner screen to capture the face image of the user, to continue to perform facial recognition.

In some embodiments, the mobile phone may further prompt the user whether to unfold the mobile phone to unlock the inner screen.

The receiving of the new message is still used as the example. For example, as shown in FIG. 8-7(1), the mobile phone is in the screen-locked state, and then the mobile phone receives the new message. In this case, the mobile phone may display a message reminder interface shown in FIG. 8-7(2). The message reminder interface may include words such as "Unfold the mobile phone to enter an inner screen display", to prompt the user to unlock the inner screen by unfolding the mobile phone. Then, in response to the operation of the user such as double-tapping the screen, the mobile phone captures the face image by using the camera on the outer screen, to perform facial recognition. Optionally, in the facial recognition process, the mobile phone displays an interface shown in FIG. 8-7(3).

In some cases, if it is determined by the mobile phone, through facial recognition, that the identity of the user is valid, and the mobile phone is not in the folded state, it indicates that the user unfolds the mobile phone, and the unlocking purpose of the user is unlocking the inner screen. In this case, the mobile phone unlocks the inner screen. Optionally, after unlocking the inner screen, the mobile phone displays a message details interface shown in FIG. 8-7(4).

In some other cases, if it is determined by the mobile phone, through facial recognition, that the identity of the user is valid, and the mobile phone is in the folded state, it indicates that the user does not unfold the mobile phone, and the unlocking purpose of the user is unlocking the outer screen. In this case, the mobile phone unlocks the outer screen. Optionally, after unlocking the inner screen, the mobile phone displays a message details interface shown in FIG. 8-7(5).

For another example, as shown in FIG. 8-7(1) to FIG. 8-7(4), in the facial recognition process, the mobile phone may prompt the user to unfold the mobile phone to unlock the inner screen. If it is determined by the mobile phone, based on the facial recognition result, that the identity of the user is valid, and the mobile phone is not in the folded state, it indicates that the user unfolds the mobile phone, and the unlocking purpose of the user is unlocking the inner screen. In this case, the mobile phone unlocks the inner screen based on the unlocking purpose of the user. On the contrary, if it is determined by the mobile phone, based on the facial recognition result, that the identity of the user is valid, and the mobile phone is in the folded state, it indicates that the user does not unfold the mobile phone, and the unlocking purpose of the user is unlocking the outer screen. In this case, the mobile phone unlocks the outer screen.

For another example, as shown in FIG. 8-9(1) to FIG. 8-9(5), after it is determined by the mobile phone, based on the facial recognition result, that the identity of the user is valid, the mobile phone may display an interface 403 shown in FIG. 8-9(3) to prompt the user to unfold the mobile phone, to unlock the inner screen. Within a period of time after the prompt interface 403 is displayed, if it is detected by the mobile phone that the mobile phone is unfolded, it indicates that the unlocking purpose of the user is unlocking the inner screen, and the mobile phone unlocks the inner screen based on the unlocking purpose of the user. On the contrary, within the period of time after the prompt interface 403 is displayed, if it is not detected by the mobile phone that the mobile phone is unfolded, it indicates that the user may want to interact with the mobile phone only through the outer screen. In this case, the mobile phone unlocks the outer screen to restore interaction of the outer screen.

It should be noted that the manner in which the mobile phone prompts the user to unfold the mobile phone is not limited to a manner of displaying an interface shown in FIG. 8-7(2), an interface 407 shown in FIG. 8-8(1) to FIG. 8-8(4), and an interface shown in FIG. 8-9(3). For example, the prompt information, for example, "Unfold the mobile phone and swipe up to unlock the inner screen", may also be added to a swipe-up unlocking icon shown in FIG. 8-2(3). In addition, the angle at which the mobile phone may be unfolded may be alternatively prompted to the user through the interface. For example, the user is prompted "Unfold the mobile phone by about 15 degrees (only an example) to trigger unlocking of the inner screen".

In addition, the manner in which the mobile phone prompts the user to unfold the mobile phone is not limited to an interface prompt method, and may also be, for example, the voice prompt manner. The specific prompt occasion and prompt manner are not limited in this embodiment of this application.

Optionally, when it is determined that the unlocking purpose of the user is unlocking the inner screen, the mobile phone unlocks the inner screen. In this case, if it is detected by the mobile phone that the outer screen is still in a screen-on state, the mobile phone may control the outer screen to turn off the outer screen, to reduce overall power consumption caused by screen-on of the outer screen.

Alternatively optionally, when it is determined by the mobile phone that the unlocking purpose of the user is unlocking the inner screen, the mobile phone may alternatively unlock both the inner screen and the outer screen. For example, in some photographing scenarios, the user may need to preview a to-be-shot image through the inner screen and the outer screen, to shoot an image with good effect.

In some embodiments, a shortcut start manner may be further set for a specific function of a specific application, to more quickly unlock and enter a corresponding function of a corresponding application.

For example, as shown in FIG. 10(2), a shortcut startup icon is set for the camera application on a lock screen. In this way, the user may quickly use the camera application by operating the shortcut startup icon of the camera application.

For another example, a shortcut startup icon may be further set for the payment function of the wallet application. After the user performs an operation (for example, a tap operation) on the shortcut start icon of the payment function, the mobile phone performs identity authentication on the user. If it is determined that the identity of the user is valid, the mobile phone directly displays the payment QR code. In this way, a payment operation of the user may be simplified, and the user does not need to search for the wallet application in a plurality of applications on the desktop after unlocking, and choose to enter a payment QR code interface.

For example, the mobile phone performs identity authentication on the user through facial recognition by using the camera. In some embodiments, when it is determined by the camera on the outer screen that the identity of the user is valid, the mobile phone may alternatively first unlock the outer screen. Subsequently, when it is detected that the user unfolds the mobile phone, the mobile phone may associate and connect an interface of the outer screen to the inner screen for display. An example in which the mobile phone is unlocked in the scenario of receiving the new message is used. Refer to FIG. 8-10(1) and FIG. 8-10(2). The mobile phone receives the new message in the screen-locked state, the user picks up and unlocks the mobile phone, and the mobile phone captures the face image by using the camera on the outer screen, to perform facial recognition on the user. After facial recognition succeeds, the mobile phone unlocks the outer screen, and displays a message interface (an example of a first interface) shown in FIG. 8-10(3). Subsequently, the user unfolds the mobile phone for use, and the mobile phone may associate and connect an interface displayed on the outer screen, for example, the interface shown in FIG. 8-10(3), to the inner screen, and display an interface shown in FIG. 8-10(4) on the inner screen. In an example, the interface on the outer screen may be synchronously switched to the inner screen for display, to implement seamless switching from the interface on the outer screen to the interface on the inner screen. In some other examples, when the interface on the outer screen is switched to the inner screen for display, an interface associated with the interface on the outer screen may be displayed on the inner screen. For example, the outer screen displays an email details interface, and the inner screen may display an interface (an example of a second interface) in a split-screen manner. Email details are displayed on one part of the interface, and a list of sent and received emails is displayed on the other part of the interface. For another example, the outer screen displays an interface of currently played music, and when it is switched to the inner screen for display, a music list interface is displayed on the inner screen. In other words, the interface associated with the interface on the outer screen may be displayed on the inner screen.

Compared with that in the solution in FIG. 8-10(1) to FIG. 8-10(4), in the solution shown in FIG. 6(1) to FIG. 6(5), when it is determined that the identity of the user is valid and the mobile phone is unfolded for use, the mobile phone may directly unlock the inner screen instead of unlocking the outer screen, so that power consumption caused by unlocking the outer screen can be further reduced.

In some embodiments, considering that the inner screen and the outer screen have different features, for a same function of a same application, a functional interface displayed on the inner screen and a functional interface displayed on the outer screen of the mobile phone may be different.

The payment scenario (not limited to the payment scenario) is used as an example. For example, considering that security of the inner screen is usually higher than security of the outer screen, a payment function interface displayed on the outer screen in FIG. 9-1(4) includes less information (for example, includes only QR code information used to complete a payment function shown in the figure), and a payment function interface displayed on the inner screen in FIG. 9-1(6) includes more information (for example, includes the QR code information used to complete the payment function and barcode information shown in the figure). In this way, important privacy information and the like may be displayed on the inner screen as much as possible, to improve security of user information.

For another example, considering a difference between a size of the inner screen and a size of the outer screen, for the same function in the same application, the interface of the function displayed on a screen of a smaller size includes less information, and the interface of the function displayed on a screen of a larger size includes more information.

This embodiment of this application may further provide a setting portal for the user, to set a related unlocking function.

Figure 12:
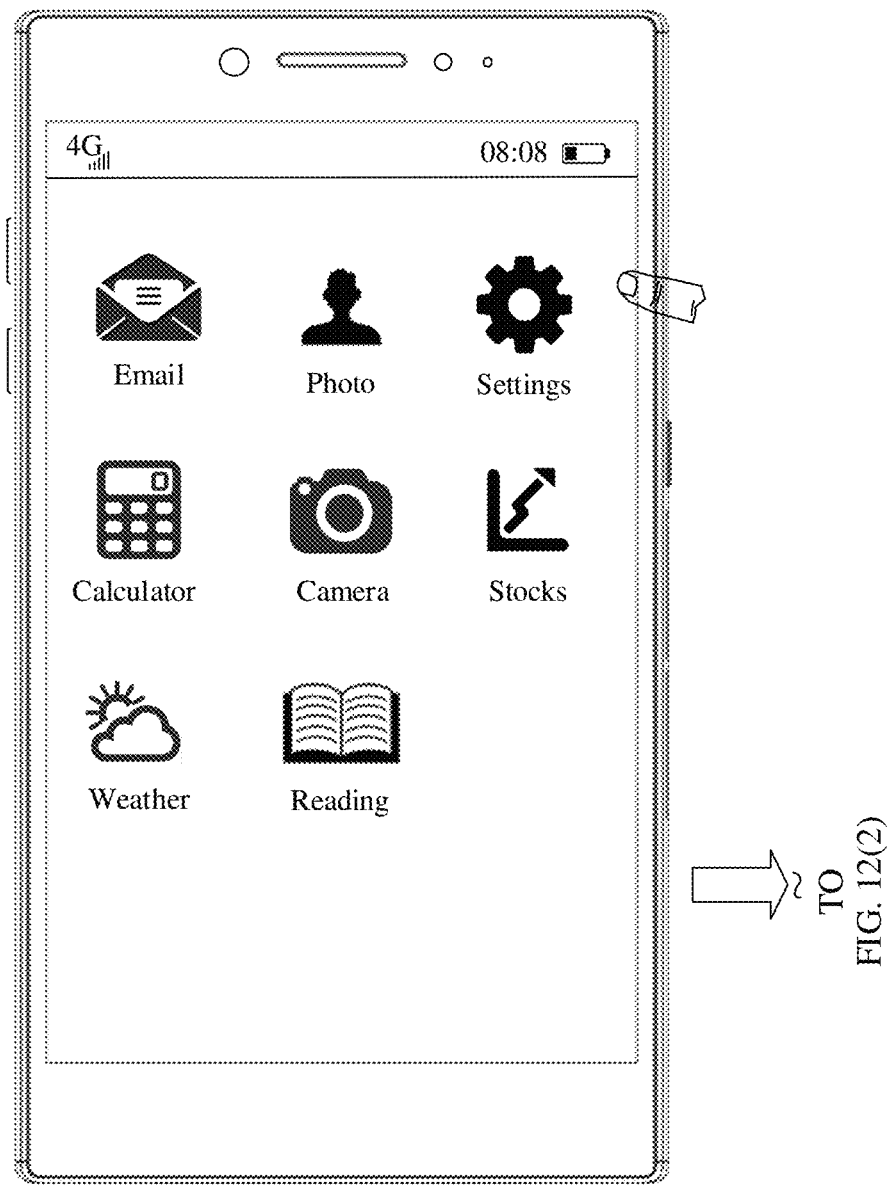
Figure 12:
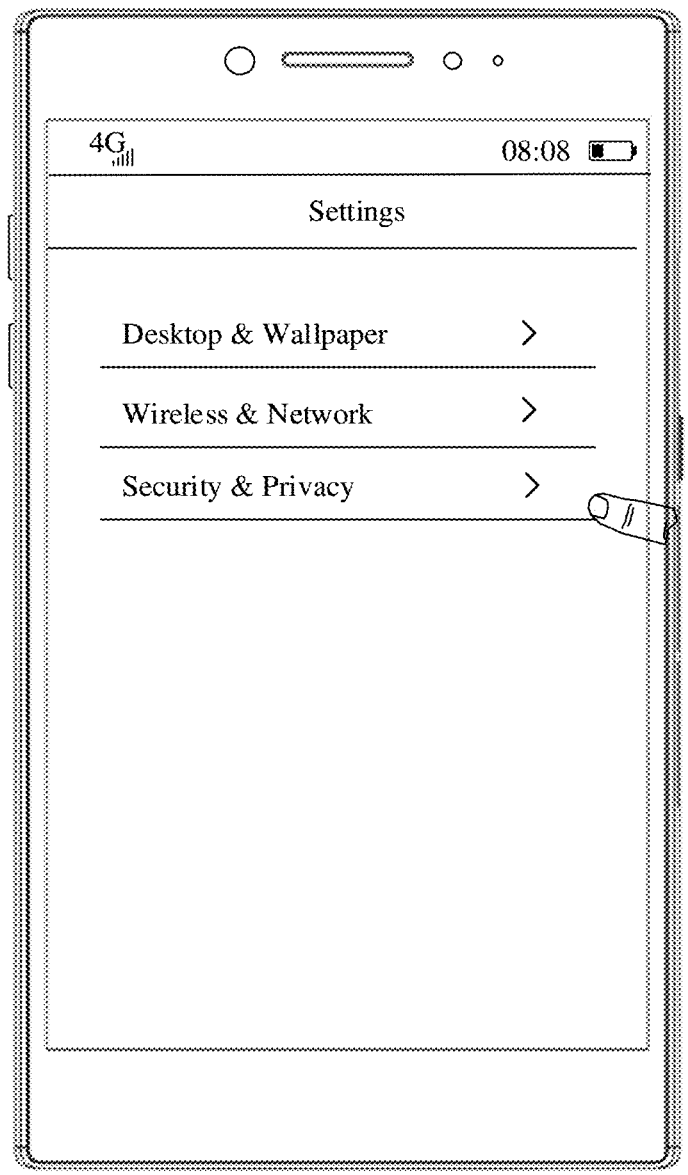
Figure 12:
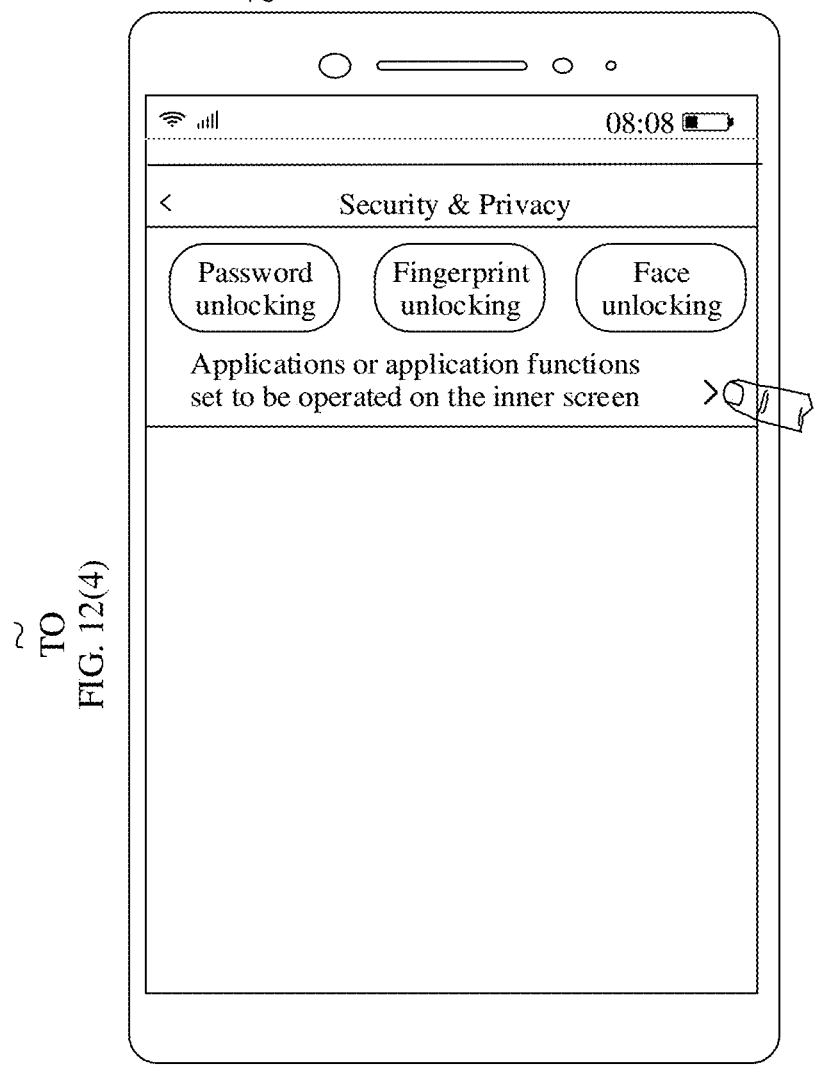
Figure 12:
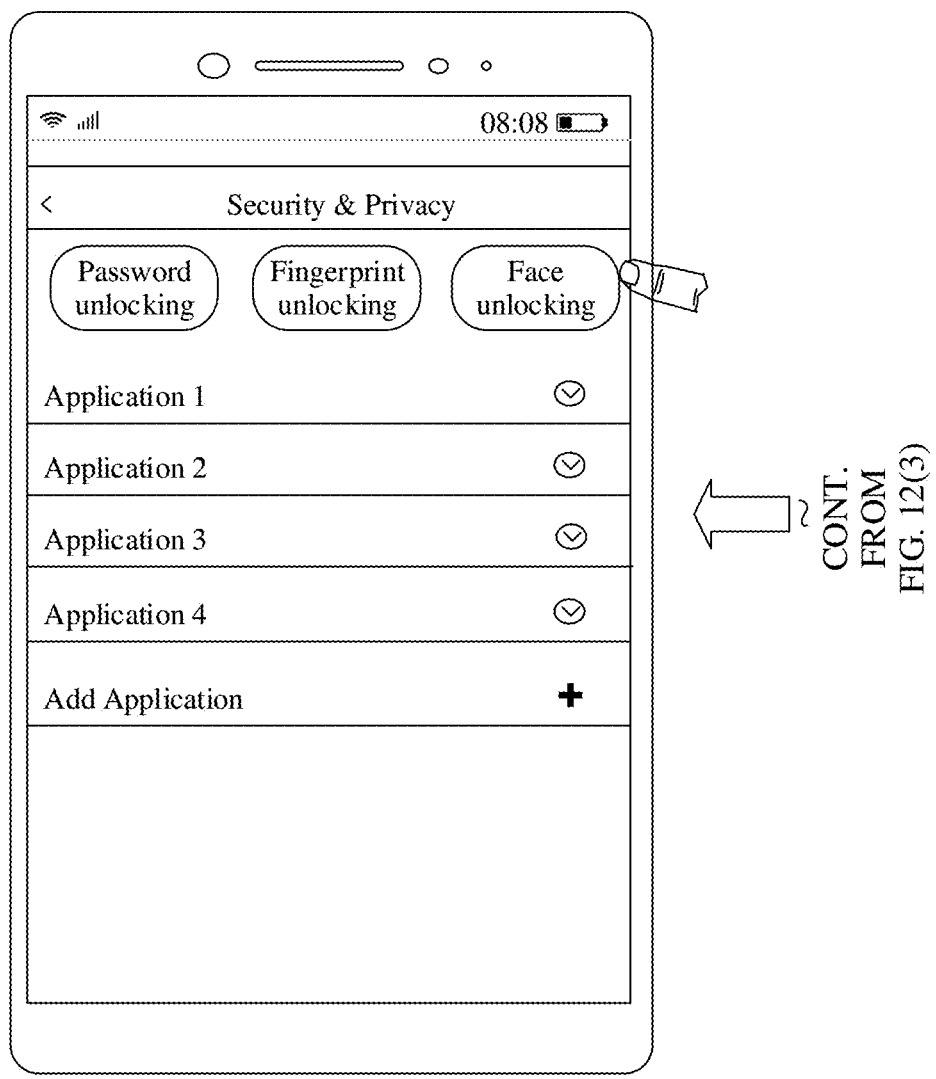

For example, FIG. 12(1) to FIG. 12(4) show a related setting interface of an application that is set to be operated on the inner screen. The mobile phone may receive a setting instruction that is input by the user through a setting interface, and the setting instruction is used to set the preset application. Similarly, the mobile phone may further provide a setting entry for one or more options such as a time period (namely, the preset time period) of an operation performed through the inner screen, a place (namely, the preset geographical location range) of an operation performed through the inner screen, and an unlocking instruction (namely, the preset unlocking instruction) used to unlock the inner screen.

The foregoing mainly uses an example in which the first collection component is the camera on the inner screen and the second collection component is the camera on the outer screen for description. In this case, the first collection component may be different from the second collection component. In some other embodiments, the first collection component and the second collection component may alternatively be a same component. For example, the electronic device is still a foldable screen mobile phone, and the first collection component and the second collection component may be a same fingerprint collection component. The fingerprint collection component may be configured to collect fingerprint information of the user, and may further be configured to unlock the inner screen or the outer screen.

Some other embodiments of this application provide an apparatus. The apparatus may be the foregoing electronic device (for example, the foldable screen mobile phone). The apparatus may include a display, a memory, and one or more processors. The display and the memory are coupled to the processor. The memory is configured to store computer program code. The computer program code includes computer instructions. When the processor executes the computer instructions, the electronic device may perform the functions or the steps performed by the mobile phone in the foregoing method embodiments. For a structure of the electronic device, refer to the electronic device shown in FIG. 2.

Figure 13:
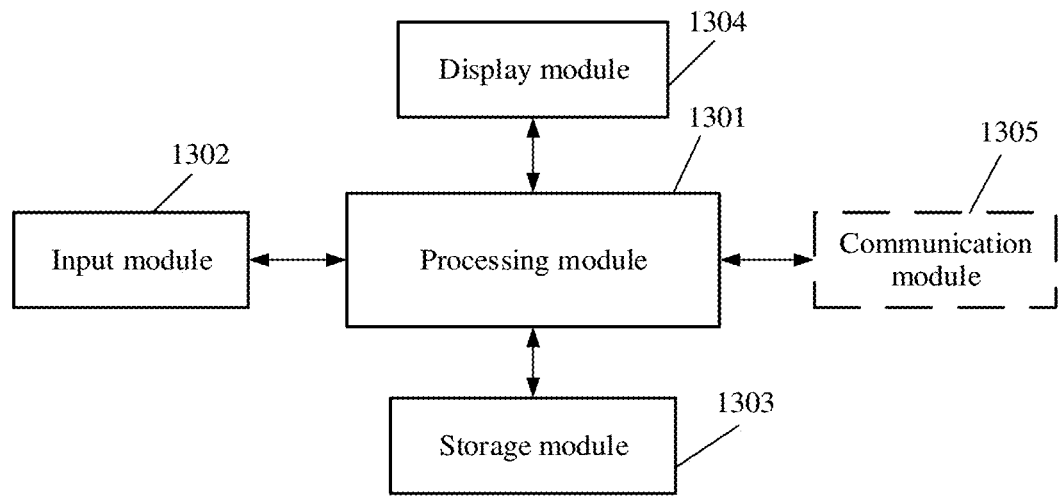
FIG. 13 is a schematic diagram of an apparatus according to an embodiment of this application.

A core structure of the electronic device may be represented as a structure shown in FIG. 13. The core structure may include a processing module 1301, an input module 1302, a storage module 1303, and a display module 1304.

The processing module 1301 may include at least one of a central processing unit (CPU), an application processor (AP), or a communication processor (CP). The processing module 1301 may perform an operation or data processing related to control and/or communication of at least one of other elements of the user electronic device. Specifically, the processing module 1301 may be configured to control, based on a specific trigger condition, content displayed on a main screen, or determine, based on a preset rule, content displayed on a screen. The processing module 1301 is further configured to process input instructions or data, and determine a display style based on processed data. The processing module 1301 further includes a rendering engine and the like, for rendering an interface element UI.

The input module 1302 is configured to obtain an instruction or data input by a user, and transmit the obtained instruction or data to another module of the electronic device. Specifically, an input mode of the input module 1302 may include a touch, a gesture, proximity to the screen, or the like, or may be voice input. For example, the input module may be the screen of the electronic device, and may obtain an input operation of the user, generate an input signal based on the obtained input operation, and transmit the input signal to the processing module 1301. In this embodiment of this application, the input module may be configured to receive an unlocking instruction that is input by the user, and/or perform another step.

The storage module 1303 may include a volatile memory and/or a nonvolatile memory. The storage module is configured to store instructions or data related to at least one of other modules of the user terminal device. Specifically, the storage module may record a location of an interface on which a terminal interface element UI is located.

The display module 1304 may include, for example, a liquid crystal display (LCD), a light-emitting diode (LED) display, an organic light-emitting diode (OLED) display, a micro-electro-mechanical system (MEMS) display, or an electronic paper display. The display module 1304 is configured to display content (for example, a text, an image, a video, an icon, a symbol, or the like) that can be viewed by the user. In this embodiment of this application, the display module may be implemented as a display screen, for example, a first screen and/or a second screen.

Optionally, the structure shown in FIG. 13 may further include a communication module 1305, configured to support the electronic device to communicate with another electronic device. For example, the communication module may be connected to a network through wireless communication or wired communication, to communicate with another personal terminal or a network server. The wireless communication may use at least one of cellular communication protocols, such as long term evolution (LTE), long term evolution advanced (LTE-A), code division multiple access (CDMA), wideband code division multiple access (WCDMA), universal mobile telecommunications system (UMTS), wireless broadband (WiBro), or a global system for mobile communications (GSM). The wireless communication may include, for example, short-range communication. The short-range communication may include at least one piece of wireless fidelity (Wi-Fi), Bluetooth, near field communication (NFC), magnetic stripe transmission (MST), or GNSS.

Figure 14:
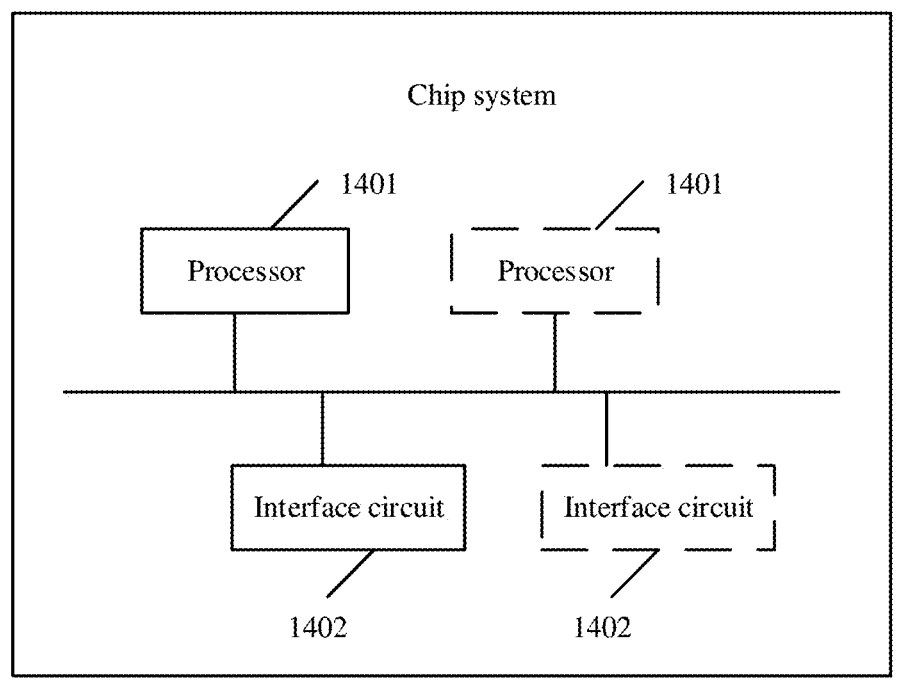
FIG. 14 is a schematic diagram of a chip system according to an embodiment of this application.

An embodiment of this application further provides a chip system. As shown in FIG. 14, the chip system includes at least one processor 1401 and at least one interface circuit 1402. The processor 1401 and the interface circuit 1402 may be connected to each other through a line. For example, the interface circuit 1402 may be configured to receive a signal from another apparatus (for example, a memory of an electronic device). For another example, the interface circuit 1402 may be configured to send a signal to another apparatus (for example, the processor 1401). For example, the interface circuit 1402 may read instructions stored in a memory, and send the instructions to the processor 1401. When the instructions are executed by the processor 1401, the electronic device is enabled to perform the steps in the foregoing embodiments. Certainly, the chip system may further include another discrete device. This is not specifically limited in this embodiment of this application.

An embodiment of this application further provides a computer storage medium. The computer storage medium includes computer instructions. When the computer instructions are run on the foregoing electronic device, the electronic device is enabled to perform the functions or the steps performed by the mobile phone in the foregoing method embodiments.

An embodiment of this application further provides a computer program product. When the computer program product is run on a computer, the computer is enabled to perform the functions or the steps performed by a mobile phone in the foregoing method embodiments.

The foregoing descriptions about implementations allow a person skilled in the art to clearly understand that, for the purpose of convenient and brief description, division of the foregoing functional modules is used as an example for description. During actual application, the foregoing functions can be allocated to different functional modules and implemented based on a requirement, that is, an inner structure of an apparatus is divided into different functional modules to implement all or some of the functions described above.

In the several embodiments provided in this application, it should be understood that the disclosed apparatuses and methods may be implemented in other manners. For example, the foregoing apparatus embodiments are merely examples. For example, division of the modules or units is merely logical function division. During actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may be one or more physical units, may be located in one place, or may be distributed in different places. Some or all of the units may be selected depending on actual requirements to achieve the objectives of the solutions in embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing content is merely specific implementations of this application, but is not intended to limit a protection scope of this application. Any variation or replacement within the technical scope disclosed in this application shall fall within the protection scope of this application. Therefore, the protection scope of this application shall be subject to the protection scope of the claims.

What is claimed is:

1. A method, wherein the method is applied to an electronic device and the method comprises:
    obtaining an unlocking intention, wherein the electronic device comprises a first screen and a second screen that are arranged in a screen-folded state, wherein the first screen is an inner screen, the second screen is an outer screen, the first screen has a first collection component, and the second screen has a second collection component;
    invoking, in response to the unlocking intention, the second collection component to collect identity information of a user, and identifying an identity of the user based on the identity information collected by the second collection component;
    unlocking the first screen when the identity of the user is valid and the electronic device meets a condition for using the first screen;
    invoking the first collection component to collect additional identity information of the user when the identity of the user cannot be identified based on the identity information collected by the second collection component, wherein invoking the first collection component to collect the additional identity information of the user when the identity of the user cannot be identified based on the identity information collected by the second collection component comprises invoking the first collection component to collect the additional identity information of the user when it is detected that an unfolding angle of the electronic device reaches a preset angle and the identity of the user cannot be determined based on the identity information collected by the second collection component; and
    identifying the identity of the user based on the additional identity information collected by the first collection component.

2. The method according to claim 1, wherein after determining that the identity of the user is valid and before the unlocking the first screen, the method further comprises:
    unlocking the second screen; and
    displaying a first interface on the second screen.

3. The method according to claim 2, wherein after unlocking the first screen, the method further comprises displaying, on the first screen, a second interface associated with the first interface.

4. The method according to claim 1, wherein identifying the identity of the user based on the additional identity information collected by the first collection component comprises:
    identifying the identity of the user based on the identity information collected by the second collection component and the additional identity information collected by the first collection component.

5. The method according to claim 1, wherein before unlocking the first screen, the method further comprises:
    displaying a third interface or playing a voice prompt, wherein the third interface prompts the user to unfold the electronic device, and the voice prompt prompts the user to unfold the electronic device.

6. The method according to claim 1, wherein the method further comprises:
    receiving a setting instruction that is input by the user, wherein the setting instruction sets a preset application, a preset time period, a preset geographical location range, or a preset unlocking instruction.

7. The method according to claim 1, wherein:
obtaining the unlocking intention comprises: receiving an unlocking instruction that is input by the user; and
invoking, in response to the unlocking intention, the second collection component to collect the identity information of the user comprises:
invoking, in response to the unlocking instruction, the second collection component to collect the identity information of the user.

8. The method according to claim 7, wherein the condition for using the first screen comprises: current time is within a preset time period, a current location is within a preset geographical location range, a new message is received and the new message is a message of a preset application, the electronic device is in a non-folded state, or the unlocking instruction that is input by the user is a preset unlocking instruction.

9. The method according to claim 8, wherein the preset unlocking instruction comprises: a gesture, a pattern, a number, a fingerprint, or a voice that are preset for unlocking the first screen.

10. The method according to claim 1, wherein the first collection component and the second collection component are the same collection component.

11. The method according to claim 1, wherein:
the first collection component comprises: a fingerprint collection component, a voiceprint collection component, or an image capture component; and
the second collection component comprises: a fingerprint collection component, a voiceprint collection component, or an image capture component.

12. An electronic device, comprising:
one or more processors;
a first screen and a second screen that are arranged in a screen-folded state, wherein the first screen is an inner screen, the second screen is an outer screen, the first screen has a first collection component, and the second screen has a second collection component; and
a non-transitory computer-readable storage medium storing a program to be executed by the one or more processors, the program including instructions to:
obtain an unlocking intention;
invoke, in response to the unlocking intention, the second collection component to collect identity information of a user, and identify an identity of the user based on the identity information collected by the second collection component;
unlock the first screen if the identity of the user is valid and the electronic device meets a condition for using the first screen;
invoke the first collection component to collect additional identity information of the user when the identity of the user cannot be identified based on the identity information collected by the second collection component, wherein invoking the first collection component to collect the additional identity information of the user when the identity of the user cannot be identified based on the identity information collected by the second collection component comprises invoking the first collection component to collect the additional identity information of the user when it is detected that an unfolding angle of the electronic device reaches a preset angle and the identity of the user cannot be identified based on the identity information collected by the second collection component; and
identify the identity of the user based on the additional identity information collected by the first collection component.

13. The electronic device according to claim 12, wherein:
the program includes further instructions to unlock the second screen; and
the second screen is configured to display a first interface.

14. The electronic device according to claim 13, wherein the first screen is configured to display a second interface associated with the first interface after the first screen is unlocked.

15. The electronic device according to claim 12, wherein the instructions to identify the identity of the user based on the additional identity information collected by the first collection component comprises instructions to:
identify the identity of the user based on the identity information collected by the second collection component and the additional identity information collected by the first collection component.

16. The electronic device according to claim 12, wherein the second screen is further configured to display a third interface or play a voice prompt, wherein the third interface prompts the user to unfold the electronic device, and the voice prompt prompts the user to unfold the electronic device.

* * * * *